US009023973B2

(12) United States Patent
Morizur et al.

(10) Patent No.: US 9,023,973 B2
(45) Date of Patent: May 5, 2015

(54) CROSS-LINKED POLYCARBONATE RESIN WITH IMPROVED CHEMICAL AND FLAME RESISTANCE

(71) Applicant: SABIC Innovative Plastics IP B.V., Bergen op Zoom (NL)

(72) Inventors: Jean-Francois Morizur, Evansville, IN (US); Paul Dean Sybert, Evansville, IN (US); James Franklin Hoover, Evansville, IN (US); Derek Lake, Evansville, IN (US)

(73) Assignee: SABIC Global Technologies B.V. (NL)

( * ) Notice: Subject to any disclaimer, the term of this patent is extended or adjusted under 35 U.S.C. 154(b) by 0 days.

(21) Appl. No.: 14/137,121

(22) Filed: Dec. 20, 2013

(65) Prior Publication Data

US 2014/0179817 A1    Jun. 26, 2014

Related U.S. Application Data

(60) Provisional application No. 61/740,062, filed on Dec. 20, 2012.

(51) Int. Cl.
| | | |
|---|---|---|
| *C08G 64/00* | (2006.01) | |
| *C08K 5/3475* | (2006.01) | |
| *C08J 3/28* | (2006.01) | |
| *B29C 35/08* | (2006.01) | |
| *B29C 45/00* | (2006.01) | |
| *C08G 64/04* | (2006.01) | |
| *C08K 5/42* | (2006.01) | |
| *C08K 5/5393* | (2006.01) | |
| *C08K 5/549* | (2006.01) | |
| *C08L 69/00* | (2006.01) | |
| *C08G 64/14* | (2006.01) | |
| *C08G 64/24* | (2006.01) | |
| *C08G 63/02* | (2006.01) | |

(52) U.S. Cl.
CPC .............. *C08K 5/3475* (2013.01); *C08J 3/28* (2013.01); *B29C 35/08* (2013.01); *B29C 45/0001* (2013.01); *C08G 64/045* (2013.01); *C08K 5/42* (2013.01); *C08K 5/5393* (2013.01); *C08K 5/549* (2013.01); *C08L 69/00* (2013.01); *C08G 64/14* (2013.01); *C08G 64/24* (2013.01)

(58) Field of Classification Search
USPC .................................................. 528/196, 198
See application file for complete search history.

(56) References Cited

U.S. PATENT DOCUMENTS

| | | | |
|---|---|---|---|
| 4,153,780 A | 5/1979 | Narita et al. | |
| 4,221,645 A | 9/1980 | Adelmann et al. | |
| 4,333,809 A * | 6/1982 | Schreckenberg et al. | 522/163 |
| 4,338,171 A | 7/1982 | Barie et al. | |
| 4,367,186 A | 1/1983 | Adelmann et al. | |
| 4,749,726 A | 6/1988 | Gupta et al. | |
| 4,831,109 A | 5/1989 | Mitra et al. | |
| 5,034,496 A | 7/1991 | Bales et al. | |
| 5,916,942 A | 6/1999 | Scholl et al. | |
| 6,224,949 B1 | 5/2001 | Wright et al. | |
| 6,517,910 B2 | 2/2003 | Wright et al. | |
| 6,625,379 B1 | 9/2003 | Azuma et al. | |
| 7,875,698 B2 | 1/2011 | Vanmaele et al. | |
| 2004/0030090 A1 | 2/2004 | Meyer et al. | |
| 2005/0049369 A1 | 3/2005 | O'Neil et al. | |
| 2006/0014850 A1 | 1/2006 | Vanmaele et al. | |
| 2006/0074156 A1 | 4/2006 | Ebeling et al. | |
| 2007/0027268 A1 | 2/2007 | Di et al. | |
| 2007/0105994 A1 | 5/2007 | Li et al. | |
| 2008/0081893 A1 | 4/2008 | Hoover et al. | |
| 2008/0114103 A1 | 5/2008 | Hoeks et al. | |
| 2010/0075125 A1 | 3/2010 | Maas et al. | |
| 2011/0065848 A1 | 3/2011 | Jung et al. | |
| 2012/0253002 A1 | 10/2012 | Ozaki et al. | |
| 2014/0178665 A1 | 6/2014 | Morizur et al. | |
| 2014/0179821 A1 | 6/2014 | Morizur et al. | |
| 2014/0234629 A1 | 8/2014 | Sun et al. | |
| 2014/0265053 A1 | 9/2014 | Morizur et al. | |
| 2014/0275314 A1 | 9/2014 | Morizur et al. | |
| 2014/0275321 A1 | 9/2014 | Morizur et al. | |
| 2014/0275322 A1 | 9/2014 | Morizur et al. | |
| 2014/0275324 A1 | 9/2014 | Morizur et al. | |

FOREIGN PATENT DOCUMENTS

| | | |
|---|---|---|
| DE | 24 01 630 | 8/1974 |
| DE | 27 46 139 A1 | 4/1979 |
| DE | 27 46 141 A1 | 4/1979 |
| DE | 2746141 | 4/1979 |
| DE | 2746141 A1 | 4/1979 |

(Continued)

OTHER PUBLICATIONS

International Search Report of International Application No. PCT/US2013/076798 Dated Mar. 13, 2014.
International Search Report and Written Opinion dated Mar. 13, 2014, for corresponding PCT application No. PCT/US2013/077024.
International Search Report and Written Opinion dated Mar. 13, 2014, for corresponding PCT application No. PCT/US2013/077209.
International Search Report and Written Opinion dated Mar. 13, 2014, for corresponding PCT application No. PCT/US2013/077272.
International Search Report and Written Opinion dated Mar. 13, 2014, for corresponding PCT application No. PCT/US2013/076798.
International Search Report and Written Opinion dated Mar. 13, 2014, for corresponding PCT application No. PCT/US2013/076799.
International Search Report and Written Opinion dated Jul. 8, 2014, for corresponding PCT application No. PCT/US2014/028101.

(Continued)

*Primary Examiner* — Terressa Boykin
(74) *Attorney, Agent, or Firm* — Richard M. Klein; Fay Sharpe LLP

(57) ABSTRACT

Disclosed herein are compositions including a cross-linked polycarbonate. The cross-linked polycarbonate may be derived from a polycarbonate having about 0.5 mol % to about 5 mol % endcap groups derived from a monohydroxybenzophenone. A plaque including the composition can achieve a UL94 5VA rating. Also disclosed herein are articles including the compositions, methods of using the compositions, and processes for preparing the compositions.

64 Claims, 6 Drawing Sheets

(56) References Cited

FOREIGN PATENT DOCUMENTS

| | | | |
|---|---|---|---|
| DE | 28 29 258 A1 | 1/1980 | |
| DE | 29 30 787 A1 | 2/1981 | |
| EP | 0001577 A1 | 5/1979 | |
| EP | 0 006 579 | 1/1980 | |
| EP | 0006579 | 1/1980 | |
| EP | 0 068 014 B | 1/1983 | |
| EP | 0 347 682 A | 12/1989 | |
| EP | 1359176 A2 | 11/2003 | |
| EP | 1 093 471 B1 | 12/2007 | |
| EP | 1093471 B1 | 12/2007 | |
| JP | 08-238309 | 9/1996 | |
| JP | 2002-226571 | 8/2002 | |
| WO | WO 96/33156 | 10/1996 | |
| WO | WO 98/22522 A | 5/1998 | |
| WO | WO 2004/013229 A1 | 2/2004 | |
| WO | WO 2014/032616 A1 | 3/2014 | |

OTHER PUBLICATIONS

International Search Report and Written Opinion dated Jul. 8, 2014, for corresponding PCT application No. PCT/US2014/028139.
International Search Report and Written Opinion dated Jul. 8, 2014, for corresponding PCT application No. PCT/US2014/028141.
International Search Report and Written Opinion dated Jul. 8, 2014, for corresponding PCT application No. PCT/US2014/026346.
International Search Report and Written Opinion dated Jul. 8, 2014, for corresponding PCT application No. PCT/US2014/026401.
International Search Report and Written Opinion dated Jul. 8, 2014, for corresponding PCT application No. PCT/US2014/028651.
International Search Report and Written Opinion dated Jul. 8, 2014, for corresponding PCT application No. PCT/US2014/028850.
International Search Report and Written Opinion dated Jul. 10, 2014, for corresponding PCT application No. PCT/US2014/29184.
Wang et al., Photocrosslinking of poly(ethylene terephthalate) copolymers containing photoreactive comonomers, Jul. 18, 2005, Polymer, 46, 6897-6909.

* cited by examiner

CROSS-LINKED POLYCARBONATE RESIN WITH IMPROVED CHEMICAL AND FLAME RESISTANCE

This application claims priority to U.S. Provisional Patent Application Ser. No. 61/740,062, filed Dec. 20, 2012. The disclosure of that application is hereby fully incorporated by reference herein.

TECHNICAL FIELD

The present disclosure relates generally to cross-linked polycarbonates, compositions comprising the cross-linked polycarbonates, and articles comprising the cross-linked polycarbonates.

BACKGROUND

Polycarbonates are polymers that may be derived from bisphenols and phosgene, or their derivatives. They are useful for forming a wide variety of products, such as by molding, extrusion, and thermoforming processes. Such products include articles and components that include auto parts, electronic appliances and cell phone components. Because of their broad use, particularly in electronic applications and auto part applications, the desired properties of polycarbonates include high impact strength and toughness, heat resistance, weather and ozone resistance, and good ductility.

Bisphenol-A based polycarbonate is inherently flame retardant, however the material drips when exposed to flame, and this behavior worsens as the thickness of the material decreases (e.g., 3 mm or less). This diminishes greatly its use in clear thin wall applications where UL 94 V0 ratings, as well as 5VA ratings are required.

Accordingly, there exists a need for improved polycarbonate compositions that exhibit UL 94 V0 and 5VA performance characteristics, while maintaining physical and mechanical properties suitable for the intended application. There also exists a need for polycarbonate compositions that can be used to provide transparent, thin-walled articles having UL94 V0 and 5VA performance characteristics.

SUMMARY

Disclosed herein are compositions comprising cross-linked polycarbonates, articles comprising the compositions, and processes for preparing the compositions and articles.

In one aspect, disclosed is a composition comprising a cross-linked polycarbonate, the cross-linked polycarbonate derived from a non-cross-linked polycarbonate comprising about 0.5 mol % to about 5 mol % endcap groups derived from a monohydroxybenzophenone; and a flame retardant; wherein a plaque comprising the composition achieves a UL94 5VA rating at a thickness of 3.0 mm (±10%) or less.

In certain embodiments, the non-cross-linked polycarbonate comprises about 1 mol % to about 3 mol % endcap groups derived from a monohydroxybenzophenone, or about 2 mol % to about 2.5 mol % endcap groups derived from a monohydroxybenzophenone.

In certain embodiments, the plaque comprising the composition achieves a UL94 5VA rating at a thickness equal to or less than 2.5 mm (±10%), equal to or less than 2.0 mm (±10%), or equal to or less than 1.5 mm (±10%).

In certain embodiments, the flame retardant is potassium perfluorobutane sulfonate (Rimar salt), potassium diphenyl sulfone-3-sulfonate (KSS), or a combination thereof.

In one preferred embodiment, the flame retardant is potassium perfluorobutane sulfonate (Rimar salt). The composition may further comprise a cyclic siloxane, which may be octaphenylcyclotetrasiloxane.

In certain embodiments, the flame retardant is present in an amount of about 0.08 wt % or less, based on the total weight of the composition.

In certain embodiments, the flame retardant is potassium diphenyl sulfone-3-sulfonate (KSS).

In certain embodiments, the composition achieves a UL94 5VA rating in the absence of a brominated and/or chlorinated flame retardant.

In certain embodiments, the plaque comprising the composition has a transparency of 70% or greater at a thickness of 3.2 mm, measured according to ASTM-D1003-00, or a transparency of 70%-90% at a thickness of 3.2 mm, measured according to ASTM-D1003-00. In certain embodiments, the plaque comprising the composition has a haze value of less than 10% at a thickness of 3.2 mm, measured according to ASTM D1003-00.

In certain embodiments, an ASTM part comprising the composition has full ductility under multiaxial impact test conditions per ASTM D3763 at −30° C. determined using a 4-inch (10 cm) diameter, 3.2 millimeter (mm)-thick disk sample, ½-inch (12.7 mm) diameter dart, and an impact velocity of 3.3 meters per second (m/s). In certain embodiments, an ASTM Type 1 tensile bar part comprising the composition has an elongation at break of at least 100% using the ASTM D 638 Type I method at 50 mm/min after exposure to acetone under 1% strain at 23° C. In certain embodiments, an ASTM part comprising the composition has an elongation at break of 50% to about 200% according to ASTM D 638.

In certain embodiments, the non-cross-linked polycarbonate has a molecular weight greater than 17,000 Daltons, as measured by gel permeation chromatography using polycarbonate standards, a molecular weight greater than 17,000 Daltons and less than or equal to 80,000 Daltons, as measured by gel permeation chromatography using polycarbonate standards, or a molecular weight greater than 17,000 Daltons and less than or equal to 35,000 Daltons, as measured by gel permeation chromatography using polycarbonate standards.

In certain embodiments, the non-cross-linked polycarbonate has a melt volume flow rate ranging from about 5 to about 30 cc/10 min at 300° C./1.2 kg.

In certain embodiments, the monohydroxybenzophenone is 4-hydroxybenzophenone.

In certain embodiments, the cross-linked polycarbonate comprises repeating units derived from bisphenol-A.

In certain embodiments, the non-cross-linked polycarbonate has repeating units having branching groups.

In certain embodiments, the non-cross-linked polycarbonate resin comprises a compound of formula (I),

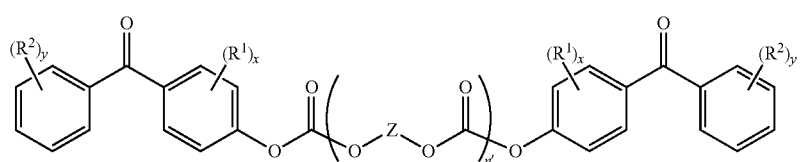

wherein each repeating unit —O—Z—OC(=O)— is independently derived from a carbonate source and
  (i) a monomer having the structure HO-$A_1$-$Y_1$-$A_2$-OH wherein each of $A_1$ and $A_2$ comprise a monocyclic divalent arylene group, and $Y_1$ is a bridging group having one or more atoms; or
  (ii) a monomer having the structure

wherein each $R^h$ is independently a halogen atom, a $C_1$-$C_{10}$ hydrocarbyl, or a halogen substituted $C_1$-$C_{10}$ hydrocarbyl, and n is 0 to 4;
$R^1$ is halogen, $C_1$-$C_6$ alkyl, $C_3$-$C_8$ cycloalkyl, aryl, or arylalkyl;
$R^2$ is halogen, $C_1$-$C_6$ alkyl, $C_3$-$C_8$ cycloalkyl, aryl, or arylalkyl;
x is 0, 1, 2, 3, or 4;
y is 0, 1, 2, 3, 4, or 5; and
n' ranges from 29 to 65.

In certain embodiments, the non-cross-linked polycarbonate resin comprises a compound of formula (II):

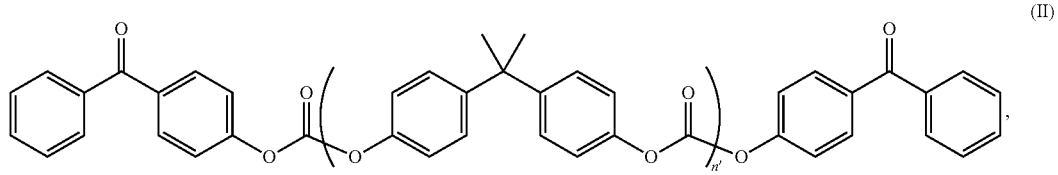

wherein n' ranges from 29 to 65.

In certain embodiments, the composition contains at least 5 wt % of an insoluble methylene chloride insoluble fraction in a 1 mm thick film.

In certain embodiments, the composition is a blend comprising the cross-linked and/or cross-linkable polycarbonate, and one or more additional components. The composition may comprise one or more additional polymers, and optionally one or more additives. The composition may comprise a p-cumyl phenol capped poly(isophthalate-terephthalate-resorcinol ester)-co-(bisphenol-A carbonate) polymer. The composition may comprise a polycarbonate polysiloxane copolymer wherein the polysiloxane content is from 0.4 wt % to 25 wt %. The composition may comprise a polycarbonate polysiloxane copolymer wherein the polysiloxane content is from about 6 wt % siloxane (±10%) to about 25 wt % siloxane (±10%). The polycarbonate polysiloxane copolymer may be a siloxane block co-polycarbonate comprising 20 wt % siloxane (±10%). The polycarbonate polysiloxane copolymer may be a siloxane block co-polycarbonate comprising 6 wt % siloxane (±10%). In certain embodiments, the potassium perfluorobutane sulfonate (Rimar salt) is present in an amount of about 0.06 wt % to about 0.08 wt %.

In certain embodiments, the cross-linked polycarbonate does not contain any soft block segments, such as from aliphatic polyesters, aliphatic polyethers, aliphatic polythioeithers, aliphatic polyacetals, aliphatic polycarbonates, C—C linked polymers, or polysiloxanes. In certain embodiments, the cross-linked polycarbonate does not contain any repeating units derived from a dihydroxybenzophenone, a trihydroxybenzophenone, or a tetrahydroxybenzophenone.

In another aspect disclosed is a composition comprising a cross-linked polycarbonate derived from a non-cross-linked polycarbonate comprising about 0.5 mol % to about 5 mol % endcap groups derived from a monohydroxybenzophenone; wherein a plaque comprising the composition further, comprising potassium perfluorobutane sulfonate (Rimar salt) in an amount of about 0.05 wt % to about 0.085 wt %, based on the total weight of the composition, achieves a UL94 5VA rating at a thickness of 3.0 mm (±10%) or less. In certain embodiments, the composition achieves a UL94 5VA rating in the absence of a brominated and/or chlorinated flame retardant. In certain embodiments, the plaque comprising the composition has a transparency of 70% to 90% at a thickness of 3.2 mm, measured according to ASTM-D1003-00.

In another aspect, disclosed are articles comprising the compositions disclosed herein.

In certain embodiments, the article is at least one of an automotive bumper, an automotive exterior component, an automobile mirror housing, an automobile wheel cover, an automobile instrument panel or trim, an automobile glove box, an automobile door hardware or other interior trim, an automobile exterior light, an automobile part within the engine compartment, an agricultural tractor or device part, a construction equipment vehicle or device part, a marine or personal water craft part, an all terrain vehicle or all terrain vehicle part, plumbing equipment, a valve or pump, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, and a turbine blade.

In certain embodiments, the composition is comprised in a first thickness of the article as measured from an external surface of said article, the first thickness being 20 micron or less.

In certain embodiments, the article, or a material in the article, requires a UL94 5VA rating performance. The article may be at least one of a computer housing, a computer housing or business machine housing or part, a housing or part for monitors, a computer router, a copier, a desk top printer, a large office/industrial printer, a handheld electronic device housing such as a computer or business machine housing, a housing for a hand-held device, a component for a light fixture including LED fixtures or home or office appliances, a humidifier housing, a thermostat control housing, an air conditioner drain pan, an outdoor cabinet, a telecom enclosure or infrastructure, a Simple Network Intrusion Detection System (SNIDS) device, a network interface device, a smoke detector, a component or device in a plenum space, a component for a medical application or a device such as a medical scanner, X-ray equipment, or ultrasound device, an electrical box or enclosure, and an electrical connector.

In another aspect, disclosed is a process for preparing an article comprising the composition disclosed herein. The process may comprise (a) providing a first composition comprising a non-cross-linked polycarbonate comprising about 0.5 mol % to about 5 mol % endcap groups derived from a monohydroxybenzophenone; and a flame retardant; (b) molding the composition of step (a) into an article, and/or coating an article with the composition of step (a); and (c) exposing the molded article and/or coated article of step (b) to UV-radiation to affect cross-linking of the non-cross-linked polycarbonate.

In certain embodiments, step (c) comprises passing the article of step (b) through a UV-chamber, a UV-containing light source, or exposing the article to the sun.

In certain embodiments, the article is treated with UV radiation for 90 seconds, providing an energy of irradiation of 3,000 mJ/cm$^2$.

In certain embodiments, the cross-linking occurs at the surface of the molded article or surface of the coating to a depth of 20 microns or less, as measured by FTIR by the loss of the benzophenone ketone.

In certain embodiments, step (b) includes extrusion processes, multilayer extrusion processes, and combinations thereof.

In certain embodiments, the molded article and/or coated article of step (b) includes a multilayer sheet or multilayer film, where at least one of the outer layers comprise a composition disclosed herein.

In certain embodiments, the article prepared by the process is at least one of an automotive bumper, an automotive exterior component, an automobile mirror housing, an automobile wheel cover, an automobile instrument panel or trim, an automobile glove box, an automobile door hardware or other interior trim, an automobile exterior light, an automobile part within the engine compartment, an agricultural tractor or device part, a construction equipment vehicle or device part, a marine or personal water craft part, an all terrain vehicle or all terrain vehicle part, plumbing equipment, a valve or pump, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, and a turbine blade.

In certain embodiments, the article, or a material in the article, requires a UL94 5VA rating performance. The article may be at least one of a computer housing, a computer housing or business machine housing or part, a housing or part for monitors, a computer router, a copier, a desk top printer, a large office/industrial printer, a handheld electronic device housing such as a computer or business machine housing, a housing for a hand-held device, a component for a light fixture including LED fixtures or home or office appliances, a humidifier housing, a thermostat control housing, an air conditioner drain pan, an outdoor cabinet, a telecom enclosure or infrastructure, a Simple Network Intrusion Detection System (SNIDS) device, a network interface device, a smoke detector, a component or device in a plenum space, a component for a medical application or a device such as a medical scanner, X-ray equipment, or ultrasound device, an electrical box or enclosure, and an electrical connector.

Also disclosed in various embodiments is a composition comprising: a cross-linkable polycarbonate resin comprising about 0.5 mole % to about 5.0 mole % endcap groups derived from a monohydroxybenzophenone, wherein the cross-linkable polycarbonate resin is made from an interfacial polymerization process comprising the steps of: (i) forming a mixture comprising bisphenol-A, a monohydroxybenzophenone, and a tertiary amine catalyst in a water-immiscible solvent and water solvent system; (ii) stirring the mixture of (i) while maintaining a pH from about 8 to about 9 by the addition of a basic solution to form a stirred mixture; (iii) charging the stirred mixture of (ii) with phosgene, while simultaneously adding a basic solution to maintain the pH between about 8.5 to about 10 to form a reaction mixture containing the cross-linkable polycarbonate resin; (iv) separating the organic layer from the reaction mixture; (v) washing the organic layer of (iv) with an aqueous acid; (vi) washing the acid-washed organic layer of (v) with deionized water to achieve a neutral pH; and (vii) isolating the cross-linkable polycarbonate resin from the neutral organic layer of (vi); wherein the cross-linkable polycarbonate resin has a weight-average molecular weight of between 17,000 and 35,000 Daltons and has a polydispersity index (PDI) of between 3.0 and 7.3 as measured by GPC using a UV-VIS detector and polycarbonate standards.

A second end-capping agent can be present in the mixture of (i) in addition to the monohydroxybenzophenone. The second end-capping agent can be selected from the group consisting of phenol, p-t-butylphenol, p-cumylphenol, and 4-cyanophenol. The cross-linkable polycarbonate resin may comprise about 0.5 mole % to about 5.0 mole % endcap groups derived from the second end-capping agent.

The mixture of (i) can further comprise a phase transfer catalyst, which can be selected from the group consisting of [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is Cl$^-$, Br$^-$, a C$_1$-C$_8$ alkoxy group or a C$_6$-C$_{18}$ aryloxy group.

Sometimes, the mixture of (i) further comprises a branching agent.

Also disclosed are compositions comprising a cross-linkable polycarbonate resin, wherein the cross-linkable polycarbonate resin comprises about 0.5 mol % to about 5 mol % endcap groups derived from a monohydroxybenzophenone; wherein the cross-linkable polycarbonate resin has a weight-average molecular weight of between 17,000 and 35,000 Daltons and has a polydispersity index (PDI) of between 3.0 and 7.3 as measured by GPC using a UV-VIS detector and polycarbonate standards; and wherein when a plaque of about 0.5 mm thickness formed from the cross-linkable polycarbonate resin is exposed to UV radiation, the resin increases in molecular weight by at least 15%.

The resin may further increase in molecular weight by at least 30%, or by at least 135%.

Further disclosed in different embodiments are compositions comprising a cross-linkable polycarbonate resin, wherein the cross-linkable polycarbonate resin comprises about 0.5 mol % to about 5 mol % endcap groups derived from a monohydroxybenzophenone; wherein the cross-linkable polycarbonate resin has a polydispersity index (PD)I of between 3.0 and 7.3 as measured by GPC using a UV-VIS detector and polycarbonate standards; wherein the composition has a melt volume flow rate of 2 to 12 cc/10 minutes at 300° C./1.2 kg; wherein a plaque made from the composition has a transparency of 70% to 90% at a thickness of 3.2 mm, measured according to ASTM-D1003-00; and wherein a plaque that is made from the composition and exposed to UV radiation can achieve a UL94 5VA rating at a thickness of 2.0 mm (±10%).

Also disclosed are compositions comprising a cross-linkable polycarbonate resin, wherein the cross-linkable polycarbonate resin comprises about 0.5 mol % to about 5 mol % endcap groups derived from a monohydroxybenzophenone; wherein a plaque made from the composition with a thickness of 3.2 mm has a ductility of 100% after exposure to 2000 mJ/cm2 of UV radiation; wherein a plaque made from the composition with a thickness of 2.54 mm has a haze of less than 2%; wherein a film of about 0.5 mm thickness and exposed to UV radiation has a % gel of 15% or greater; and wherein a plaque made from the composition with a thickness of 3.2 mm and crosslinked, then submerged in acetone for 5 minutes, does not crack or blister.

In further embodiments, a plaque made from the composition with a thickness of 3.2 mm and crosslinked, then submerged in toluene for 5 minutes, does not crack or blister.

Disclosed in further embodiments are compositions comprising a cross-linkable polycarbonate resin, wherein the cross-linkable polycarbonate resin comprises endcap groups derived from a monohydroxybenzophenone; wherein the composition has a melt volume flow rate of 2 to 12 cc/10 minutes at 300° C./1.2 kg; and wherein a plaque that is made from the composition and exposed to UV radiation can achieve a UL94 5VA rating at a thickness of 2.0 mm (±10%).

Also disclosed are compositions comprising a cross-linkable polycarbonate resin and a flame retardant, wherein the cross-linkable polycarbonate resin comprises endcap groups derived from a monohydroxybenzophenone; wherein the composition comprises about 0.08 wt % or less of the flame retardant; wherein the composition has a melt volume flow rate of 2 to 20 cc/10 minutes at 300° C./1.2 kg; and wherein a plaque that is made from the composition and exposed to UV radiation can achieve a UL94 5VA rating at a thickness of 3.0 mm (±10%).

In any of the compositions described above, the cross-linkable polycarbonate resin may comprise about 1 mole % to about 3 mole % endcap groups derived from the monohydroxybenzophenone.

In any of the compositions described above, the cross-linkable polycarbonate resin may further comprise endcap groups derived from a second end-capping agent in addition to the monohydroxybenzophenone. The second end-capping agent can be selected from the group consisting of phenol, p-t-butylphenol, p-cumylphenol, and 4-cyanophenol. The cross-linkable polycarbonate resin may comprise about 0.5 mole % to 5.0 mole % endcap groups derived from the second end-capping agent.

In any of the compositions described above, sometimes a plaque that is made from the composition and exposed to UV radiation can achieve a UL94 5VA rating at a thickness of 2.0 mm (±10%), or at a thickness of 1.5 mm (±10%).

In any of the compositions described above, the cross-linkable polycarbonate resin may have a weight-average molecular weight of between 17,000 and 35,000 Daltons, as measured by GPC using a UV-VIS detector and polycarbonate standards.

In any of the compositions described above, the cross-linkable polycarbonate resin may have a polydispersity index (PDI) of between 3.0 and 7.3 as measured by GPC using a UV-VIS detector and polycarbonate standards.

In any of the compositions described above, the cross-linkable polycarbonate resin may have a melt volume flow rate of about 2 to about 12 cc/10 min at 300° C./1.2 kg.

In any of the compositions described above, a plaque comprising the composition may have a transparency of 70% or greater at a thickness of 3.2 mm, measured according to ASTM-D1003-00.

In any of the compositions described above, a plaque comprising the composition may have a haze value of less than 2% at a thickness of 2.54 mm, measured according to ASTM D1003-07.

In any of the compositions described above, an ASTM part comprising the composition may have full ductility under multiaxial impact test conditions per ASTM D3763 at ?30° C. determined using a 4-inch (10 cm) diameter, 3.2 millimeter (mm)-thick disk sample, ½-inch (12.7 mm) diameter dart, and an impact velocity of 3.3 meters per second (m/s).

In any of the compositions described above, an ASTM Type 1 tensile bar part comprising the composition may have an elongation at break of at least 50% using the ASTM D 638 Type I method at 50 mm/min after exposure to acetone under 1% strain at 23° C.

In any of the compositions described above, the non-cross-linked polycarbonate may comprise a compound of formula (I),

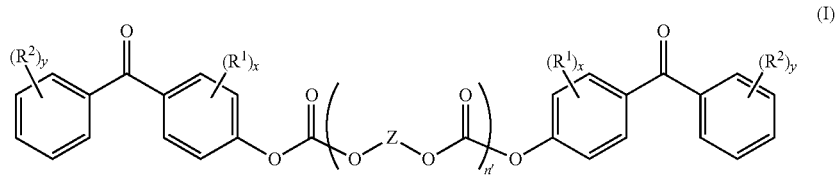

wherein each repeating unit —O—Z—OC(=O)— is independently derived from a carbonate source and
(i) a monomer having the structure HO-$A_1$-$Y_1$-$A_2$-OH wherein each of A1 and A2 comprise a monocyclic divalent arylene group, and Y1 is a bridging group having one or more atoms; or
(ii) a monomer having the structure

wherein each Rh is independently a halogen atom, a C1-C10 hydrocarbyl, or a halogen substituted C1-C10 hydrocarbyl, and n is 0 to 4;
R1 is halogen, C1-C6 alkyl, C3-C8 cycloalkyl, aryl, or arylalkyl;
R2 is halogen, C1-C6 alkyl, C3-C8 cycloalkyl, aryl, or arylalkyl;
x is 0, 1, 2, 3, or 4;
y is 0, 1, 2, 3, 4, or 5; and
n' ranges from 29 to 65.

In any of the compositions described above, the non-cross-linked polycarbonate may comprise a compound of formula (II):

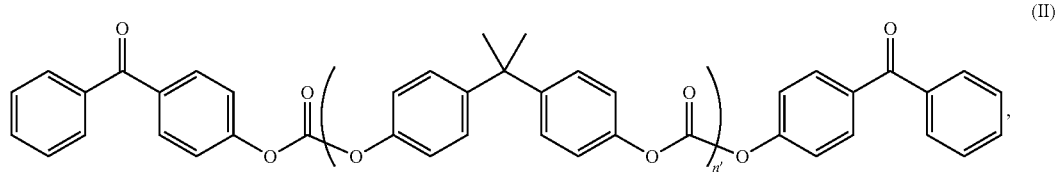

wherein n' ranges from 29 to 65.

In any of the compositions described above, the composition may contain at least 5 wt % of an insoluble methylene chloride insoluble fraction in a 1 mm thick film.

Any of the compositions described above can further comprise a flame retardant. The flame retardant can be potassium perfluorobutane sulfonate (Rimar salt), potassium diphenyl sulfone-3-sulfonate (KSS), or a combination thereof. In some specific embodiments, the flame retardant is Rimar salt which is present in an amount of about 0.05 wt % to about 0.085 wt %, based on the total weight of the composition, and wherein the plaque comprising the composition has a transparency of 70 to 90% at a thickness of 3.2 mm, measured according to ASTM-D1003-00. In other embodiments, the flame retardant is present in an amount of about 0.06 wt % to about 0.08 wt %. In any of these compositions, the composition can further comprise a heat stabilizer and a mold release agent in addition to the flame retardant.

In any of the compositions described above, the composition can achieve a UL94 5VA rating in the absence of a brominated or chlorinated flame retardant.

Any of the compositions described above may further comprise a cyclic siloxane. Any of the compositions described above may alternatively further comprise an impact modifier, UV stabilizer, colorant, flame retardant, heat stabilizer, plasticizer, lubricant, mold release agent, filler, reinforcing agent, antioxidant agent, antistatic agent, blowing agent, anti-drip agent, or radiation stabilizer.

In any of the compositions described above, the cross-linkable polycarbonate resin might not not contain any soft block segments from aliphatic polyesters, aliphatic polyethers, aliphatic polythioethers, aliphatic polyacetals, aliphatic polycarbonates, C—C linked polymers, or polysiloxanes. In any of the compositions described above, the cross-linked polycarbonate may not contain any repeating units derived from a dihydroxybenzophenone, a trihydroxybenzophenone, or a tetrahydroxybenzophenone.

In any of the compositions described above, the cross-linkable polycarbonate may contain about 0.5 mol % of end-caps derived from 4-monohydroxybenzophenone, and have a weight-average molecular weight (Mw) from 17,000 to 30,000 Daltons.

In any of the compositions described above, the cross-linkable polycarbonate may contain about 2.5 mol % of end-caps derived from 4-monohydroxybenzophenone, and have a weight-average molecular weight (Mw) from 24,000 to 31,000 Daltons.

In any of the compositions described above, the cross-linkable polycarbonate may have an MVR of 8 to 10 cc/10 min at 300° C./1.2 kg, and be able to achieve UL94 V0 performance at a thickness of 2.0 mm.

Any of the compositions described above can further comprise a second polymer different from the cross-linkable polycarbonate resin. In more particular embodiments, the second polymer is a p-cumyl phenol capped poly(isophthalate-terephthalate-resorcinol ester)-co-(bisphenol-A carbonate) polymer or a polycarbonate-polysiloxane copolymer having a polysiloxane content from 0.4 wt % to 25 wt %. The polycarbonate-polysiloxane copolymer might be a siloxane block co-polycarbonate comprising from about 6 wt % siloxane (±10%) to about 20 wt % siloxane (±10%).

Also disclosed are articles formed from any of the compositions described above.

The article may be at least one of an automotive bumper, an automotive exterior component, an automobile mirror housing, an automobile wheel cover, an automobile instrument panel or trim, an automobile glove box, an automobile door hardware or other interior trim, an automobile exterior light, an automobile part within the engine compartment, an agricultural tractor or device part, a construction equipment vehicle or device part, a marine or personal water craft part, an all terrain vehicle or all terrain vehicle part, plumbing equipment, a valve or pump, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, and a turbine blade.

Alternatively, the article may be at least one of a computer housing, a computer housing or business machine housing or part, a housing or part for monitors, a computer router, a copier, a desk top printer, a large office/industrial printer, a handheld electronic device housing, a housing for a handheld device, a component for a light fixture, a humidifier housing, a thermostat control housing, an air conditioner drain pan, an outdoor cabinet, a telecom enclosure or infrastructure, a Simple Network Intrusion Detection System (SNIDS) device, a network interface device, a smoke detector, a component or device in a plenum space, a component for a medical application or a device, an electrical box or enclosure, and an electrical connector.

In more particular embodiments, the article is a film, a sheet, a layer of a multilayer film, or a layer of a multilayer sheet.

The article can be formed by injection molding, overmolding, co-injection molding, extrusion, multilayer extrusion, rotational molding, blow molding, or thermoforming. The article may be exposed to UV radiation to cause crosslinking of the cross-linkable polycarbonate resin.

Also disclosed herein are interfacial polymerization processes for making a cross-linkable polycarbonate resin, comprising: (i) forming a mixture comprising bisphenol-A, a monohydroxybenzophenone, and a tertiary amine catalyst in a water-immiscible solvent and water solvent system; (ii) stirring the mixture of (i) while maintaining a pH from about 8 to about 9 by the addition of a basic solution to form a stirred mixture; (iii) charging the stirred mixture of (ii) with phosgene, while simultaneously adding a basic solution to maintain the pH between about 8.5 to about 10 to form a reaction mixture containing the cross-linkable polycarbonate resin; (iv) separating the organic layer from the reaction mixture; (v) washing the organic layer of (iv) with an aqueous acid; (vi) washing the acid-washed organic layer of (v) with deionized water to achieve a neutral pH; and (vii) isolating the cross-linkable polycarbonate resin from the neutral organic layer of (vi); wherein the cross-linkable polycarbonate resin has a weight-average molecular weight of between 17,000 and 35,000 Daltons and has a polydispersity index (PDI) of between 3.0 and 7.3 as measured by GPC using a UV-VIS detector and polycarbonate standards.

In particular embodiments, the monohydroxybenzophenone is 4-hydroxybenzophenone, the tertiary amine catalyst is triethylamine, and the water-immiscible solvent is methylene chloride.

A second end-capping agent can be present in the mixture of (i) in addition to the monohydroxybenzophenone. The second end-capping agent may be selected from the group consisting of phenol, p-t-butylphenol, p-cumylphenol, and 4-cyanophenol.

The mixture of (i) can also further comprise a phase transfer catalyst, which can be selected from the group consisting of $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_1$-$C_8$ alkoxy group or a $C_6$-$C_{18}$ aryloxy group. The amount of phase transfer catalyst may be from 0.5 to 2 wt %, based on the weight of the bisphenol-A.

The mixture of (i) can also further comprise a branching agent.

Also disclosed herein are processes for preparing a polycarbonate article, comprising: making a cross-linkable polycarbonate resin comprising about 0.5 mol % to about 5 mol % endcap groups derived from a monohydroxybenzophenone; compounding the cross-linkable polycarbonate resin with a flame retardant to obtain a composition; molding an article from the composition or coating an article with the composition; and exposing the molded article or coating to UV radiation to affect crosslinking; wherein a plaque made from the composition has a transparency of 70% to 90% at a thickness of 3.2 mm, measured according to ASTM-D1003-00; and wherein a plaque that is made from the composition and exposed to UV radiation can achieve a UL94 5VA rating at a thickness of 2.0 mm (±10%) or less.

The molded article or coating can be exposed to UV radiation by passing the molded article or coating through a UV-chamber, or through a UV-containing light source, or by exposing the molded article or coating to the sun.

The article can treated with UV radiation for 90 seconds, providing an energy of irradiation of 3,000 mJ/cm$^2$.

In particular embodiments, the article is molded by, or the article is coated by, extrusion processes, multilayer extrusion processes, and combinations thereof.

The molded article and/or coated article can be a multilayer sheet or multilayer film.

Also disclosed are articles prepared by any of the processes described above.

The compositions, articles, methods, and processes are further described herein.

DETAILED DESCRIPTION

Figure 1:
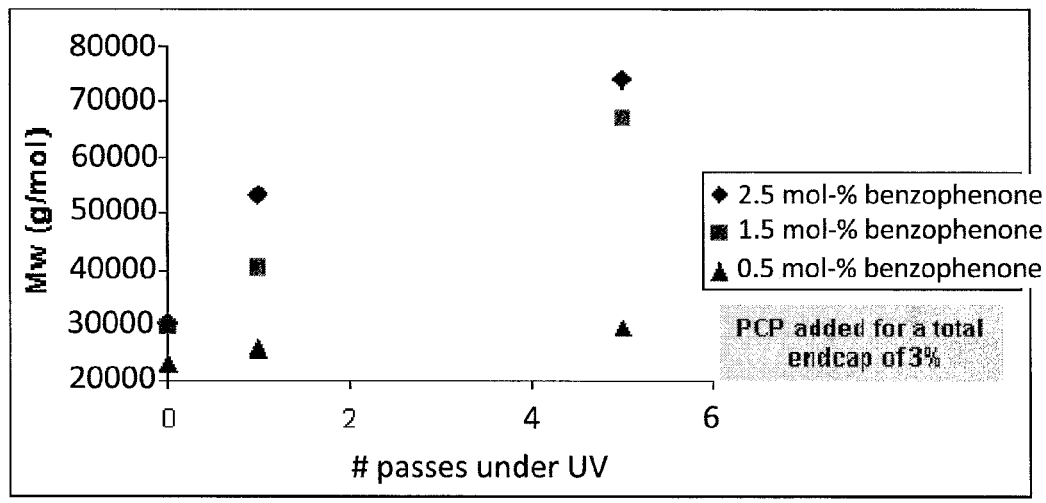
FIG. 1 depicts polycarbonate composition molecular weight as a function of UV-exposure.

Disclosed herein are compositions comprising a cross-linked polycarbonate. The compositions have improved flame retardance over conventional clear polycarbonates, including improved flame resistance performance characteristics, such as flame out time (FOT) and time to drip (TTD). The compositions, blended or neat, can be used to provide thin-walled materials that are UL94 5VA compliant. The compositions can be used to provide thin-walled materials that are 5VA compliant and highly transparent. The compositions may also exhibit good chemical resistance, scratch resistance, tear resistance, impact strength, ductility, hydrolytic stability, and/or weatherability.

The compositions disclosed herein are derived from cross-linkable polycarbonates comprising monohydroxybenzophenone derived endcaps. These polycarbonates, prior to cross-linking, can be provided as thermally stable high melt-flow polymers, and can thus be used to fabricate a variety of thin-walled articles (e.g., 3 mm or less). These articles may subsequently be treated (e.g., with UV-radiation) to affect cross-linking, thereby providing thin-walled materials that meet desired performance requirements (e.g., 5VA performance, chemical resistance, transparency). The cross-linked materials, in addition to flame resistance and chemical resistance, may retain or exhibit superior mechanical properties (e.g., impact resistance, ductility) as compared to the composition prior to cross-linking.

The use of monohydroxybenzophenone derived endcaps provides several advantages over polycarbonates incorporating repeating units derived from dihydroxybenzophenone monomers. Specifically, the monohydroxybenzophenone endcap is more economical, as less monomer is typically used. In addition, incorporation of the monohydroxybenzophenone into the polycarbonate can be particularly controlled, as the monohydroxybenzophenone will only react as a chain stopper. Accordingly, use of monohydroxybenzophenone eliminates the need for careful monitoring of polymerization kinetics or how the monomer is incorporated, as compared with a corresponding dihydroxybenzophenone monomer.

The polycarbonates comprising monohydroxybenzophenone derived endcaps can be blended with other polymers and additives, and yet still be sufficiently cross-linked to provide compositions that exhibit one or more of UL 94 5VA compliance, extreme chemical resistance, scratch resistance, tear resistance, impact strength, ductility, hydrolytic stability, and weatherability. For example, polycarbonates comprising monohydroxybenzophenone derived endcaps can be blended with weathering polymers (e.g., poly(isophthalate-terephthalate-resorcinol ester)-co-(bisphenol-A carbonate) copolymer) and subsequently cross-linked to provide materials and articles possessing desired flame resistance (e.g., V0, 5VA), chemical resistance, scratch resistance, tear resistance, impact strength, ductility, hydrolytic stability, and/or weatherability.

The compositions disclosed herein are useful in the manufacture of a wide variety of articles, particularly thin-walled articles, including highly transparent thin-walled articles, having improved flame retardance and good physical properties. The compositions can be used to provide materials and articles such as, but not limited to, injection molded articles, films, extruded sheets, fibers, pellets, flex-films, tear-resistant films, and PVD laminates. The compositions can be used to provide materials and articles having scratch resistance. The compositions can be used to provide materials and articles that have self-sealing properties (e.g., a scratched article may undergo cross-linking upon UV-exposure, thereby sealing the scratch).

The compositions, articles, methods, and processes are further described herein.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

"Alkyl" as used herein may mean a linear, branched, or cyclic hydrocarbyl group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Aryl" as used herein may mean a substituted or unsubstituted aryl radical containing from 6 to 36 ring carbon atoms. Examples of aryl include, but are not limited to, a phenyl group, a bicyclic hydrocarbon fused ring system, or a tricyclic hydrocarbon fused ring system wherein one or more of the rings are a phenyl group.

"Arylalkyl" as used herein may mean an aryl, as defined herein, appended to the parent molecular moiety through an alkyl, as defined herein.

"Copolymer" as used herein may mean a polymer derived from two or more structural unit or monomeric species, as opposed to a homopolymer, which is derived from only one structural unit or monomer.

"$C_3$-$C_6$ cycloalkyl" as used herein may mean cyclopropyl, cyclobutyl, cyclopentyl or cyclohexyl.

"Glass Transition Temperature" or "Tg" as used herein may mean the maximum temperature that a polymer, such as a polycarbonate, will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius.

The glass transition temperature of a polymer, such as a polycarbonate, may depend primarily on the composition of the polymer. Polycarbonates that are formed from monomers having more rigid and less flexible chemical structures than Bisphenol-A generally have higher glass transition temperatures than Bisphenol-A polycarbonate, while polycarbonates that are formed from monomers having less rigid and more flexible chemical structures than Bisphenol-A generally have lower glass transition temperatures than Bisphenol-A polycarbonate. For example, a polycarbonate formed from 33 mole % of a rigid monomer, 3,3-bis(4-hydroxyphenyl)-2-phenylisoindolin-1-one ("PPPBP"), and 67 mole % Bisphenol-A has a glass transition temperature of 198° C., while a polycarbonate formed from Bisphenol-A, but also having 6 wt % of siloxane units, a flexible monomer, has a glass transition temperature of 145° C.

Mixing of two or more polycarbonates having different glass transition temperatures may result in a glass transition temperature value for the mixture that is intermediate between the glass transition temperatures of the polycarbonates that are mixed.

The glass transition temperature of a polycarbonate may also be an indicator of the molding or extrusion temperatures required to form polycarbonate parts. The higher the glass transition temperature of the polycarbonate the higher the molding or extrusion temperatures that are needed to form polycarbonate parts.

The glass transition temperatures (Tg) described herein are measures of heat resistance of, for example, polycarbonate and polycarbonate blends. The Tg can be determined by differential scanning calorimetry. The calorimetry method may use a TA Instruments Q1000 instrument, for example, with setting of 20° C./min ramp rate and 40° C. start temperature and 200° C. end temperature "Halo" as used herein may be a substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, bromine or iodine atom.

"Haze" as used herein may mean that percentage of transmitted light, which in passing through a specimen deviates from the incident beam by forward scattering. Percent (%) haze may be measured according to ASTM D 1003-07.

"Heteroaryl" as used herein may mean any aromatic heterocyclic ring which may comprise an optionally benzocondensed 5 or 6 membered heterocycle with from 1 to 3 heteroatoms selected among N, O or S. Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazolyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Hindered phenol stabilizer" as used herein may mean 3,5-di-tert-butyl-4-hydroxyhydrocinnamic acid, octadecyl ester.

"Melt Volume Rate" (MVR) as used herein may mean the flow rate of a polymer in a melt phase as determined using the method of ASTM 1238-10. The MVR of a molten polymer is measured by determining the amount of polymer that flows through a capillary of a specific temperature over a specified time using standard weights at a fixed temperature. MVR is expressed in cubic centimeter per 10 minutes. The higher the MVR value of a polymer at a specific temperature, the greater the flow of that polymer at that specific temperature.

"Peak melt viscosity" as used herein may mean the highest melt viscosity value (in poise) achieved between 350° C. and 450° C. during rheological testing of a polycarbonate resin.

"Percent transmission" or "% transmission" as used herein may mean the ratio of transmitted light to incident light and may be measured according to ASTM D 1003-07.

"PETS release agent" as used herein may mean pentaerythritol tetrastearate, mold release.

"Phosphite stabilizer" as used herein may mean tris-(2,4-di-tert-butylphenyl)phosphite.

"Polycarbonate" as used herein may mean an oligomer or polymer comprising residues of one or more polymer structural units, or monomers, joined by carbonate linkages.

"Straight or branched $C_1$-$C_3$ alkyl" or "straight or branched $C_1$-$C_3$ alkoxy" as used herein may mean methyl, ethyl, n-propyl, isopropyl, methoxy, ethoxy, n-propoxy and isopropoxy.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein.

"Thermal stability" as used herein refers to resistance of a polymer to molecular weight degradation under thermal conditions. Thus, a polymer with poor thermal stability may show significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions such as melt viscosity changes.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. COMPOSITIONS

Disclosed herein are compositions comprising a cross-linked polycarbonate.

The cross-linked polycarbonate may be derived from a non-cross-linked polycarbonate comprising about 0.5 mol % to about 5 mol % endcap groups derived from a monohydroxybenzophenone, about 1 mol % to about 3 mol % endcap groups derived from a monohydroxybenzophenone, about 1.7 mol % to about 2.5 mol % endcap groups derived from a monohydroxybenzophenone, or about 2 mol % to about 2.5 mol % endcap groups derived from a monohydroxybenzophenone. The cross-linked polycarbonate may be derived from a non-cross-linked polycarbonate comprising a monohydroxybenzophenone derived endcap content of: 0.5 mol %, 0.6 mol %, 0.7 mol %, 0.8 mol %, 0.9 mol %, 1.0 mol %, 1.1 mol %, 1.2 mol %, 1.3 mol %, 1.4 mol %, 1.5 mol %, 1.6 mol %, 1.7 mol %, 1.8 mol %, 1.9 mol %, 2.0 mol %, 2.1 mol %, 2.2 mol %, 2.3 mol %, 2.4 mol %, 2.5 mol %, 2.6 mol %, 2.7 mol %, 2.8 mol %, 2.9 mol %, 3.0 mol %, 3.1 mol %, 3.2 mol %, 3.3 mol %, 3.4 mol %, 3.5 mol %, 3.6 mol %, 3.7 mol %, 3.8 mol %, 3.9 mol %, 4.0 mol %, 4.1 mol %, 4.2 mol %, 4.3 mol %, 4.4 mol %, 4.5 mol %, 4.6 mol %, 4.7 mol %, 4.8 mol %, 4.9 mol %, or 5.0 mol %.

The composition may further comprise a flame retardant, preferably a non-brominated, non-chlorinated flame retardant. The composition may comprise a flame retardant in an amount of about 0.09 wt % or less, about 0.089 wt % or less, about 0.088 wt % or less, about 0.087 wt % or less, about 0.086 wt % or less, about 0.085 wt % or less, about 0.084 wt % or less, about 0.083 wt % or less, about 0.082 wt % or less, about 0.081 wt % or less, about 0.080 wt % or less, about 0.079 wt % or less, about 0.078 wt % or less, about 0.077 wt % or less, about 0.076 wt % or less, about 0.075 wt % or less, about 0.074 wt % or less, about 0.073 wt % or less, about 0.072 wt % or less, about 0.071 wt % or less, about 0.070 wt % or less, about 0.069 wt % or less, about 0.068 wt % or less, about 0.067 wt % or less, about 0.066 wt % or less, about 0.065 wt % or less, about 0.064 wt % or less, about 0.063 wt % or less, about 0.062 wt % or less, about 0.061 wt % or less, about 0.060 wt % or less, about 0.059 wt % or less, about 0.058 wt % or less, about 0.057 wt % or less, about 0.056 wt % or less, about 0.055 wt % or less, about 0.054 wt % or less, about 0.053 wt % or less, about 0.052 wt % or less, about 0.051 wt % or less, or about 0.050 wt % or less, based on the total weight of the composition.

A material comprising the composition may be UL94 V0 compliant. A flame bar comprising the composition may achieve a UL94 V0 rating. A flame bar comprising the composition, optionally in the absence of a brominated and/or chlorinated flame retardant, may achieve a UL94 V0 rating at a thickness of: 3.0 mm (±10%) or less, 2.9 mm (±10%) or less, 2.8 mm (±10%) or less, 2.7 mm (±10%) or less, 2.6 mm (±10%) or less, 2.5 mm (±10%), 2.4 mm (±10%) or less, 2.3 mm (±10%) or less, 2.2 mm (±10%) or less, 2.1 mm (±10%) or less, 2.0 mm (±10%), 1.9 mm (±10%) or less, 1.8 mm (±10%) or less, 1.7 mm (±10%) or less, 1.6 mm (±10%) or less, 1.5 mm (±10%), 1.4 mm (±10%) or less, 1.3 mm (±10%) or less, 1.2 mm (±10%) or less, 1.1 mm (±10%) or less, or 1.0 mm (±10%) or less. A flame bar comprising the composition may demonstrate a high probability of first time pass (pFTP) of the UL94 V0 test at a thickness of: 3.0 mm (±10%) or less, 2.9 mm (±10%) or less, 2.8 mm (±10%) or less, 2.7 mm (±10%) or less, 2.6 mm (±10%) or less, 2.5 mm (±10%), 2.4 mm (±10%) or less, 2.3 mm (±10%) or less, 2.2 mm (±10%) or less, 2.1 mm (±10%) or less, 2.0 mm (±10%), 1.9 mm (±10%) or less, 1.8 mm (±10%) or less, 1.7 mm (±10%) or less, 1.6 mm (±10%) or less, 1.5 mm (±10%), 1.4 mm (±10%) or less, 1.3 mm (±10%) or less, 1.2 mm (±10%) or less, 1.1 mm (±10%) or less, or 1.0 mm (±10%) or less.

A material comprising the composition may be UL94 5VA compliant. A plaque comprising the composition may achieve a UL94 5VA rating. A plaque comprising the composition, optionally in the absence of a brominated and/or chlorinated flame retardant, may achieve a UL94 5VA rating at a thickness of: 3.0 mm (±10%) or less, 2.9 mm (±10%) or less, 2.8 mm (±10%) or less, 2.7 mm (±10%) or less, 2.6 mm (±10%) or less, 2.5 mm (±10%), 2.4 mm (±10%) or less, 2.3 mm (±10%) or less, 2.2 mm (±10%) or less, 2.1 mm (±10%) or less, 2.0 mm (±10%), 1.9 mm (±10%) or less, 1.8 mm (±10%) or less, 1.7 mm (±10%) or less, 1.6 mm (±10%) or less, 1.5 mm (±10%), 1.4 mm (±10%) or less, 1.3 mm (±10%) or less, 1.2 mm (±10%) or less, 1.1 mm (±10%) or less, or 1.0 mm (±10%) or less.

A material comprising the composition may be transparent. A plaque comprising the composition may have a transparency of: 70% or greater, 71% or greater, 72% or greater, 73% or greater, 74% or greater, 75% or greater, 76% or greater, 77% or greater, 78% or greater, 79% or greater, 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater, 95% or greater, 96% or greater, 97% or greater, 98% or greater, 99% or greater, 99.1 or greater, 99.2 or greater, 99.3 or greater, 99.4 or greater, 99.5 or greater, 99.6 or greater, 99.7 or greater, 99.8 or greater, 99.9 or greater, or 100%. The transparency may be measured according to ASTM-D1003-00 at a thickness of 2.0 mm, 2.2 mm, 2.4 mm, 2.6 mm, 2.8 mm, 3.0 mm, 3.2 mm, 3.4 mm, 3.6 mm, 3.8 mm, or 4.0 mm.

A plaque comprising the composition may have a transparency of: 70% to 100%, 70% to 99%, 70% to 98%, 70% to 97%, 70% to 96%, 70% to 95%, 70% to 94%, 70% to 93%, 70% to 92%, 70% to 91%, 70% to 90%, 75% to 100%, 75% to 99%, 75% to 98%, 75% to 97%, 75% to 96%, 75% to 95%, 75% to 94%, 75% to 93%, 75% to 92%, 75% to 91%, 75% to 90%, 80% to 100%, 80% to 99%, 80% to 98%, 80% to 97%, 80% to 96%, 80% to 95%, 80% to 94%, 80% to 93%, 80% to 92%, 80% to 91%, 80% to 90%, 85% to 100%, 85% to 99%, 85% to 98%, 85% to 97%, 85% to 96%, 85% to 95%, 85% to 94%, 85% to 93%, 85% to 92%, 85% to 91%, 85% to 90%, 90% to 100%, 90% to 99%, 90% to 98%, 90% to 97%, 90% to 96%, 90% to 95%, 90% to 94%, 90% to 93%, 90% to 92%, 90% to 91%, 91% to 100%, 92% to 100%, 93% to 100%, 94% to 100%, 95% to 100%, 96% to 100%, 97% to 100%, 98% to 100%, or 99% to 100%. The transparency may be measured according to ASTM-D1003-00 at a thickness of 2.0 mm, 2.2 mm, 2.4 mm, 2.6 mm, 2.8 mm, 3.0 mm, 3.2 mm, 3.4 mm, 3.6 mm, 3.8 mm, or 4.0 mm.

A plaque comprising the composition may have a haze value of: less than 10%, less than 9%, less than 8%, less than 7%, less than 6%, less than 5%, less than 4%, less than 3%, less than 2%, or less than 1%. A plaque comprising the composition may have a haze value of: about 0% to about 10%, about 0% to about 9%, about 0% to about 8%, about 0% to about 7%, about 0% to about 6%, about 0% to about 5%, about 0% to about 4%, about 0% to about 3%, about 0% to about 2%, about 0% to about 1%, about 1% to about 10%, about 2% to about 10%, about 3% to about 10%, about 4% to about 10%, about 5% to about 10%, about 6% to about 10%, about 7% to about 10%, about 8% to about 10%, or about 9% to about 10%. The haze value may be measured according to ASTM D1003-00 at a thickness of 2.0 mm, 2.2 mm, 2.4 mm, 2.6 mm, 2.8 mm, 3.0 mm, 3.2 mm, 3.4 mm, 3.6 mm, 3.8 mm, or 4.0 mm.

An ASTM part comprising the composition may have full ductility under multiaxial impact test conditions per ASTM D3763 at −30° C. determined using a 4-inch (10 cm) diameter, 3.2 millimeter (mm)-thick disk sample, ½-inch (12.7 mm) diameter dart, and an impact velocity of 3.3 meters per second (m/s).

A material comprising the composition may exhibit extreme chemical resistance (e.g., resistance to cracking or shrinking upon exposure to a solvent such as acetone or toluene). An ASTM part comprising the composition may have an elongation at break of at least 100% after exposure to acetone under 1% strain.

A material comprising the composition may contain an insoluble methylene chloride insoluble fraction. The material may contain at least 5 wt % of an insoluble methylene chloride fraction in a 1 mm thick film.

The compositions comprising a cross-linked polycarbonate may have a weight average molecular weight (Mw) of about 18,000 to about 200,000 Daltons [±1,000 Daltons], of about 25,000 to about 120,000 Daltons [±1,000 Daltons], of about 30,000 to about 100,000 Daltons [±1,000 Daltons], or of about 35,000 to about 80,000 Daltons [±1,000 Daltons]. In certain embodiments, the cross-linked polycarbonates have weight average molecular weights of about 22,000 Daltons [±1,000 Daltons], about 23,000 Daltons [±1,000 Daltons], about 24,000 Daltons [±1,000 Daltons], about 25,000 Daltons [±1,000 Daltons], about 26,000 Daltons [±1,000 Daltons], about 27,000 Daltons [±1,000 Daltons], about 28,000 Daltons [±1,000 Daltons], about 29,000 Daltons [±1,000 Daltons], about 30,000 Daltons [±1,000 Daltons], about 31,000 Daltons [±1,000 Daltons], about 32,000 Daltons [±1,000 Daltons], about 33,000 Daltons [±1,000 Daltons], about 34,000 Daltons [±1,000 Daltons], about 35,000 Daltons [±1,000 Daltons], about 36,000 Daltons [±1,000 Daltons], about 37,000 Daltons [±1,000 Daltons], about 38,000 Daltons [±1,000 Daltons], about 39,000 Daltons [±1,000 Daltons], about 40,000 Daltons [±1,000 Daltons], about 41,000 Daltons [±1,000 Daltons], about 42,000 Daltons [±1,000 Daltons], about 43,000 Daltons [±1,000 Daltons], about 44,000 Daltons [±1,000 Daltons], about 45,000 Daltons [±1,000 Daltons], about 46,000 Daltons [±1,000 Daltons], about 47,000 Daltons [±1,000 Daltons], about 48,000 Daltons [±1,000 Daltons], about 49,000 Daltons [±1,000 Daltons], about 50,000 Daltons [±1,000 Daltons], about 51,000 Daltons [±1,000 Daltons], about 52,000 Daltons [±1,000 Daltons], about 53,000 Daltons [±1,000 Daltons], about 54,000 Daltons [±1,000 Daltons], about 55,000 Daltons [±1,000 Daltons], about 56,000 Daltons [±1,000 Daltons], about 57,000 Daltons [±1,000 Daltons], about 58,000 Daltons [±1,000 Daltons], about 59,000 Daltons [±1,000 Daltons], about 60,000 Daltons [±1,000 Daltons], about 61,000 Daltons [±1,000 Daltons], about 62,000 Daltons [±1,000 Daltons], about 63,000 Daltons [±1,000 Daltons], about 64,000 Daltons [±1,000 Daltons], about 65,000 Daltons [±1,000 Daltons], about 66,000 Daltons [±1,000 Daltons], about 67,000 Daltons [±1,000 Daltons], about 68,000 Daltons [±1,000 Daltons], about 69,000 Daltons [±1,000 Daltons], about 70,000 Daltons [±1,000 Daltons], about 71,000 Daltons [±1,000 Daltons], about 72,000 Daltons [±1,000 Daltons], about 73,000 Daltons [±1,000 Daltons], about 74,000 Daltons [±1,000 Daltons], about 75,000 Daltons [±1,000 Daltons], about 76,000 Daltons [±1,000 Daltons], about 77,000 Daltons [±1,000 Daltons], about 78,000 Daltons [±1,000 Daltons], about 79,000 Daltons [±1,000 Daltons], about 80,000 Daltons [±1,000 Daltons], about 81,000 Daltons [±1,000 Daltons], about 82,000 Daltons [±1,000 Daltons], about 83,000 Daltons [±1,000 Daltons], about 84,000 Daltons [±1,000 Daltons], about 85,000 Daltons [±1,000 Daltons], about 86,000 Daltons [±1,000 Daltons], about 87,000 Daltons [±1,000 Daltons], about 88,000 Daltons [±1,000 Daltons], about 89,000 Daltons [±1,000 Daltons], about 90,000 Daltons [±1,000 Daltons], about 91,000 Daltons [±1,000 Daltons], about 92,000 Daltons [±1,000 Daltons], about 93,000 Daltons [±1,000 Daltons], about 94,000 Daltons [±1,000 Daltons], about 95,000 Daltons [±1,000 Daltons], about 96,000 Daltons [±1,000 Daltons], about 97,000 Daltons [±1,000 Daltons], about 98,000 Daltons [±1,000 Daltons], about 99,000 Daltons [±1,000 Daltons], about 100,000 Daltons [±1,000 Daltons], about 101,000 Daltons [±1,000 Daltons], about 102,000 Daltons [±1,000 Daltons], about 103,000 Daltons [±1,000 Daltons], about 104,000 Daltons [±1,000 Daltons], about 105,000 Daltons [±1,000 Daltons], about 106,000 Daltons [±1,000 Daltons], about 107,000 Daltons [±1,000 Daltons], about 108,000 Daltons [±1,000 Daltons], about 109,000 Daltons [±1,000 Daltons], about 110,000 Daltons [±1,000 Daltons], about 111,000 Daltons [±1,000 Daltons], about 112,000 Daltons [±1,000 Daltons], about 113,000 Daltons [±1,000 Daltons], about 114,000 Daltons [±1,000 Daltons], about 115,000 Daltons [±1,000 Daltons], about 116,000 Daltons [±1,000 Daltons], about 117,000 Daltons [±1,000 Daltons], about 118,000 Daltons [±1,000 Daltons], about 119,000 Daltons [±1,000 Daltons], about 120,000 Daltons [±1,000 Daltons], about 121,000 Daltons [±1,000 Daltons], about 122,000 Daltons [±1,000 Daltons], about 123,000 Daltons [±1,000 Daltons], about 124,000 Daltons [±1,000 Daltons], or about 125,000 Daltons [±1,000 Daltons]. Molecular weight determinations may be performed using gel permeation chromatography (GPC), using a cross-linked styrene-divinylbenzene column and calibrated to polycarbonate references using a UV-VIS detector set at 264 nm. Samples may be prepared at a concentration of about 1 mg/ml, and eluted at a flow rate of about 1.0 ml/min.

(A) Cross-Linkable Polycarbonates

The compositions comprising a cross-linked polycarbonate are derived from one or more cross-linkable polycarbonates (also referred to as "non-cross-linked polycarbonates"), said cross-linkable polycarbonates comprising a monohydroxybenzophenone derived endcap content. The cross-linkable polycarbonates may comprise about 0.5 mol % to about 5 mol % endcap groups derived from a monohydroxybenzophenone, about 1 mol % to about 3 mol % endcap groups derived from a monohydroxybenzophenone, about 1.7 mol % to about 2.5 mol % endcap groups derived from a monohydroxybenzophenone, about 2 mol % to about 2.5 mol % endcap groups derived from a monohydroxybenzophenone, or about 2.5 mol % to about 3.0 mol % endcap groups derived from a monohydroxybenzophenone. The cross-linkable polycarbonates may have a monohydroxybenzophenone derived endcap content of: 0.5 mol %, 0.6 mol %, 0.7 mol %, 0.8 mol %, 0.9 mol %, 1.0 mol %, 1.1 mol %, 1.2 mol %, 1.3 mol %, 1.4 mol %, 1.5 mol %, 1.6 mol %, 1.7 mol %, 1.8 mol %, 1.9 mol %, 2.0 mol %, 2.1 mol %, 2.2 mol %, 2.3 mol %, 2.4 mol %, 2.5 mol %, 2.6 mol %, 2.7 mol %, 2.8 mol %, 2.9 mol %, 3.0 mol %, 3.1 mol %, 3.2 mol %, 3.3 mol %, 3.4 mol %, 3.5 mol %, 3.6 mol %, 3.7 mol %, 3.8 mol %, 3.9 mol %, 4.0 mol %, 4.1 mol %, 4.2 mol %, 4.3 mol %, 4.4 mol %, 4.5 mol %, 4.6 mol %, 4.7 mol %, 4.8 mol %, 4.9 mol %, or 5.0 mol %.

The cross-linkable polycarbonates disclosed herein may be cross-linked using a variety of cross-linking methods. In certain embodiments, the polycarbonates may be cross-linked by exposure to ultra-violet (UV) radiation. In certain embodiments, the polycarbonates may be cross-linked by exposure to radiation emitted by the sun (e.g., UV-radiation). In certain embodiments, the polycarbonates may be cross-linked by exposure to an electron beam. In certain embodiments, the polycarbonates are not cross-linked using gamma radiation. In certain embodiments, the polycarbonates cannot be cross-linked using gamma radiation. In certain embodiments, the polycarbonates are not cross-linked using an electron beam. In certain embodiments, the polycarbonates cannot be cross-linked using an electron beam.

The cross-linkable polycarbonates may be cross-linked using any suitable dosage of UV-radiation and any suitable radiation source. In certain embodiments, the cross-linkable polycarbonates are cross-linked by exposing the polycarbonates to a dosage of UV-radiation. The appropriate dose maybe obtained by one or multiple passes under a UV source or by a single pass through a chamber with multiple UV sources or any combination thereof. It may also be advangteous to cross-link the polycarbonates by exposing the polycarbonates to the sun.

In certain embodiments, the polycarbonates are cross-linked by exposure to UV-radiation from a 9 mm D bulb from Fusion UV systems, Inc., having output specifications of about 796.5 Watts from 201 nm to 600 nm. In certain embodiments, the polycarbonates are cross-linked by exposure to UV-radiation from a 9 mm D bulb having out specifications of 505 Watts from 201 nm to 400 nm, 657 Watts from 201 nm to 450 nm, 291 Watts from 401 nm to 600 nm, and/or 35 Watts from 601 nm to 850 nm.

In certain embodiments, the polycarbonates are cross-linked by passing the polycarbonates through a UV-oven or under a UV-lamp one or more times. In certain embodiments, a material comprising the cross-linkable polycarbonate is passed through a UV-oven or under a UV-lamp or bank of UV-lamps 1 to 10 times, 2 to 8 times, or 3 to 6 times. In certain embodiments, a material comprising the polycarbonate is passed through a UV-oven or under a UV-lamp one time, two times, three times, four times, or five times.

In certain embodiments, the polycarbonates are cross-linked by sun exposure. In certain embodiments, the polycarbonates are cross-linked by sun exposure for a time period greater than zero hours. In certain embodiments, the polycarbonates are cross-linked by sun exposure for a time period greater than or equal to four hours. In certain embodiments, the polycarbonates are cross-linked by sun exposure for a time period greater than or equal to twenty-four hours. In certain embodiments, the polycarbonates are cross-linked by sun exposure for a time period greater than or equal to forty-eight hours. In certain embodiments, the polycarbonates are cross-linked by sun exposure for a time period greater than or equal to seventy-two hours. In certain embodiments, the polycarbonates are cross-linked by sun exposure for a time period greater than or equal to one-hundred forty-four hours. In certain embodiments, the polycarbonates are cross-linked by sun exposure for a time period greater than or equal to three-hundred sixty hours. In certain embodiments, the polycarbonates are cross-linked by sun exposure for a time period ranging from about 4 hours to about 360 hours. In certain embodiments, the polycarbonates are cross-linked by sun exposure for a time period of about 4 hours, about 24 hours, about 48 hours, about 72 hours, about 144 hours, or about 360 hours.

Cross-linking may be affected to a desired depth of a material comprising the cross-linkable polycarbonates, such as an article injection-molded from the cross-linkable polycarbonate. In certain embodiments, the depth of cross-linking, as measured from an outer surface of the material, may be 30 microns or less, 25 microns or less, 20 microns or less, 15 microns or less, 10 microns or less, or 5 microns or less. In certain embodiments, the depth of cross-linking, as measured from an outer surface of the material, may be 30 microns or less, 29 microns or less, 28 microns or less, 27 microns or less, 26 microns or less, 25 microns or less, 24 microns or less, 23 microns or less, 22 microns or less, 21 microns or less, 20 microns or less, 19 microns or less, 18 microns or less, 17 microns or less, 16 microns or less, 15 microns or less, 14 microns or less, 13 microns or less, 12 microns or less, 11 microns or less, 10 microns or less, 9 microns or less, 8 microns or less, 7 microns or less, 6 microns or less, 5 microns or less, 4 microns or less, 3 microns or less, 2 microns or less, or 1 micron or less. The depth of cross-linking can be determined by field emission microscopy or by FTIR by the loss of the benzophenone ketone, for example.

The depth of cross-linking can be attenuated by the dosage of UV-radiation. Other factors that may effect the depth of cross-linking include structural variation of the polycarbonate comprising the monohydroxybenzophenone endcap, the nature of the other components that may be in the composition to be cross-linked, and the method of cross-linking and variables associated therewith.

The cross-linkable polycarbonates of the invention include homopolycarbonates, copolymers comprising different moieties in the carbonate (referred as "copolycarbonates"), copolymers comprising carbonate units and other types of polymer units such as polyester units, polysiloxane units, and combinations comprising at least one homopolycarbonate and copolycarbonate.

The cross-linkable polycarbonate may thus comprise identical or different repeating units derived from one or more monomers (e.g. a second, third, fourth, fifth, sixth, etc., other monomer compound). The monomers of the cross-linkable polycarbonate may be randomly incorporated into the polycarbonate. For example, a cross-linkable polycarbonate copolymer of the invention may be arranged in an alternating sequence following a statistical distribution, which is independent of the mole ratio of the structural units present in the polymer chain. A random cross-linkable polycarbonate copolymer may have a structure, which can be indicated by the presence of several block sequences (I-I) and (O-O) and alternate sequences (I-O) or (O-I), that follow a statistical distribution. In a random x:(1-x) copolymer, wherein x is the mole percent of a first monomer(s) and 1-x is the mole percent of the monomers, one can calculate the distribution of each monomer using peak area values determined by $^{13}C$ NMR, for example.

A cross-linkable polycarbonate copolymer of the invention may have alternating I and O units (-I-O-I-O-I-O-I-O-), or I and O units arranged in a repeating sequence (e.g. a periodic copolymer having the formula: (I-O-I-O-O-I--I-I-O-O-O)n). The cross-linkable polycarbonate copolymer may be a statistical copolymer in which the sequence of monomer residues follows a statistical rule. For example, if the probability of finding a given type monomer residue at a particular point in the chain is equal to the mole fraction of that monomer residue in the chain, then the polymer may be referred to as a truly random copolymer. The cross-linkable polycarbonate copolymer may be a block copolymer that comprises two or more homopolymer subunits linked by covalent bonds (-I-I-I-I-I-O-O-O-O-O-). The union of the homopolymer subunits may require an intermediate non-repeating subunit, known as a junction block. Block copolymers with two or three distinct blocks are called diblock copolymers and triblock copolymers, respectively.

The cross-linkable polycarbonates of the invention may include any suitable mole % of selected monomer units, with the proviso that the polycarbonates comprise a mol % (e.g., about 0.5 mol % to about 5 mol %) of endcap groups derived from a monohydroxybenzophenone. The polymers may comprise about 1% to about 99.5%, about 5% to about 95%, about 10% to about 90%, about 15% to about 85%, about 20% to about 80%, about 25% to about 75%, about 30% to about 70%, about 35% to about 65%, about 40% to about 60%, or about 45% to about 55% mole % of a selected monomer unit.

The cross-linkable polycarbonates of the invention may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C. In certain embodiments, the polycarbonates have glass transition temperatures of 149.0° C., 149.1° C., 149.2° C., 149.3° C., 149.4° C., 149.5° C., 149.6° C., 149.7° C., 149.8° C., 149.9° C., 150.0° C., 150.1° C., 150.2° C., 150.3° C., 150.4° C., 150.5° C., 150.6° C., 150.7° C., 150.8° C., 150.9° C., 151.0° C., 151.1° C., 151.2° C., 151.3° C., 151.4° C., 151.5° C., 151.6° C., 151.7° C., 151.8° C., 151.9° C., 152.0° C., 152.1° C., 152.2° C., 152.3° C., 152.4° C., 152.5° C., 152.6° C., 152.7° C., 152.8° C., 152.9° C., or 153.0° C.

The cross-linkable polycarbonates of the invention may have a weight average molecular weight (Mw) of about 1,500 to about 150,000 Daltons [±1,000 Daltons], of about 10,000 to about 50,000 Daltons [±1,000 Daltons], of about 15,000 to about 35,000 Daltons [±1,000 Daltons], or of about 20,000 to about 30,000 Daltons [±1,000 Daltons]. In certain embodiments, the cross-linkable polycarbonates have weight average molecular weights of about 15,000 Daltons [±1,000 Daltons], about 16,000 Daltons [±1,000 Daltons], about 17,000 Daltons [±1,000 Daltons], about 18,000 Daltons [±1,000 Daltons], about 19,000 Daltons [±1,000 Daltons], about 20,000 Daltons [±1,000 Daltons], about 21,000 Daltons [±1,000 Daltons], about 22,000 Daltons [±1,000 Daltons], about 23,000 Daltons [±1,000 Daltons], about 24,000 Daltons [±1,000 Daltons], about 25,000 Daltons [±1,000 Daltons], about 26,000 Daltons [±1,000 Daltons], about 27,000 Daltons [±1,000 Daltons], about 28,000 Daltons [±1,000 Daltons], about 29,000 Daltons [±1,000 Daltons], about 30,000 Daltons [±1,000 Daltons], about 31,000 Daltons [±1,000 Daltons], about 32,000 Daltons [±1,000 Daltons], about 33,000 Daltons [±1,000 Daltons], about 34,000 Daltons [±1,000 Daltons], or about 35,000 Daltons [±1,000 Daltons]. Molecular weight determinations may be performed using gel permeation chromatography (GPC), using a cross-linked styrene-divinylbenzene column and calibrated to polycarbonate references using a UV-VIS detector set at 264 nm. Samples may be prepared at a concentration of about 1 mg/ml, and eluted at a flow rate of about 1.0 ml/min.

The cross-linkable polycarbonates of the invention may have a polydispersity index (PDI) of about 1.0 to about 10.0, about 2.0 to about 7.0, or about 3.0 to about 6.0. In certain embodiments, the polycarbonates have PDIs of about 2.50, about 3.00, about 3.50, about 4.00, about 4.50, about 5.00, about 5.50, about 6.00, about 6.50, about 7.00, or about 7.50.

The cross-linkable polycarbonates of the invention may have a melt volume flow rate (often abbreviated MVR), which measures the rate of extrusion of a composition through an orifice at a prescribed temperature and load. In certain embodiments, the polycarbonates may have an MVR of 2 to 70 cm$^3$/10 min, 2 to 50 cm$^3$/10 min, 2 to 40 cm$^3$/10 min, 2 to 30 cm$^3$/10 min, 2 to 25 cm$^3$/10 min, 2 to 20 cm$^3$/10 min, 5 to 70 cm$^3$/10 min, 5 to 50 cm$^3$/10 min, 5 to 40 cm$^3$/10 min, 5 to 30 cm$^3$/10 min, 5 to 25 cm$^3$/10 min, 5 to 20 cm$^3$/10 min, 10 to 170 cm$^3$/10 min, 10 to 50 cm$^3$/10 min, 10 to 40 cm$^3$/10 min, 10 to 30 cm$^3$/10 min, 10 to 25 cm$^3$/10 min, or 10 to 20 cm$^3$/10 min, using the ASTM D1238 method, 1.2 kg load, 300° C. temperature, 360 second dwell. In certain embodiments, the polycarbonates may have an MVR measured using the ASTM D1238 method, 1.2 kg load, 300° C. temperature, 360 second dwell, of: 2.0 cm$^3$/10 min, 2.1 cm$^3$/10 min, 2.2 cm$^3$/10 min, 2.3 cm$^3$/10 min, 2.4 cm$^3$/10 min, 2.5 cm$^3$/10 min, 2.6 cm$^3$/10 min, 2.7 cm$^3$/10 min, 2.8 cm$^3$/10 min, 2.9 cm$^3$/10 min, 3.0 cm$^3$/10 min, 3.1 cm$^3$/10 min, 3.2 cm$^3$/10 min, 3.3 cm$^3$/10 min, 3.4 cm$^3$/10 min, 3.5 cm$^3$/10 min, 3.6 cm$^3$/10 min, 3.7 cm$^3$/10 min, 3.8 cm$^3$/10 min, 3.9 cm$^3$/10 min, 4.0 cm$^3$/10 min, 4.1 cm$^3$/10 min, 4.2 cm$^3$/10 min, 4.3 cm$^3$/10 min, 4.4 cm$^3$/10 min, 4.5 cm$^3$/10 min, 4.6 cm$^3$/10 min, 4.7 cm$^3$/10 min, 4.8 cm$^3$/10 min, 4.9 cm$^3$/10 min, 5.0 cm$^3$/10 min, 5.1 cm$^3$/10 min, 5.2 cm$^3$/10 min, 5.3 cm$^3$/10 min, 5.4 cm$^3$/10 min, 5.5 cm$^3$/10 min, 5.6 cm$^3$/10 min, 5.7 cm$^3$/10 min, 5.8 cm$^3$/10 min, 5.9 cm$^3$/10 min, 6.0 cm$^3$/10 min, 6.1 cm$^3$/10 min, 6.2 cm$^3$/10 min, 6.3 cm$^3$/10 min, 6.4 cm$^3$/10 min, 6.5 cm$^3$/10 min, 6.6 cm$^3$/10 min, 6.7 cm$^3$/10 min, 6.8 cm$^3$/10 min, 6.9 cm$^3$/10 min, 7.0 cm$^3$/10 min, 7.1 cm$^3$/10 min, 7.2 cm$^3$/10 min 7.3 cm$^3$/10 min, 7.4 cm$^3$/10 min, 7.5 cm$^3$/10 min, 7.6 cm$^3$/10 min, 7.7 cm$^3$/10 min, 7.8 cm$^3$/10 min, 7.9 cm$^3$/10 min, 8.0 cm$^3$/10 min, 8.1 cm$^3$/10 min, 8.2 cm$^3$/10 min, 8.3 cm$^3$/10 min, 8.4 cm$^3$/10 min, 8.5 cm$^3$/10 min, 8.6 cm$^3$/10 min, 8.7 cm$^3$/10 min, 8.8 cm$^3$/10 min, 8.9 cm$^3$/10 min, 9.0 cm$^3$/10 min, 9.1 cm$^3$/10 min, 9.2 cm$^3$/10 min, 9.3 cm$^3$/10 min, 9.4 cm$^3$/10 min, 9.5 cm$^3$/10 min, 9.6 cm$^3$/10 min, 9.7 cm$^3$/10 min, 9.8 cm$^3$/10 min, 9.9 cm$^3$/10 min, 10.0 cm$^3$/10 min, 10.1 cm$^3$/10 min, 10.2 cm$^3$/10 min, 10.3 cm$^3$/10 min, 10.4 cm$^3$/10 min, 10.5 cm$^3$/10 min, 10.6 cm$^3$/10 min, 10.7 cm$^3$/10 min, 10.8 cm$^3$/10 min, 10.9 cm$^3$/10 min, 11.0 cm$^3$/10 min, 11.1 cm$^3$/10 min, 11.2 cm$^3$/10 min, 11.3 cm$^3$/10 min, 11.4 cm$^3$/10 min, 11.5 cm$^3$/10 min, 11.6 cm$^3$/10 min, 11.7 cm$^3$/10 min, 11.8 cm$^3$/10 min, 11.9 cm$^3$/10 min, 12.0 cm$^3$/10 min, 12.1 cm$^3$/10 min, 12.2 cm$^3$/10 min, 12.3 cm$^3$/10 min, 12.4 cm$^3$/10 min, 12.5 cm$^3$/10 min, 12.6 cm$^3$/10 min, 12.7 cm$^3$/10 min, 12.8 cm$^3$/10 min, 12.9 cm$^3$/10 min, 13.0 cm$^3$/10 min, 13.1 cm$^3$/10 min, 13.2 cm$^3$/10 min, 13.3 cm$^3$/10 min, 13.4 cm$^3$/10 min, 13.5 cm$^3$/10 min, 13.6 cm$^3$/10 min, 13.7 cm$^3$/10 min, 13.8 cm$^3$/10 min, 13.9 cm$^3$/10 min, 14.0 cm$^3$/10 min, 14.1 cm$^3$/10 min, 14.2 cm$^3$/10 min, 14.3 cm$^3$/10 min, 14.4 cm$^3$/10 min. 14.5 cm$^3$/10 min, 14.6 cm$^3$/10 min, 14.7 cm$^3$/10 min, 14.8 cm$^3$/10 min, 14.9 cm$^3$/10 min, 15.0 cm$^3$/10 min, 15.1 cm$^3$/10 min, 15.2 cm$^3$/10 min, 15.3 cm$^3$/10 min, 15.4 cm$^3$/10 min, 15.5 cm$^3$/10 min, 15.6 cm$^3$/10 min, 15.7 cm$^3$/10 min, 15.8 cm$^3$/10 min, 15.9 cm$^3$/10 min, 16.0 cm$^3$/10 min, 16.1 cm$^3$/10 min, 16.2 cm$^3$/10 min, 16.3 cm$^3$/10 min, 16.4 cm$^3$/10 min, 16.5 cm$^3$/10 min, 16.6 cm$^3$/10 min, 16.7 cm$^3$/10 min, 16.8 cm$^3$/10 min, 16.9 cm$^3$/10 min, 17.0 cm$^3$/10 min, 17.1 cm$^3$/10 min, 17.2 cm$^3$/10 min, 17.3 cm$^3$/10 min, 17.4 cm$^3$/10 min, 17.5 cm$^3$/10 min, 17.6 cm$^3$/10 min, 17.7 cm$^3$/10 min, 17.8 cm$^3$/10 min, 17.9 cm$^3$/10 min, 18.0 cm$^3$/10 min, 18.1 cm$^3$/10 min, 18.2 cm$^3$/10 min, 18.3 cm$^3$/10 min, 18.4 cm$^3$/10 min, 18.5 cm$^3$/10 min, 18.6 cm$^3$/10 min 18.7 cm$^3$/10 min, 18.8 cm$^3$/10 min, 18.9 cm$^3$/10 min, 19.0 cm$^3$/10 min, 19.1 cm$^3$/10 min, 19.2 cm$^3$/10 min, 19.3 cm$^3$/10 min, 19.4 cm$^3$/10 min, 19.5 cm$^3$/10 min, 19.6 cm$^3$/10 min, 19.7 cm$^3$/10 min, 19.8 cm$^3$/10 min, 19.9 cm$^3$/10 min, 20.0 cm$^3$/10 min, 20.1 cm$^3$/10 min, 20.2 cm$^3$/10 min, 20.3 cm$^3$/10 min, 20.4 cm$^3$/10 min, 20.5 cm$^3$/10 min, 20.6 cm$^3$/10 min, 20.7 cm$^3$/10 min, 20.8 cm$^3$/10 min, 20.9 cm$^3$/10 min, 21.0 cm$^3$/10 min, 21.1 cm$^3$/10 min, 21.2 cm$^3$/10 min, 21.3 cm$^3$/10 min, 21.4 cm$^3$/10 min, 21.5 cm$^3$/10 min, 21.6 cm$^3$/10 min, 21.7 cm$^3$/10 min, 21.8 cm$^3$/10 min, 21.9 cm$^3$/10 min, 22.0 cm$^3$/10 min, 22.1 cm$^3$/10 min, 22.2 cm$^3$/10 min, 22.3 cm$^3$/10 min, 22.4 cm$^3$/10 min, 22.5 cm$^3$/10 min, 22.6 cm$^3$/10 min, 22.7 cm$^3$/10 min, 22.8 cm$^3$/10 min, 22.9 cm$^3$/10 min, 23.0 cm$^3$/10 min, 23.1 cm$^3$/10 min, 23.2 cm$^3$/10 min, 23.3 cm$^3$/10 min, 23.4 cm$^3$/10 min, 23.5 cm$^3$/10 min, 23.6 cm$^3$/10 min, 23.7 cm$^3$/10 min, 23.8 cm$^3$/10 min, 23.9 cm$^3$/10 min, 24.0 cm$^3$/10 min, 24.1 cm$^3$/10 min, 24.2 cm$^3$/10 min, 24.3 cm$^3$/10 min, 24.4 cm$^3$/10 min, 24.5 cm$^3$/10 min, 24.6 cm$^3$/10 min, 24.7 cm$^3$/10 min, 24.8 cm$^3$/10 min, 24.9 cm$^3$/10 min, 25.0 cm$^3$/10 min, 25.1 cm$^3$/10 min, 25.2 cm$^3$/10 min, 25.3 cm$^3$/10 min, 25.4 cm$^3$/10 min, 25.5 cm$^3$/10 min, 25.6 cm$^3$/10 min, 25.7 cm$^3$/10 min, 25.8 cm$^3$/10 min, 25.9 cm$^3$/10 min, 26.0 cm$^3$/10 min, 26.1 cm$^3$/10 min, 26.2 cm$^3$/10 min, 26.3 cm$^3$/10 min, 26.4 cm$^3$/10 min, 26.5 cm$^3$/10 min, 26.6 cm$^3$/10 min, 26.7 cm$^3$/10 min, 26.8 cm$^3$/10 min, 26.9 cm$^3$/10 min, 27.0 cm$^3$/10 min, 27.1 cm$^3$/10 min, 27.2 cm$^3$/10 min, 27.3 cm$^3$/10 min, 27.4 cm$^3$/10 min, 27.5 cm$^3$/10 min, 27.6 cm$^3$/10 min, 27.7 cm$^3$/10 min, 27.8 cm$^3$/10 min, 27.9 cm$^3$/10 min, 28.0 cm$^3$/10 min, 28.1 cm$^3$/10 min, 28.2 cm$^3$/10 min, 28.3 cm$^3$/10 min, 28.4 cm$^3$/10 min, 28.5 cm$^3$/10 min, 28.6 cm$^3$/10 min, 28.7 cm$^3$/10 min, 28.8 cm$^3$/10 min, 28.9 cm$^3$/10 min, 29.0 cm$^3$/10 min, 29.1 cm$^3$/10 min, 29.2 cm$^3$/10 min, 29.3 cm$^3$/10 min, 29.4 cm$^3$/10 min, 29.5 cm$^3$/10 min, 29.6 cm$^3$/10 min, 29.7 cm³/10 min, 29.8 cm³/10 min, 29.9 cm³/10 min, 30.0 cm³/10 min, 30.1 cm³/10 min, 30.2 cm³/10 min, 30.3 cm³/10 min, 30.4 cm³/10 min, 30.5 cm³/10 min, 30.6 cm³/10 min, 30.7 cm³/10 min, 30.8 cm³/10 min, 30.9 cm³/10 min, 31.0 cm³/10 min, 31.1 cm³/10 min, 31.2 cm³/10 min, 31.3 cm³/10 min, 31.4 cm³/10 min, 31.5 cm³/10 min, 31.6 cm³/10 min, 31.7 cm³/10 min, 31.8 cm³/10 min, 31.9 cm³/10 min, 32.0 cm³/10 min, 32.1 cm³/10 min, 32.2 cm³/10 min, 32.3 cm³/10 min, 32.4 cm³/10 min, 32.5 cm³/10 min, 32.6 cm³/10 min, 32.7 cm³/10 min, 32.8 cm³/10 min, 32.9 cm³/10 min, 33.0 cm³/10 min, 33.1 cm³/10 min, 33.2 cm³/10 min, 33.3 cm³/10 min, 33.4 cm³/10 min, 33.5 cm³/10 min, 33.6 cm³/10 min, 33.7 cm³/10 min, 33.8 cm³/10 min, 33.9 cm³/10 min, 34.0 cm³/10 min, 34.1 cm³/10 min, 34.2 cm³/10 min, 34.3 cm³/10 min, 34.4 cm³/10 min, 34.5 cm³/10 min, 34.6 cm³/10 min, 34.7 cm³/10 min, 34.8 cm³/10 min, 34.9 cm³/10 min, or 35.0 cm³/10 min.

The cross-linkable polycarbonates of the invention may have a biocontent of 2 weight % to 90 weight %; 5 weight % to 25 weight %; 10 weight % to 30 weight %; 15 weight % to 35 weight %; 20 weight % to 40 weight %; 25 weight % to 45 weight %; 30 weight % to 50 weight %; 35 weight % to 55 weight %; 40 weight % to 60 weight %; 45 weight % to 65 weight %; 55 weight % to 70% weight %; 60 weight % to 75 weight %; 50 weight % to 80 weight %; or 50 weight % to 90 weight %. The biocontent may be measured according to ASTM D6866.

The cross-linkable polycarbonates of the invention may have a modulus of elasticity of greater than or equal to 2200 megapascals (MPa), greater than or equal to 2310 MPa, greater than or equal to 2320 MPa, greater than or equal to 2330 MPa, greater than or equal to 2340 MPa, greater than or equal to 2350 MPa, greater than or equal to 2360 MPa, greater than or equal to 2370 MPa, greater than or equal to 2380 MPa, greater than or equal to 2390 MPa, greater than or equal to 2400 MPa, greater than or equal to 2420 MPa, greater than or equal to 2440 MPa, greater than or equal to 2460 MPa, greater than or equal to 2480 MPa, greater than or equal to 2500 MPa, or greater than or equal to 2520 MPa as measured by ASTM D 790 at 1.3 mm/min, 50 mm span.

In an embodiment the cross-linkable polycarbonates of the invention may have a flexural modulus of 2,200 to 2,500, preferably 2,250 to 2,450, more preferably 2,300 to 2,400 MPa.

In another embodiment the cross-linkable polycarbonates of the invention may have a flexural modulus of 2,300 to 2,600, preferably 2,400 to 2,600, more preferably 2,450 to 2,550 MPa.

The cross-linkable polycarbonates of the invention may have a tensile strength at break of greater than or equal to 60 megapascals (MPa), greater than or equal to 61 MPa, greater than or equal to 62 MPa, greater than or equal to 63 MPa, greater than or equal to 64 MPa, greater than or equal to 65 MPa, greater than or equal to 66 MPa, greater than or equal to 67 MPa, greater than or equal to 68 MPa, greater than or equal to 69 MPa, greater than or equal to 70 MPa, greater than or equal to 71 MPa, greater than or equal to 72 MPa, greater than or equal to 73 MPa, greater than or equal to 74 MPa, greater than or equal to 75 MPa as measured by ASTM D 638 Type I at 50 mm/min.

The cross-linkable polycarbonates of the invention may possess a ductility of greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D 256-10.

The cross-linkable polycarbonates of the invention may have a notched izod impact strength (NII) of greater than or equal to 500 J/m, greater than or equal to 550 J/m, greater than or equal to 600 J/m, greater than or equal to 650 J/m, greater than or equal to 700 J/m, greater than or equal to 750 J/m, greater than or equal to 800 J/m, greater than or equal to 850 J/m, greater than or equal to 900 µm, greater than or equal to 950 J/m, or greater than or equal to 1000 J/m, measured at 23° C. according to ASTM D 256.

The cross-linkable polycarbonates of the invention may have a heat distortion temperature of greater than or equal to 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D 648 at 1.82 MPa, with 3.2 mm thick unannealed mm bar.

The cross-linkable polycarbonates of the invention may have a percent haze value of less than or equal to 10.0%, less than or equal to 8.0%, less than or equal to 6.0%, less than or equal to 5.0%, less than or equal to 4.0%, less than or equal to 3.0%, less than or equal to 2.0%, less than or equal to 1.5%, less than or equal to 1.0%, or less than or equal to 0.5% as measured at a certain thickness according to ASTM D 1003-07. The polycarbonate haze may be measured at a 2.0, 2.2, 2.4, 2.6, 2.8, 3.0, 3.2, 3.4, 3.6, 3.8, or a 4.0 millimeter thickness. The polycarbonate may be measured at a 0.125 inch thickness. The polycarbonate may have a light transmittance greater than or equal to 50%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, greater than or equal to 96%, greater than or equal to 97%, greater than or equal to 98%, greater than or equal to 99%, greater than or equal to 99.1%, greater than or equal to 99.2%, greater than or equal to 99.3%, greater than or equal to 99.4%, greater than or equal to 99.5%, greater than or equal to 99.6%, greater than or equal to 99.7%, greater than or equal to 99.8%, or greater than or equal to 99.9%, as measured at certain thicknesses according to ASTM D 1003-07. The polycarbonate transparency may be measured at a 2.0, 2.2, 2.4, 2.6, 2.8, 3.0, 3.2, 3.4, 3.6, 3.8, or a 4.0 millimeter thickness.

In certain embodiments, the cross-linkable polycarbonates of the invention do not include soft block or soft aliphatic segments in the polycarbonate chain. For example, the following aliphatic soft segments that may be excluded from the cross-linkable polycarbonates of the invention include aliphatic polyesters, aliphatic polyethers, aliphatic polythioeithers, aliphatic polyacetals, aliphatic polycarbonates, C—C linked polymers and polysiloxanes. The soft segments of aliphatic polyesters, aliphatic polyethers, aliphatic polythioethers, aliphatic polyacetals, aliphatic polycarbonates may be characterized as having Number Average MWs (Mns) of greater than 600.

In certain embodiments, the cross-linkable polycarbonates of the invention do not include units derived from aromatic di-, tri-, or tetrahydroxyketones.

In certain embodiments, the cross-linkable polycarbonates of the invention do not include units derived from dihydroxybenzophenone monomers, trihydroxybenzophenone monomers, tetrahydroxybenzophenone monomers, or other multiple-hydroxybenzophenone monomers. For example, the following monomer units may be excluded from use in the cross-linkable and cross-linked polycarbonates of the invention: 4,4'-dihydroxybenzophenone, 2,4-dihydroxybenzophenone, and 4-(α,α-bis(4-hydroxyphenyl)ethyl-benzophenone.

(i) Homopolycarbonates/Copolycarbonates

The cross-linkable polycarbonate of the invention may be a homopolycarbonate or a copolycarbonate, provided that the cross-linkable polycarbonate comprises endcap groups derived from a monohydroxybenzophenone. The term "polycarbonate" and "polycarbonate resin" mean compositions having repeating structural carbonate units of the formula formula (1):

(1)

wherein $R^{100}$ may comprise any suitable organic group, such as an aliphatic, alicyclic, or aromatic group, or any combination thereof. In certain embodiments, $R^{100}$ in the carbonate units of formula (1) may be a $C_6$-$C_{36}$ aromatic group wherein at least one moiety is aromatic.

In certain embodiments, each $R^{100}$ may be an aromatic organic group, for example, a group of formula (2):

-$A^1$-$Y^1$-$A^2$-  (2)

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecyclidene, cyclododecylidene, and adamantylidene. The bridging group of $Y^1$ may be a hydrocarbon group or a saturated hydrocarbon group such as methylene, cyclohexylidene, or isopropylidene.

Each $R^{100}$ may be derived from a dihydroxy monomer unit. The dihydroxy monomer unit may have formula (3):

HO-$A^1$-$Y^1$-$A^2$-OH  (3)

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecyclidene, cyclododecylidene, and adamantylidene. The bridging group of $Y^1$ may be a hydrocarbon group or a saturated hydrocarbon group such as methylene, cyclohexlylidene, or isopropylidene.

The dihydroxy monomer unit of formula (3) may include bisphenol compounds of the general formula (4):

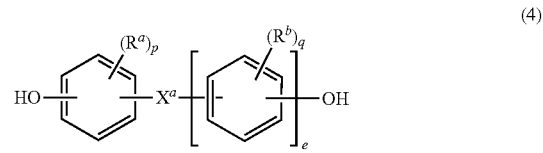

(4)

wherein $X^a$ may be a bridging group connecting the two hydroxy-substituted aromatic groups, where the bridging group and the hydroxy substituent of each $C_6$ arylene group are disposed ortho, meta, or para (specifically para) to each other on the $C_6$ arylene group. For example, the bridging group $X^a$ may be single bond, —O—, —S—, —C(O)—, or a $C_1$-$C_{18}$ organic group. The $C_1$-$C_{18}$ organic bridging group may be cyclic or acyclic, aromatic or non-aromatic, and can further comprise heteroatoms such as halogens, oxygen, nitrogen, sulfur, silicon, or phosphorous. The $C_1$-$C_{18}$ organic group can be disposed such that the $C_6$ arylene groups connected thereto are each connected to a common alkylidene carbon or to different carbons of the $C_1$-$C_{18}$ organic bridging group. $R^a$ and $R^b$ may each represent a halogen, $C_1$-$C_{12}$ alkyl group or combination thereof. For example, $R^a$ and $R^b$ may each be a $C_1$-$C_3$ alkyl group, specifically methyl, disposed meta to the hydroxy group on each arylene group. The designation (e) is 0 or 1. The numbers p and q are each independently integers of 0 to 4. It will be understood that $R^a$ is hydrogen when p is 0, and likewise $R^b$ is hydrogen when q is 0.

In certain embodiments, $X^a$ may be substituted or unsubstituted $C_3$-$C_{18}$ cycloalkylidene, a $C_1$-$C_{25}$ alkylidene of formula —C($R^c$)($R^d$)— wherein $R^c$ and $R^d$ are each independently hydrogen, $C_1$-$C_{12}$ alkyl, $C_1$-$C_{12}$ cycloalkyl, $C_7$-$C_{12}$ arylalkyl, $C_1$-$C_{12}$ heteroalkyl, or cyclic $C_7$-$C_{12}$ heteroarylalkyl, or a group of the formula —C(=$R^e$)— wherein $R^e$ is a divalent $C_1$-$C_{12}$ hydrocarbon group. This may include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (5):

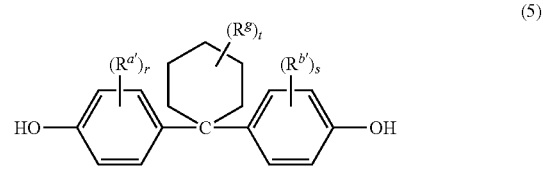

(5)

wherein $R^{a'}$ and $R^{b'}$ are each independently $C_1$-$C_{12}$ alkyl, $R^g$ is $C_1$-$C_{12}$ alkyl or halogen, r and s are each independently 1 to 4, and t is 0 to 10. $R^{a'}$ and $R^{b'}$ may be disposed meta to the cyclohexylidene bridging group. The substituents $R^{a'}$, $R^{b'}$ and $R^g$ may, when comprising an appropriate number of carbon atoms, be straight chain, cyclic, bicyclic, branched, saturated, or unsaturated. For example, $R^{a'}$, $R^{b'}$ and $R^g$ may be each independently $C_1$-$C_4$ alkyl, r and s are each 1, and t is 0 to 5. In another example, $R^{a'}$, $R^{b'}$ and $R^g$ may each be methyl, r and s are each 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

$X^a$ may be a $C_1$-$C_{18}$ alkylene group, a $C_3$-$C_{18}$ cycloalkylene group, a fused $C_6$-$C_{18}$ cycloalkylene group, or a group of the formula —$B^1$—W—$B^2$— wherein $B^1$ and $B^2$ are the same or different $C_1$-$C_6$ alkylene group and W is a $C_3$-$C_{12}$ cycloalkylidene group or a $C_6$-$C_{16}$ arylene group.

In another example, $X^a$ may be a substituted $C_3$-$C_{18}$ cycloalkylidene of the formula (6):

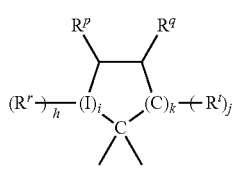

(6)

wherein $R^r$, $R^p$, $R^q$ and $R^t$ are each independently hydrogen, halogen, oxygen, or $C_1$-$C_{12}$ organic groups; I is a direct bond, a carbon, or a divalent oxygen, sulfur, or —N(Z)— where Z is hydrogen, halogen, hydroxy, $C_1$-$C_{12}$ alkyl, $C_1$-$C_{12}$ alkoxy, $C_6$-$C_{12}$ aryl, or $C_1$-$C_{12}$ acyl; h is 0 to 2, j is 1 or 2, is an integer of 0 or 1, and k is an integer of 0 to 3, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When i is 0, h is 0, and k is 1, the ring as shown in formula (6) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful dihydroxy monomer units include aromatic dihydroxy compounds of formula (7):

(7)

wherein each $R^h$ is independently a halogen atom, a $C_1$-$C_{10}$ hydrocarbyl such as a $C_1$-$C_{10}$ alkyl group, a halogen substituted $C_1$-$C_{10}$ hydrocarbyl such as a halogen-substituted $C_1$-$C_{10}$ alkyl group, and n is 0 to 4. The halogen, when present, is usually bromine.

Bisphenol-type dihydroxy aromatic compounds may include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3-methylphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Examples of the types of bisphenol compounds represented by formula (3) may include 1,1-bis(4-hydroxyphenyl) methane, 1,1-bis(4-hydroxyphenyl)ethane, 2,2-bis(4-hydroxyphenyl)propane (also referred to as "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl) propane, 3,3-bis(4-hydroxyphenyl)phthalimidine, 2-phenyl-3,3-bis(4-hydroxyphenyl)phthalimidine ("PPPBP"), 9,9-bis (4-hydroxyphenyl)fluorene, and 1,1-bis(4-hydroxy-3-methylphenyl)cyclohexane ("DMBPC"). Combinations comprising at least one of the foregoing dihydroxy aromatic compounds can also be used.

The dihydroxy compounds of formula (3) may be the following formula (8) for high heat applications:

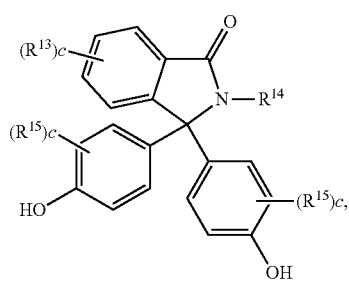

(8)

wherein $R^{13}$ and $R^{15}$ are each independently a halogen or a $C_1$-$C_6$ alkyl group, $R^{14}$ is a $C_1$-$C_6$ alkyl, phenyl, or phenyl substituted with up to five halogens or $C_1$-$C_6$ alkyl groups, and c is 0 to 4. In a specific embodiment, $R^{14}$ is a $C_1$-$C_6$ alkyl or phenyl group. In still another embodiment, $R^{14}$ is a methyl or phenyl group. In another specific embodiment, each c is 0.

The dihydroxy compounds of formula (3) may be the following formula (9) for high heat applications:

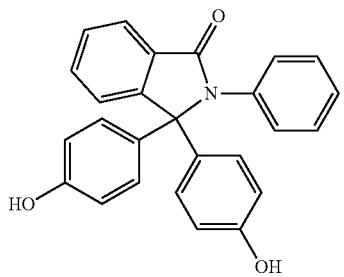
(9)

(also known as 3,3-bis(4-hydroxyphenyl)-2-phenylisoindolin-1-one (PPPBP)).

Alternatively, the dihydroxy compounds of formula (3) may be the following formula (10) for high heat applications:

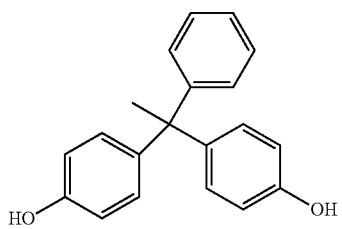
(10)

(also known as 4,4'-(1-phenylethane-1,1-diyl)diphenol (bisphenol-AP) or 1,1-bis(4-hydroxyphenyl)-1-phenylethane).

Alternatively, the dihydroxy compounds of formula (3) may be the following formula (11) for high heat applications:

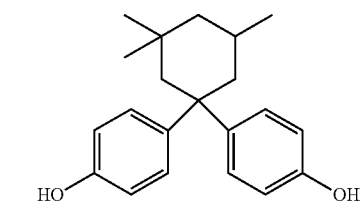
(11)

4,4'-(3,3,5-trimethylcyclohexane-1,1-diyl)diphenol (bisphenol TMC) or 1,1-bis(4-hydroxyphenyl)-3,3,5-trimethylcyclohexane).

Other dihydroxy compounds that might impart high Tgs to the polycarbonate as a copolycarbonate are dihydroxy compounds having adamantane units, as described in U.S. Pat. No. 7,112,644 and U.S. Pat. No. 3,516,968, which are fully incorporated herein by reference. A compound having adamantane units may have repetitive units of the following formula (12) for high heat applications:

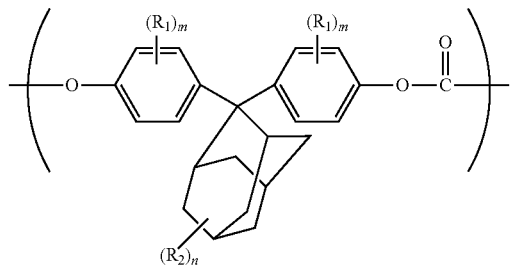
(12)

wherein $R_1$ represents a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms, or a fluoroalkyl group having 1 to 6 carbon atoms; $R_2$ represents a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms, or a fluoroalkyl group having 1 to 12 carbon atoms; m represents an integer of 0 to 4; and n represents an integer of 0 to 14.

Other dihydroxy compounds that might impart high Tgs to the polycarbonate as a copolycarbonate are dihydroxy compounds having fluorene-units, as described in U.S. Pat. No. 7,244,804. One such fluorene-unit containing dihydroxy compound is represented by the following formula (13) for high heat applications:

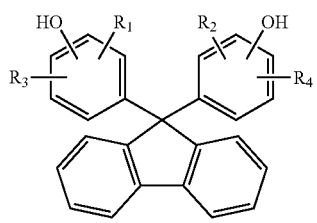
(13)

wherein $R_1$ to $R_4$ are each independently a hydrogen atom, a hydrocarbon group with 1 to 9 carbon atoms which may contain an aromatic group, or a halogen atom.

(ii) Isosorbide-Containing Polycarbonates

The cross-linkable polycarbonate of the invention may be a copolymer comprising repeating units as described above and other types of polymer units such isosorbide containing polycarbonate units. In certain embodiments, $R^{100}$ of formula (1) may be derived from a monomer unit derived from isosorbide. The monomer unit derived from isosorbide may be an isorbide-bisphenol unit of formula (14):

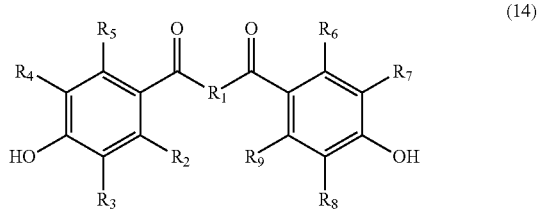
(14)

wherein R₁ is an isosorbide unit and R₂-R₉ are each independently a hydrogen, a halogen, a $C_1$-$C_6$ alkyl, a methoxy, an ethoxy, or an alkyl ester.

The R₁ isosorbide unit may be represented by formula (15):

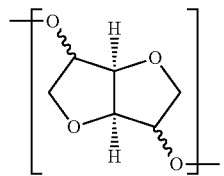

(15)

The isosorbide unit may be derived from an isosorbide, a mixture of isosorbide, a mixture of isomers of isosorbide, and/or from individual isomers of isosorbide. The stereochemistry for the isosorbide-based carbonate units of formula (15) is not particularly limited.

The R₁ isosorbide unit may be derived from an isosorbide of general formula (16):

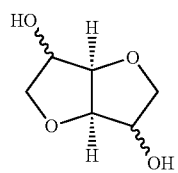

(16)

and can be a single diol isomer or mixture of diol isomers. The stereochemistry for the isosorbide of formula (16) is also not particularly limited. These diols may be prepared by the dehydration of the corresponding hexitols. Hexitols are produced commercially from the corresponding sugars (aldohexose). Aliphatic diols of formula (16) include 1,4:3,6-dianhydro-D glucitol, of formula (17); 1,4:3,6-dianhydro-D mannitol, of formula (18); and 1,4:3,6-dianhydro-L iditol, of formula (19), and any combination thereof. Isosorbides are available commercially from various chemical suppliers including Cargill, Roquette, and Shanxi.

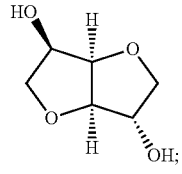

(17)

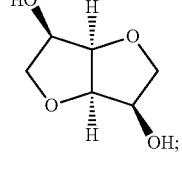

(18)

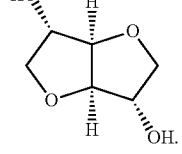

(19)

The diol of formula (17) may be desirable because it is a rigid, chemically and thermally stable aliphatic diol that may be used to produce higher Tg copolymers. The isosorbide-bisphenol may have a pKa of between 8 and 11.

(iii) Polyester-polycarbonates

The cross-linkable polycarbonate of the invention may be a copolymer comprising repeating units as described above, and other types of polymer units such as polyester units. A specific type of copolymer may be a polyester-polycarbonate. The polyester-polycarbonate may comprise repeating ester units of formula (20a):

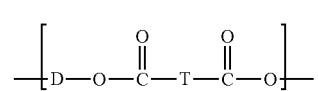

(20a)

wherein O-D-O of formula (20a) is a divalent group derived from a dihydroxy compound, and D may be, for example, one or more alkyl containing $C_6$-$C_{20}$ aromatic group(s), or one or more $C_6$-$C_{20}$ aromatic group(s), a $C_2$-$C_{10}$ alkylene group, a $C_6$-$C_{20}$ alicyclic group, a $C_6$-$C_{20}$ aromatic group or a polyoxyalkylene group in which the alkylene groups contain 2 to about 6 carbon atoms, specifically 2, 3, or 4 carbon atoms. D may be a $C_2$-$C_{30}$ alkylene group having a straight chain, branched chain, or cyclic (including polycyclic) structure. O-D-O may be derived from an aromatic dihydroxy compound of formula (3), as described above. O-D-O may be derived from an aromatic dihydroxy compound of formula (4), as described above. O-D-O may be derived from an aromatic dihydroxy compound of Formula (14), as described above.

The molar ratio of ester units to carbonate units in the polyester-polycarbonates may vary broadly, for example 1:99 to 99:1, specifically 10:90 to 90:10, more specifically 25:75 to 75:25, optionally expanded depending on the desired properties of the final composition.

T of formula (20a) may be a divalent group derived from a dicarboxylic acid, and may be, for example, a $C_2$-$C_{10}$ alkylene group, a $C_6$-$C_{20}$ alicyclic group, a $C_6$-$C_{20}$ alkyl aromatic group, a $C_6$-$C_{20}$ aromatic group, or a $C_6$-$C_{36}$ divalent organic group derived from a dihydroxy compound or chemical equivalent thereof. T may be an aliphatic group, wherein the molar ratio of carbonate units to ester units of formula (20a) in the poly(aliphatic ester)-polycarbonate copolymer is from 99:1 to 60:40; and 0.01 to 10 weight percent, based on the total weight of the polymer component, of a polymeric containing compound. T may be derived from a $C_6$-$C_{20}$ linear aliphatic alpha-omega (α-ω) dicarboxylic ester.

Diacids from which the T group in the ester unit of formula (20a) is derived include aliphatic dicarboxylic acids having from 6 to about 36 carbon atoms, optionally from 6 to 20 carbon atoms. The $C_6$-$C_{20}$ linear aliphatic alpha-omega (α-ω) dicarboxylic acids may be adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, or $C_{14}$, $C_{18}$ and $C_{20}$ diacids.

The ester units of the polyester-polycarbonates of formula (20a) can be further described by formula (20b), wherein T is $(CH_2)_m$, where m is 4 to 40.

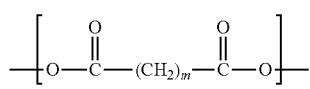

(20b)

Saturated aliphatic alpha-omega dicarboxylic acids may be adipic acid, sebacic or dodecanedioic acid. Sebacic acid is a dicarboxylic acid having the following formula (21):

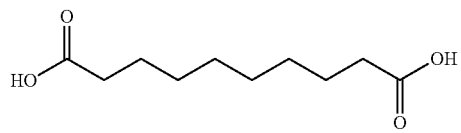

(21)

Sebacic acid has a molecular mass of 202.25 Daltons, a density of 1.209 g/cm$^3$ (25° C.), and a melting point of 294.4° C. at 100 mmHg. Sebacic acid is extracted from castor bean oil found in naturally occurring castor beans.

Other examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98.

D of the repeating units of formula (20a) may also be a $C_2$-$C_6$ alkylene group and T may be p-phenylene, m-phenylene, naphthalene, a divalent cycloaliphatic group, or a combination thereof. This class of polyester includes the poly (alkylene terephthalates).

Mixtures of the diacids can also be employed. It should be noted that although referred to as diacids, any ester precursor could be employed such as acid halides, specifically acid chlorides, and diaromatic esters of the diacid such as diphenyl, for example the diphenyl ester of sebacic acid. With reference to the diacid carbon atom number earlier mentioned, this does not include any carbon atoms which may be included in the ester precursor portion, for example diphenyl. It may be desirable that at least four, five or six carbon bonds separate the acid groups. This may reduce the formation of undesirable and unwanted cyclic species.

The polyester unit of a polyester-polycarbonate may be derived from the reaction of a combination of isophthalic and terephthalic diacids (or derivatives thereof) with resorcinol. In another embodiment, the polyester unit of a polyester-polycarbonate may be derived from the reaction of a combination of isophthalic acid and terephthalic acid with bisphenol-A. In an embodiment, the polycarbonate units may be derived from bisphenol-A. In another specific embodiment, the polycarbonate units may be derived from resorcinol and bisphenol-A in a molar ratio of resorcinol carbonate units to bisphenol-A carbonate units of 1:99 to 99:1.

Useful polyesters may include aromatic polyesters, poly (alkylene esters) including poly(alkylene arylates), and poly (cycloalkylene diesters). Aromatic polyesters may have a polyester structure according to formula (20a), wherein D and T are each aromatic groups as described hereinabove. Useful aromatic polyesters may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)]ester, or a combination comprising at least one of these.

The polyester-polycarbonate may have a biocontent according to ASTM-D-6866 of at least 2 weight %, at least 3 weight %, at least 4 weight %, at least 5 weight %, at least 6 weight %, at least 7 weight %, at least 8 weight %, at least 9 weight %, at least 10 weight %, at least 11 weight %, at least 12 weight %, at least 13 weight %, at least 14 weight %, at least 15 weight %, at least 16 weight %, at least 17 weight %, at least 18 weight %, at least 19 weight %, at least 20 weight %, at least 25 weight %, at least 30 weight %, at least 35 weight %, at least 40 weight %, at least 45 weight %, at least 50 weight %, at least 55 weight %, at least 60 weight %, or at least 65 weight % of the composition derived therefrom. The polymer, or any composition derived therefrom, may have at least 5.0 weight percent of sebacic acid content.

(iv) Polycarbonate Polysiloxane Copolymers

The cross-linkable polycarbonate of the invention may be a copolymer comprising other types of polymer units such as polysiloxane units. The polycarbonate structural unit of the polycarbonate-polysiloxane copolymer may comprise carbonate units derived from other monomers, such as the monomers of formula (3), formula (4), and/or formula (14), as described above.

The polysiloxane structural unit may be derived from siloxane-containing dihydroxy compounds (also referred to herein as "hydroxyaryl endcapped polysiloxanes") that contain diorganosiloxane units blocks of formula (22):

(22)

wherein each occurrence of R is the same or different, and is a $C_1$-$C_{13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an embodiment, where a transparent polycarbonate is desired, R does not contain any halogen. Combinations of the foregoing R groups can be used in the same polycarbonate.

The value of E in formula (22) can vary widely depending on the type and relative amount of each of the different units in the polycarbonate, the desired properties of the polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (23):

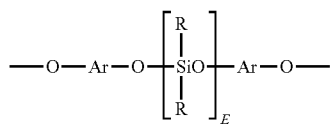

(23)

wherein E is as defined above; each R is the same or different, and is as defined above; and each Ar is the same or different, and Ar is one or more $C_6$-$C_{30}$ aromatic group(s), or one or more alkyl containing $C_6$-$C_{30}$ aromatic group(s), wherein the bonds are directly connected to an aromatic moiety. —O—Ar—O— groups in formula (23) can be derived from, for example, a $C_6$-$C_{30}$ dihydroxyaromatic compound. Combinations comprising at least one of the foregoing dihydroxyaromatic compounds can also be used. Exemplary dihydroxyaromatic compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl)cyclohexane, and 1,1-bis (4-hydroxy-t-butylphenyl)propane, or a combination comprising at least one of the foregoing dihydroxy compounds.

Polycarbonates comprising such units can be derived from the corresponding dihydroxy compound of formula (24):

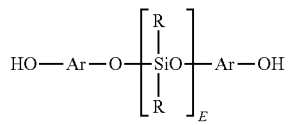

(24)

wherein Ar and E are as described above. Compounds of formula (24) can be obtained by the reaction of a dihydroxyaromatic compound with, for example, an alpha, omega-bis-acetoxy-polydiorganosiloxane oligomer under phase transfer conditions. Compounds of formula (24) can also be obtained from the condensation product of a dihydroxyaromatic compound, with, for example, an alpha, omega bis-chloro-polydimethylsiloxane oligomer in the presence of an acid scavenger.

In a specific embodiment, Ar from formula (24) is derived from resorcinol, and the polydiorganosiloxane repeating units are a dihydroxy aromatic compound of formula (25):

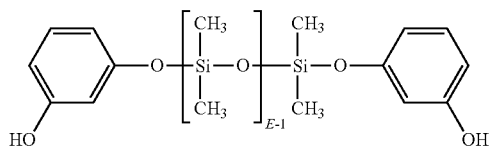

(25)

or, wherein Ar is derived from bisphenol-A, and the polydiorganosiloxane repeating units are a dihydroxy aromatic compound of formula (26):

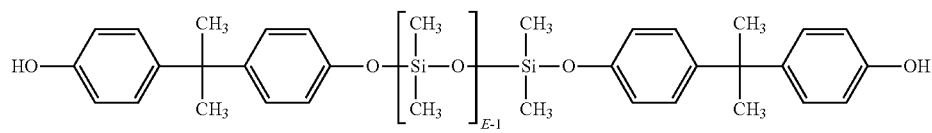

(26)

wherein E has an average value of between 20 and 75.

In another embodiment, polydiorganosiloxane blocks comprise units of formula (27):

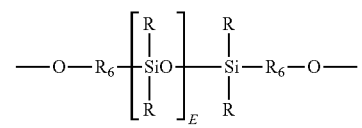

(27)

wherein R and E are as described above, and each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl. The polysiloxane blocks corresponding to formula (27) are derived from the corresponding dihydroxy compound of formula (28):

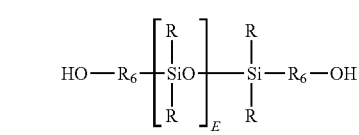

(28)

wherein R and E and $R_6$ are as described for formula (27).

In a specific embodiment, the polydiorganosiloxane blocks are derived from a polysiloxane monomer having the structure (29):

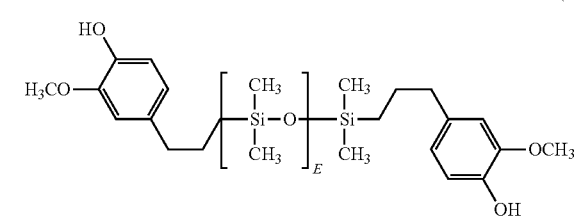

(29)

wherein E is an average value of between 20 and 75.

In another specific embodiment, the polydiorganosiloxane blocks are derived from a polysiloxane monomer having the structure (30):

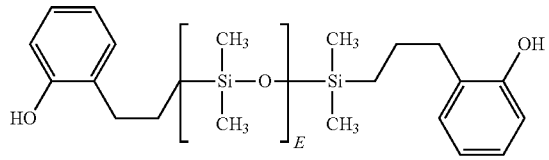

(30)

wherein E is an average value of between 20 and 75.

In a specific embodiment, the polydiorganosiloxane blocks are provided by repeating structural units of formula (31):

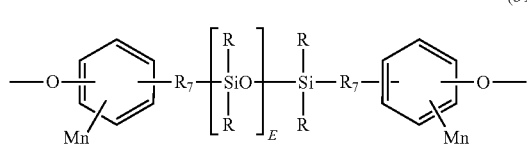

(31)

wherein R and E are as defined above. $R_7$ in formula (31) is a divalent $C_2$-$C_8$ aliphatic group. Each M in formula (31) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M of formula (31) is bromo or chloro, an alkyl group such as methyl, ethyl, or propyl, an alkoxy group such as methoxy, ethoxy, or propoxy, or an aryl group such as phenyl, chlorophenyl, or tolyl; n is 0 to 4; $R_7$ is a dimethylene, trimethylene or tetramethylene group; and R is a $C_1$-$C_8$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R_7$ is a divalent $C_1$-$C_3$ aliphatic group, and R is methyl.

Polysiloxane-polycarbonates comprising units of formula (31) can be derived from the corresponding dihydroxy polydiorganosiloxane (32):

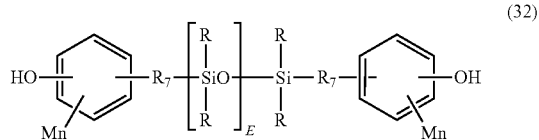

(32)

wherein each of R, E, M, $R_7$, and n are as described above. Such dihydroxy polysiloxanes can be made by affecting a platinum-catalyzed addition between a siloxane hydride of formula (33):

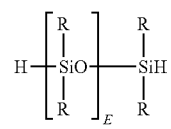

(33)

wherein R and E are as previously defined, and an aliphatically unsaturated monohydric phenol. Exemplary aliphatically unsaturated monohydric phenols include, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

In certain embodiments, the cross-linkable polycarbonates of the invention do not comprise polysiloxane units.

(v) Monohydroxybenzophenone End Capping Agents

Endcapping agents (also referred to as a chain-stopper) are used to limit molecular weight growth rate, and so control molecular weight. All types of polycarbonate end groups are contemplated as being useful in the cross-linkable polycarbonates of the invention, provided that such end groups do not significantly adversely affect desired properties of the compositions, and provided that the cross-linkable polycarbonates comprise at least some endcap group content derived from one or more monohydroxybenzophenones The monohydroxybenzophenone endcaps of the cross-linkable polycarbonates provide a reactive functional group for cross-linking the polycarbonates. For example, treatment of a cross-linkable polycarbonate of the invention with a suitable dose of ultra-violet radiation, as further described herein, may initiate cross-linking reaction between the monohydroxybenzophenone carbonyl carbon and a carbon atom of another functional group (e.g., a methylene carbon atom, such as in bisphenol-A) in the same polymer or another polymer in the composition.

Suitable monohydroxybenzophenone chain-stoppers include, but are not limited to, 2-hydroxybenzophenone, 3-hydroxybenzophenone, 4-hydroxybenzophenone, 4-hydroxybenzoylbenzophenone, 2-hydroxy-4-methoxybenzophenone, 2-hydroxy-4-methoxy-2'-carboxybenzophenone, 2-hydroxy-4-octoxybenzophenone, 2-hydroxy-4-stearoxybenzophenone, 4-dodecyloxy-2-hydroxybenzophenone, 2-hydroxy-4-methoxy-5-sulfobenzophenone trihydrate, and 2-hydroxy-4-methoxybenzophenone-5-sulfonic acid. In one preferred embodiment, the monohydroxybenzophenone chain stopper is a 2-hydroxybenzophenone, 3-hydroxybenzophenone, or 4-hydroxybenzophenone, each of which may be further substituted with one or more additional substituents, provided the monohydroxybenzophenone still functions as a chain-stopper. In another preferred embodiment, the monohydroxybenzophenone is 4-hydroxybenzophenone.

(vi) Other End Capping Agents

Other end capping agents can be incorporated into the cross-linkable polycarbonates. Exemplary chain-stoppers include certain monophenolic compounds (i.e., phenyl compounds having a single free hydroxy group), monocarboxylic acid chlorides, monocarboxylic acids, and/or monochloroformates. Phenolic chain-stoppers are exemplified by phenol and $C_1$-$C_{22}$ alkyl-substituted phenols such as p-cumyl-phenol, resorcinol monobenzoate, and p-tertiary-butylphenol, cresol, and monoethers of diphenols, such as p-methoxyphenol. Exemplary chain-stoppers also include cyanophenols, such as for example, 4-cyanophenol, 3-cyanophenol, 2-cyanophenol, and polycyanophenols. Alkyl-substituted phenols with branched chain alkyl substituents having 8 to 9 carbon atoms can be specifically be used.

Endgroups can be derived from the carbonyl source (i.e., the diaryl carbonate), from selection of monomer ratios, incomplete polymerization, chain scission, and the like, as well as any added endcapping groups, and can include derivatizable functional groups such as hydroxy groups, carboxylic acid groups, or the like. In an embodiment, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of bis(methyl salicyl) carbonate (BMSC) or other substituted or unsubstituted bis(alkyl salicyl) carbonate such as bis(ethyl salicyl) carbonate, bis(propyl salicyl) carbonate, bis(phenyl salicyl) carbonate, bis(benzyl salicyl) carbonate, or the like. In a specific embodiment, where BMSC is used as the activated carbonyl source, the endgroup is derived from and is a residue of BMSC, and is an ester endgroup derived from a salicylic acid ester, having the structure of formula (34):

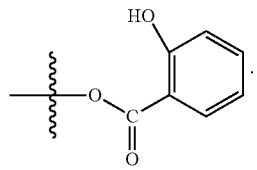

(34)

(vii) Branching Groups

The cross-linkable polycarbonates of the invention may include branching groups, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents can be added at a level of about 0.05 to about 6.0 wt %. Mixtures comprising linear polycarbonates and branched polycarbonates can be used.

(viii) Methods of Making Polycarbonates

The cross-linkable polycarbonate of the invention may be manufactured by processes such as interfacial polymerization and melt polymerization. High Tg copolycarbonates are generally manufactured using interfacial polymerization. Although the reaction conditions for interfacial polymerization can vary, an exemplary process generally involves dissolving or dispersing one or more dihydric phenol reactants, such as bisphenol-A, in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors may include, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, dicarboxylic acid, diacid chloride, or any combination thereof. An interfacial polymerization reaction to form carbonate linkages may use phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_1$-$C_8$ alkoxy group or a $C_6$-$C_{18}$ aryloxy group. An effective amount of a phase transfer catalyst can be 0.1 to 10 wt % based on the weight of bisphenol in the phosgenation mixture. For example, an effective amount of phase transfer catalyst can be 0.5 to 2 wt % based on the weight of bisphenol in the phosgenation mixture.

The polycarbonate may be prepared by a melt polymerization process. Generally, in the melt polymerization process, polycarbonates are prepared by co-reacting, in a molten state, the dihydroxy reactant(s) (e.g., aliphatic diol and/or aliphatic diacid, and any additional dihydroxy compound) and a diaryl carbonate ester, such as diphenyl carbonate, or more specifically in an embodiment, an activated carbonate such as bis(methyl salicyl) carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, BANBURY® mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactants may also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all sub-ranges there between, relative to the total moles of monomer unit compounds. In a specific embodiment, the molar ratio of activated aromatic carbonate to monomer unit compounds is 1.013 to 1.29, specifically 1.015 to 1.028.

5. BLEND COMPOSITIONS

The cross-linkable polycarbonates of the invention, as described above, can be used in blend compositions. The blend compositions may be subjected to cross-linking conditions (e.g., UV-radiation) to affect cross-linking of the cross-linkable polycarbonates in the blend. Accordingly, blend compositions of the invention include blends prior to and after cross-linking.

The blend compositions may comprise one or more distinct cross-linkable polycarbonates, as described herein, and/or one or more cross-linked polycarbonates, as described herein. The blend compositions may comprise one or more additional polymers. The blend compositions may comprise additional components, such as one or more additives. In certain embodiments, a blend composition comprises a cross-linkable and/or cross-linked polycarbonate of the invention (Polymer A) and a second polymer (Polymer B), and optionally one or more additives. In another embodiment, a blend composition comprises a combination of a cross-linkable and/or cross-linked polycarbonate of the invention (Polymer A); and a second polycarbonate (Polymer B), wherein the second polycarbonate is different from the first polycarbonate.

In a preferred embodiment, the compositions disclosed herein comprise a flame-retardant/anti-drip agent, a flame retardant additive, and/or an impact modifier. The flame-retardant/anti-drip agent may be potassium perfluorobutane sulfonate (Rimar salt), potassium diphenyl sulfone-3-sulfonate (KSS), or a combination thereof.

(A) First Polymer (Polymer A)

The first polymer (Polymer A) is any cross-linkable or cross-linked polycarbonate as described above. The polycarbonate may be, for example, a homopolycarbonate, a copolycarbonate, an isosorbide-containing polycarbonate, a polyester-polycarbonate, or a polycarbonate polysiloxane, provided that the cross-linkable polycarbonate comprises at least some endcap groups derived from a monohydroxybenzophenone. In certain embodiments, the first polymer does not include soft block or soft aliphatic segments in the polycarbonate chain.

(B) Second Polymer (Polymer B)

The second polymer (Polymer B) may be any polymer different from the first polymer that is suitable for use in a blend composition. In certain embodiments, the second polymer may be a polycarbonate, a polyester, a polysiloxane, a polyesteramide, a polyimide, a polyetherimide, a polyamideimide, a polyether, a polyethersulfone, a polyepoxide, a polylactide, a polylactic acid (PLA), or any combination thereof.

In certain embodiments, the second polymer may be a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an ABS resin, an ASA resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units. The blend composition may comprise additional polymers (e.g. a third, fourth, fifth, sixth, etc., polymer).

In certain embodiments, the second polymer may be a homopolycarbonate, a copolycarbonate, a polycarbonate-polysiloxane copolymer, a polyester-polycarbonate, or any combination thereof. In certain embodiments, the second polycarbonate is a p-cumyl phenol capped poly(isophthalate-terephthalate-resorcinol ester)-co-(bisphenol-A carbonate) copolymer. In certain embodiments, the second polycarbonate is a polycarbonate polysiloxane copolymer.

In certain embodiments, the second polymer may be a polycarbonate incorporating one or more repeating units as described in Section 2(A)(i) ("Homopolycarbonates/Copolycarbonates"), Section 2(A)(ii) ("Isosorbide-Containing Polycarbonates"), Section 2(A)(iii) ("Polyester-polycarbonates"), and/or Section 2(A)(iv) ("Polycarbonate Polysiloxane Copolymers").

In one preferred embodiment, the second polymer is a p-cumylphenol capped poly (19 mol % isophthalate-terephthalate-resorcinol ester)-co-(75 mol % bisphenol-A carbonate)-co-(6 mol % resorcinol carbonate) copolymer (MW=29,000 Daltons). In another preferred embodiment, the second polymer is a p-cumylphenol capped poly(10 wt % isophthalate-terephthalate-resorcinol ester)-co-(87 wt % bisphenol-A carbonate)-co-(3 mol % resorcinol carbonate) copolymer (MW=29,000 Daltons). In another preferred embodiment, the second polymer is a polycarbonate polysiloxane copolymer. In another preferred embodiment, the second polymer is a PC-siloxane copolymer with 20% siloxane segments by weight. In another preferred embodiment, the second polymer is a p-cumylphenol capped poly (65 mol % BPA carbonate)-co-(35 mol % 3,3-bis(4-hydroxyphenyl)-2-phenylisoindolin-1-one (PPPBP) carbonate) copolymer (MW=25,000 Daltons).

In another preferred embodiment, the second polymer is a polyphosphonate polymer, a polyphosphonate copolymer, or a poly(polyphosphonate)-co-(BPA carbonate) copolymer.

(C) Additives

The compositions may comprise additional components, such as one or more additives. Suitable additives include, but are not limited to impact modifiers, UV stabilizers, colorants, flame retardants, heat stabilizers, plasticizers, lubricants, mold release agents, fillers, reinforcing agents, antioxidant agents, antistatic agents, blowing agents, anti-drip agents, and radiation stabilizers.

(i) Impact Modifiers

The composition may comprise impact modifiers. For example, the composition can further include impact modifier(s), with the proviso that the additives are selected so as to not significantly adversely affect the desired properties of the composition. Suitable impact modifiers may be high molecular weight elastomeric materials derived from olefins, monovinyl aromatic monomers, acrylic and methacrylic acids and their ester derivatives, as well as conjugated dienes. The blend composition formed from conjugated dienes can be fully or partially hydrogenated. The elastomeric materials can be in the form of homopolymers or copolymers, including random, block, radial block, graft, and core-shell copolymers. Combinations of impact modifiers may be used.

A specific type of impact modifier may be an elastomer-modified graft copolymer comprising (i) an elastomeric (i.e., rubbery) polymer substrate having a Tg less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_1$-$C_8$ alkyl(meth)acrylates; elastomeric copolymers of $C_1$-$C_8$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

MBS may be derived from the following monomers:

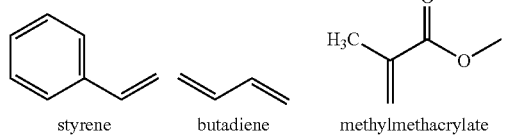

SEBS may be a linear triblockcopolymer based on styrene and ethylene/butylene. Each copolymer chain may consist of three blocks: a middle block that is a random ethylene/butylene copolymer surrounded by two blocks of polystyrene. The SEBS may be styrene-b-(ethylene-co-butylene)-b-styrene polymer.

Impact modifiers may be present in amounts of 1 to 30 parts by weight, based on 100 parts by weight of the polymer component of the blend composition. Preferred impact modifiers may include MBS and SBS.

In certain embodiments, the compositions do not comprise an impact modifier.

(ii) UV Stabilizers

The composition may comprise a UV stabilizer for improved performance in UV stabilization. UV stabilizers disperse UV radiation energy. Preferably, when present, the UV stabilizer does not substantially hinder or prevent cross-linking of the cross-linkable polycarbonates of the invention. Alternatively, in certain embodiments a UV stabililzer may be used to limit or control the level of cross-linking of the cross-linkable polycarbonate(s) present in the composition.

UV stabilizers may be hydroxybenzophenones, hydroxyphenyl benzotriazoles, cyanoacrylates, oxanilides, and hydroxyphenyl triazines. UV stabilizers may include, but are not limited to, poly[(6-morpholino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octyloxybenzophenone (Uvinul®3008), 6-tert-butyl-2-(5-chloro-2H-benzotriazole-2-yl)-4-methylphenyl (Uvinul® 3026), 2,4-di-tert-butyl-6-(5-chloro-2H-benzotriazole-2-yl)-phenol (Uvinul®3027), 2-(2H-benzotriazole-2-yl)-4,6-di-tert-pentylphenol (Uvinul® 3028), 2-(2H-benzotriazole-2-yl)-4-(1,1,3,3-tetramethylbutyl)-phenol (Uvinul® 3029), 1,3-bis[(2'-cyano-3',3'-diphenylacryloyl)oxy]-2,2-bis-{[(2'-cyano-3',3'-diphenylacryloyl)oxy]methyl}-propane (Uvinul® 3030), 2-(2H-benzotriazole-2-yl)-4-methylphenol (Uvinul® 3033), 2-(2H-benzotriazole-2-yl)-4,6-bis(1-methyl-1-phenyethyl) phenol (Uvinul® 3034), ethyl-2-cyano-3,3-diphenylacrylate (Uvinul® 3035), (2-ethylhexyl)-2-cyano-3,3-diphenylacrylate (Uvinul® 3039), N,N'-bisformyl-N,N'-bis(2,2,6,6-tetramethyl-4-piperidinyl)hexamethylendiamine (Uvinul® 4050H), bis-(2,2,6,6-tetramethyl-4-pipieridyl)-sebacate (Uvinul® 4077H), bis-(1,2,2,6,6-pentamethyl-4-piperdiyl)-sebacate+methyl-(1,2,2,6,6-pentamethyl-4-piperidyl)-sebacate (Uvinul® 4092H) or combination thereof.

The blend composition may comprise one or more UV stabilizers, including Cyasorb 5411, Cyasorb UV-3638, Uvinul 3030, and/or Tinuvin 234.

It should be recognized that certain monophenolic UV absorbers, which can be used as the monohydroxybenzophenone capping agents for the cross-linkable polycarbonates, can be utilized as one or more additives.

In certain embodiments, the composition does not comprise a UV stabilizer.

(iii) Colorants

The composition may comprise colorants such as pigment and/or dye additives. Useful pigments may include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the blend composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_2$-$C_8$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the polymer component of the blend composition.

(iv) Flame Retardants

The composition may comprise flame retardants. Various types of flame retardants can be utilized as additives. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxoanion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein.

The flame retardants may be selected from at least one of the following: alkali metal salts of perfluorinated $C_1$-$C_{16}$ alkyl sulfonates; potassium perfluorobutane sulfonate; potassium perfluoroctane sulfonate; tetraethylammonium perfluorohexane sulfonate; and potassium diphenylsulfone sulfonate.

The flame retardant additives may include organic compounds that include phosphorus, bromine, and/or chlorine.

In certain embodiments, the flame retardant is not a bromine or chlorine containing composition. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis (neopentyl)phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl)phenyl phosphate, tri(nonylphenyl)phosphate, bis(dodecyl) p-tolyl phosphate, dibutyl phenyl phosphate, 2-chloroethyl diphenyl phosphate, p-tolyl bis (2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful as additives, for example, compounds of the formulas (35), (36), and (37):

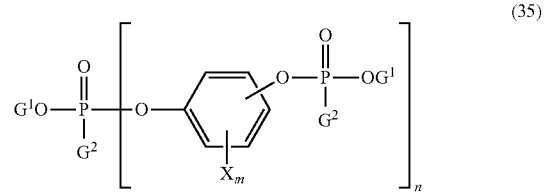

(35)

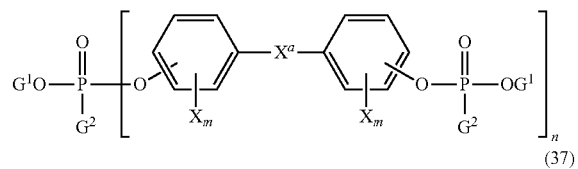

(36)

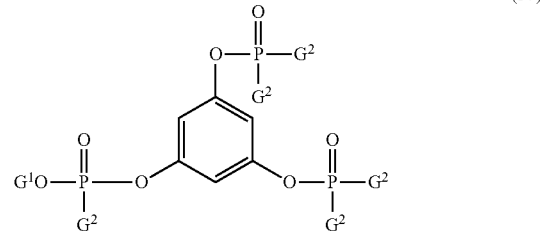

(37)

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary flame retardant additives include phosphonitrilic chloride, phosphorus ester amides, phosphoric acid amides, phosphoric acid amides, phosphinic acid amides, tris(aziridinyl)phosphine oxide, polyorganophosphazenes, and polyorganophosphonates.

The flame retardant additive may have formula (38):

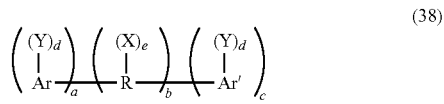

(38)

wherein R is a $C_1$-$C_{36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (38) are each independently mono- or polycarbocyclic aromatic groups such as phenylene, biphenylene, terphenylene, naphthylene, or the like.

Y is an organic, inorganic, or organometallic radical, for example halogen, e.g., chlorine, bromine, iodine, fluorine; ether groups of the general formula OB, wherein B is a monovalent hydrocarbon group similar to X; monovalent hydrocarbon groups of the type represented by R; or other substituents, e.g., nitro, cyano, and the like, said substituents being essentially inert provided that there is greater than or equal to one, specifically greater than or equal to two, halogen atoms per aryl nucleus. One or both of Ar and Ar' may further have one or more hydroxyl substituents.

When present, each X is independently a monovalent hydrocarbon group, for example an alkyl group such as methyl, ethyl, propyl, isopropyl, butyl, decyl, or the like; an aryl group such as phenyl, naphthyl, biphenyl, xylyl, tolyl, or the like; an aralkyl group such as benzyl, ethylphenyl, or the like; or a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of polymeric or oligomeric flame retardants derived from mono or dihydroxy derivatives of formula (38) are: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl) ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenylmethane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane; and 2,2-bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula $[(R)_2SiO]y$ wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

(v) Heat Stabilizers

The composition may comprise heat stabilizers. Exemplary heat stabilizer additives include, for example, organophosphites such as triphenyl phosphite, tris-(2,6-dimethylphenyl)phosphite, tris-(mixed mono- and di-nonylphenyl) phosphite or the like; phosphonates such as dimethylbenzene phosphonate or the like; phosphates such as trimethyl phosphate, or the like; or combinations comprising at least one of the foregoing heat stabilizers. Heat stabilizers are generally used in amounts of 0.0001 to 1 part by weight, based on 100 parts by weight of the polymer component of the blend composition.

(vi) Plasticizers, Lubricants, Mold Release Agents

The composition may comprise plasticizers, lubricants, and mold release agents. Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the blend composition.

(vii) Other Filler or Reinforcing Agents

The composition may comprise other fillers or reinforcing agents. Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the polymer component of the blend composition.

(viii) Antioxidant Additives

The composition may comprise an antioxidant additive. In certain embodiments, the blend composition does not comprise an antioxidant additive. Exemplary antioxidant additives include, for example, organophosphites such as tris (nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 part by weight, based on 100 parts by weight of the polymer component of the blend composition.

(ix) Antistatic Agents

The composition may comprise an antistatic agent. Examples of monomeric antistatic agents may include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents may include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. Carbon fibers, carbon nanofibers, carbon nanotubes, carbon black, or a combination comprising at least one of the foregoing may be used in a polymeric resin containing chemical antistatic agents to render the composition electrostatically dissipative. Antistatic agents are generally used in amounts of 0.0001 to 5 parts by weight, based on 100 parts by weight of the polymer component of the blend composition.

(x) Blowing Agents

The composition may comprise a blowing agent. Foam may be a useful blowing agent. Low boiling halohydrocarbons and those that generate carbon dioxide may be used as blowing agents. Blowing agents may be used that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents may be used in amounts of 0.01 to 20 parts by weight, based on 100 parts by weight of the polymer component of the blend composition.

(xi) Anti-Drip Agents

The composition may comprise anti-drip agents. The anti-drip agent may be a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 percent by weight, based on 100 parts by weight of the polymer component of the blend composition.

(xii) Radiation Stabilizers

The composition may comprise radiation stabilizers. The radiation stabilizer may be a gamma-radiation stabilizer. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-penten-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($—CH_2OH$) or it can be a member of a more complex hydrocarbon group such as $—CR^{24}HOH$ or $—CR^{24}_2OH$ wherein $R^{24}$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 parts by weight based on 100 parts by weight of the polymer component of the blend composition.

In certain embodiments, the composition does not comprise a radiation stabilizer.

6. METHOD OF MAKING THE COMPOSITIONS

The compositions disclosed herein, blends or neat, can be manufactured by various methods. For example, a neat or blend composition may be first mixed in a high speed HENSCHEL-Mixer®. Other low shear processes, including but not limited to hand mixing, can also accomplish this blending. The mixed composition may then be fed into the throat of a single or twin-screw extruder via a hopper. Alternatively, at least one of the components can be incorporated into the composition by feeding directly into the extruder at the throat and/or downstream through a side-stuffer. Additives can also be compounded into a master-batch with a desired polymeric resin and fed into the extruder. The extruder may be generally operated at a temperature higher than that necessary to cause the composition to flow. The extrudate may be immediately quenched in a water batch and pelletized. The pellets, so prepared, when cutting the extrudate can be one-fourth inch long or less as desired. Such pellets can be used for subsequent molding, shaping, or forming.

7. ARTICLES

Compositions disclosed herein, preferably prior to cross-linking, may be formed, shaped, molded, injection molded, or extruded into an article. The compositions can be molded into useful shaped articles by a variety of means such as injection molding, overmolding, co-injection molding, extrusion, multilayer extrusion, rotational molding, blow molding and thermoforming to form articles. The formed articles may be subsequently subjected to cross-linking conditions (e.g., UV-radiation) to affect cross-linking of the polycarbonates comprising monohydroxybenzophenone derived endcap.

Articles that may be formed from the compositions include various components for cell phones and cell phone covers, components for computer housings, computer housings and business machine housings and parts such as housings and parts for monitors, computer routers, copiers, desk top printers, large office/industrial printers handheld electronic device housings such as computer or business machine housings, housings for hand-held devices, components for light fixtures or home or office appliances, humidifier housings, thermostat control housings air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, components for interior or exterior components of an automobile, lenses (auto and non-auto) such as components for film applications, greenhouse components, sun room components, fire helmets, safety shields, safety goggles, glasses with scratch resistance and impact resistance, fenders, gas pumps, films for televisions, such as ecofriendly films having no halogen content, solar application materials, glass lamination materials, fibers for glassed filled systems, turbine blades (e.g., wind turbines), and the like.

In certain embodiments, articles that may comprise the composition include automotive bumpers, other automotive, construction and agricultural equipment exterior components, automobile mirror housings, automobile wheel covers, automobile, construction and agricultural equipment instrument panels and trim, automobile glove boxes, automobile door hardware and other interior trim, automobile construction and agricultural equipment exterior lights, automobile parts within the engine compartment, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, lighting parts, dental instruments and equipment, medical instruments, cookware, medical instrument trays, animal cages, fibers, laser welded medical devices, and fiber optics.

In certain embodiments, articles that may comprise the composition include automotive bumpers, other automotive exterior components, automobile mirror housings, automobile wheel covers, automobile instrument panels and trim, automobile glove boxes, automobile door hardware and other interior trim, external automobile trim parts, such as pillars, automobile exterior lights, automobile parts within the engine compartment, an agricultural tractor or device part, a construction equipment vehicle or device part, a marine or personal water craft part, an all terrain vehicle or all terrain vehicle part, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, electric enclosures, lighting parts, dental instruments, medical instruments, medical or dental lighting parts, an aircraft part, a train or rail part, a seating component, sidewalls, ceiling parts, cookware, medical instrument trays, animal cages, fibers, laser welded medical devices, fiber optics, lenses (auto and non-auto), cell phone parts, greenhouse components, sun room components, fire helmets, safety shields, safety glasses, gas pump parts, and turbine blades.

In certain embodiments, the article is one that requires or must include a material having a UL94 5VA rating performance. Articles that require a UL94 5VA rating include, but are not limited to, computer housings, computer housings and business machine housings and parts such as housings and parts for monitors, computer routers, copiers, desk top printers, large office/industrial printers, handheld electronic device housings such as computer or business machine housings, housings for hand-held devices, components for light fixtures including LED fixtures or home or office appliances, humidifier housings, thermostat control housings, air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, electrical boxes and enclosures, and electrical connectors.

In certain embodiments, the article is one that requires hydrothermal stability, such as a wind turbine blade, a steam sterilizable medical device, a food service tray, utensils and equipment.

In certain embodiments, the article is one that requires a combination of transparency, flame resistance, and/or impact resistance. For example, in certain embodiments the article may be a safety shield, safety goggles, a gas/fuel pump housing, a display window or part, or the like.

8. METHOD OF MAKING THE ARTICLES

The article may be produced by a manufacturing process. The process may comprise the steps of (a) providing a composition comprising one or more polymers as described above, wherein at least one of the polymers is a cross-linkable polycarbonate comprising monohydroxybenzophenone derived endcaps, as described above. The composition from step (a) may then be (b) melted, for example, at 200-400° C., 225-350° C., 250-310° C., or 270-300° C. in an extruder. The melted composition of step (b) may then be (c) extruded, and (d) the composition may be isolated or chopped. The article of manufacture may further be produced by the step of (e) drying the composition and (f) melt forming the composition. The article may then be subjected to cross-linking conditions, as described herein, so as to affect cross-linking of the polycarbonate comprising monohydroxybenzophenone derived endcaps. In certain embodiments, the article is not subjected to cross-linking conditions immediately after manufacture, but rather is cross-linked at a later time, such as when the article is introduced to sun light.

The present invention has multiple aspects, illustrated by the following non-limiting examples.

9. EXAMPLES

All solvents and reagents used were analytical grade.

Molecular weight determinations were performed using gel permeation chromatography (GPC), using a cross-linked styrene-divinylbenzene column and calibrated to polycarbonate references using a UV-VIS detector set at 264 nm. Samples were prepared at a concentration of about 1 mg/ml, and eluted at a flow rate of about 1.0 ml/min.

Differential scanning calorimetry (DSC) employing a temperature sweep rate of 20° C./min was used to determine glass transition temperatures of polycarbonates.

(A) Preparation of Cross-linkable Polycarbonates

Example 1

4-Hydroxybenzophenone endcapped polycarbonate "Benzophenone-BPA Copolymer-0.5 mol %-23 k"

The following were added into a 2 liter glass reactor equipped with an overhead condenser, a phosgene inlet and a pH probe allowing monitoring pH during the course of the reaction: (a) 4,4-bis-(hydroxyphenyl)-2,2-propane (BPA) (30 g, 131.6 mmol); (b) 4-hydroxybenzophenone (0.13 g, 0.7 mmol); (c) para-cumylphenol (0.7 g, 3.3 mmol); (d) triethylamine (0.18 g, 1.3 mmol); (e) methylene chloride (500 mL); (f) de-ionized water (300 mL). The reaction was allowed to stir for 10 minutes and the pH was maintained at pH=8 by the addition of 30 wt-% NaOH solution. The mixture was charged with phosgene (18.6 g, 2 g/min, 0.188 mol). During the addition of phosgene, base (30 wt-% NaOH in deionized water) was simultaneously charged to the reactor to maintain the pH of the reaction between 9-10. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot water. The polymer was dried in an oven at 110° C. before analysis. Gel permeation chromatography (GPC) allowed for a determination of the molecular weight of the resulting polymer. The Mw of the polycarbonate was measured to be 22,877 Daltons (referenced to polycarbonate standards) and polydispersity index=3.11.

Example 2

4-Hydroxybenzophenone endcapped polycarbonate "Benzophenone-BPA Copolymer-2.5 mol %-30 k"

The following were added into a 2 liter glass reactor equipped with an overhead condenser, a phosgene inlet and a pH probe allowing monitoring pH during the course of the reaction: (a) 4,4-bis-(hydroxyphenyl)-2,2-propane (BPA) (30 g, 131.6 mmol); (b) 4-hydroxybenzophenone (0.65 g, 3.3 mmol); (c) para-cumylphenol (0.14 g, 0.7 mmol); (d) triethylamine (0.18 g, 1.3 mmol); (e) methylene chloride (500 mL); (f) de-ionized water (300 mL). The reaction was allowed to stir for 10 minutes and the pH was maintained at pH=8 by the addition of 30 wt-% NaOH solution. The mixture was charged with phosgene (18.74 g, 2 g/min, 0.189 mol). During the addition of phosgene, base (30 wt-% NaOH in deionized water) was simultaneously charged to the reactor to maintain the pH of the reaction between 9-10. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot water. The polymer was dried in an oven at 110° C. before analysis. Gel permeation chromatography (GPC) allowed for a determination of the molecular weight of the resulting polymer. The Mw of the polycarbonate was measured to be 30,255 Daltons (referenced to polycarbonate standards) and polydispersity index=2.09.

Example 3

4-Hydroxybenzophenone endcapped polycarbonate "Benzophenone-BPA Copolymer-1.7 mol %-28 k"

The following were added into a 70 L continuous stirred-tank reactor (CSTR) equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (59 g, 0.297 mol); (c) para-cumylphenol (45 g, 0.212 mol); (d) triethylamine (42 mL, 0.415 mol); (e) methylene chloride (23.4 L); (f) de-ionized water (10.8 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 28,366 Daltons (referenced to polycarbonate standards) and polydispersity index=3.78.

Example 4

4-Hydroxybenzophenone endcapped polycarbonate "Benzophenone-BPA Copolymer-2.5 mol %-27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.438 mol); (c) para-cumylphenol (28 g, 0.132 mol); (d) triethylamine (60 mL, 0.593 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,106 Daltons (referenced to polycarbonate standards) and polydispersity index=6.19.

Example 5

4-Hydroxybenzophenone endcapped polycarbonate "Benzophenone-BPA Copolymer-0.5 mol %-28 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (105 g, 0.494 mol); (d) triethylamine (60 mL, 0.593 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,482 Daltons (referenced to polycarbonate standards) and polydispersity index=3.40.

Example 6

4-Hydroxybenzophenone endcapped polycarbonate "Benzophenone-BPA Copolymer-0.5 mol %-24 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (120 g, 0.565 mol); (d) triethylamine (60 mL, 0.593 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 24,379 Daltons (referenced to polycarbonate standards) and polydispersity index=3.30.

Example 7

4-Hydroxybenzophenone endcapped polycarbonate "Benzophenone-BPA Copolymer-0.5 mol %-21 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (148 g, 0.697 mol); (d) triethylamine (60 mL, 0.593 mol); (e) methylene chloride (24.4 L); (f) de-ionized water (10.8 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 21,171 Daltons (referenced to polycarbonate standards) and polydispersity index=3.22.

Example 8

4-Hydroxybenzophenone endcapped polycarbonate "Benzophenone-BPA Copolymer-2.5 mol %-26 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.438 mol); (c) para-cumylphenol (35 g, 0.165 mol); (d) triethylamine (80 mL, 0.79 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 25,916 Daltons (referenced to polycarbonate standards) and polydispersity index=5.21.

Example 9

4-Hydroxybenzophenone endcapped polycarbonate "Benzophenone-BPA Copolymer-2.5 mol %-27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (105 g, 0.49 mol); (d) triethylamine (60 mL, 0.59 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,055 Daltons (referenced to polycarbonate standards) and polydispersity index=3.19.

Example 10

4-Hydroxybenzophenone endcapped polycarbonate "Benzophenone-BPA Copolymer-0.5 mol %-27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (148 g, 0.698 mol); (d) triethylamine (42 mL, 0.41 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,256 Daltons (referenced to polycarbonate standards) and polydispersity index=3.23.

Example 11

4-Hydroxybenzophenone endcapped polycarbonate "Benzophenone-BPA Copolymer-0.5 mol %-26 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.439 mol); (c) para-cumylphenol (35 g, 0.165 mol); (d) triethylamine (42 mL, 0.41 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 25,999 Daltons (referenced to polycarbonate standards) and polydispersity index=6.98.

Example 12

4-Hydroxybenzophenone endcapped polycarbonate "Benzophenone-BPA Copolymer-0.5 mol %-27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.439 mol); (c) para-cumylphenol (28 g, 0.132 mol); (d) triethylamine (42 mL, 0.41 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH in deionized water) was simultaneously charged to the reactor to maintain the pH of the reaction between 8.5-9. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,084 Daltons (referenced to polycarbonate standards) and polydispersity index=7.26.

Table 1 summarizes the constituents and the weight average molecular weights of the polycarbonates of Examples 1-12.

TABLE 1

| Component | Ex. 1 | Ex. 2 | Ex. 3 | Ex. 4 | Ex. 5 | Ex. 6 |
|---|---|---|---|---|---|---|
| BPA | 30 g | 30 g | 4 kg | 4 kg | 4 kg | 4 kg |
| HBP | 0.13 g | 0.65 g | 59 g | 87 g | 18 g | 18 g |
| PCP | 0.7 g | 0.14 g | 45 g | 28 g | 105 g | 120 g |
| Na glu | — | — | 10 g | 10 g | 10 g | 10 g |
| NEt$_3$ | 0.18 g | 0.18 g | 42 mL | 60 mL | 60 mL | 60 mL |
| phosgene | 18.6 g | 18.74 g | 2.5 kg | 2.5 kg | 2.5 kg | 2.5 kg |
| water | 300 mL | 300 mL | 10.8 L | 10 L | 10 L | 10 L |
| CH$_2$Cl$_2$ | 500 mL | 500 mL | 23.4 L | 23 L | 23 L | 23 L |
| Mw, Daltons | 22,877 | 30,255 | 28,366 | 27,106 | 27,482 | 24,379 |
| PDI | — | — | 3.78 | 6.19 | 3.40 | 3.30 |
| mol % HBP endcap | 0.5% | 2.5% | 1.7% | 2.5% | 0.5% | 0.5% |

| Component | Ex. 7 | Ex. 8 | Ex. 9 | Ex. 10 | Ex. 11 | Ex. 12 |
|---|---|---|---|---|---|---|
| BPA | 4 kg | 4 kg | 4 kg | 4 kg | 4 kg | 4 kg |
| HBP | 18 g | 87 g | 87 g | 18 g | 18 g | 18 g |
| PCP | 148 g | 35 g | 105 g | 105 g | 35 g | 28 g |
| Na glu | 10 g | 10 g | 10 g | 10 g | 10 g | 10 g |
| NEt$_3$ | 60 mL | 80 mL | 60 mL | 60 mL | 42 mL | 42 mL |
| phosgene | 2.5 kg | 2.7 kg | 2.7 kg | 2.7 kg | 2.7 kg | 2.7 kg |
| water | 10.8 L | 10 L | 10 L | 10 L | 10 L | 10 L |
| CH$_2$Cl$_2$ | 24.4 L | 23 L | 23 L | 23 L | 23 L | 23 L |
| Mw, Daltons | 21,171 | 25,916 | 27,055 | 27,256 | 25,999 | 27,084 |
| PDI | 3.22 | 5.21 | 3.19 | 3.23 | 6.98 | 7.26 |

TABLE 1-continued

| mol % HBP endcap | 0.5% | 2.5% | 2.5% | 0.5% | 0.5% | 0.5% |

BPA = bisphenol-A;
HBP = 4-hydroxybenzophenone;
PCP = p-cumylphenol;
Na glu = sodium gluconate;
$NEt_3$ = triethyl amine;
$CH_2Cl_2$ = methylene chloride;
PDI = polydispersity index The 4-hydroxybenzophenone endcapped polycarbonates of Examples 1-12 were prepared as compositions optionally using one or more of the components shown in Table 2. Comparative Examples were also prepared using the components of Table 2. The referenced compositions were prepared by mixing together the selected constituents and preblending. Extrusion and molding was carried out under normal polycarbonate processing conditions.

TABLE 2

| Component | Description | Trade name, Source |
|---|---|---|
| 20:80 ITR-PC | Poly(19 mol % isophthalate-terephthalate-resorcinol ester)-co-(75 mol % bisphenol-A carbonate)-co-(6 mol % resorcinol carbonate) copolymer (Mw = 31,000, PC standards) | SABIC-IP |
| HF-PC or High-Flow PC | Bisphenol-A based polycarbonate resin (Mw = 22,000 Daltons, PC standards) | SABIC-IP |
| LF-PC or Low-Flow PC | Bisphenol-A based polycarbonate resin (Mw = 30,000 Daltons, PC standards) | SABIC-IP |
| KSS | Potassium diphenylsulphon-3-sulphonate | Arichem LLC |
| Rimar Salt | Potassium perfluorobutanesulfonate | Lanxess |
| PETS | pentaerythritol tetrastearate | Faci |
| UV stabilizer | 2-(2'-hydroxy-5'-t-octylphenyl)benzotriazole | CYASORB UV 5411, Cytec |
| Heat stabilizer | Tetrakis(2,4-di-tert-butylphenyl)-4,4'-biphenylenediphosphonite | PEPQ, Ciba Specialty Chemicals |
| Hydrolytic stabilizer | Cycloaliphatic Epoxy Resin, 3,4-epoxy cyclohexyl methyl-3,4-epoxy cyclohexyl carboxylate | ERL4221, Various |
| | Colorant 1 | |
| | Colorant 2 | |
| Phosphite Stabilizer | Tris (2,4-di-tert-butylphenyl) phosphite | Irgaphos 168 |
| | Hindered Phenol | |

(B) Cross-linking Results

Compositions of the 4-hydroxybenzophenone endcapped polycarbonates of Examples 1-12 were cross-linked with ultra-violet (UV) radiation. The polycarbonate compositions were treated with ultra-violet radiation generated from a UV-lamp, or irradiative energy (including UV) received upon sun exposure.

(i) Cross-Linking of 4-hydroxybenzophenone Endcapped Polycarbonates using a UV-lamp Ultra-violet radiation was used to cross-link the neat resin compositions of Examples 1 and 2. First, films of Examples 1 and 2 were formed by melt-pressing the corresponding powder at 550° F. The thickness of each film was about 0.5 mm. Each film was then irradiated with UV-radiation emitted from a 9 mm D bulb having output specifications of about 796.5 Watts from 201 nm to 600 nm, as shown in Table 3. The time of irradiation was 90 seconds, providing an energy of irradiation of 3,000 mJ/cm$^2$ measured using a UV Power Puck™ aletro-optic radiometer.

TABLE 3

| Interval (nm) | Power (Watts) |
|---|---|
| 201-210 | 2.3 |
| 211-220 | 4.2 |
| 221-230 | 4.9 |

TABLE 3-continued

| Interval (nm) | Power (Watts) |
|---|---|
| 231-240 | 5.8 |
| 241-250 | 10.8 |
| 251-260 | 17.7 |
| 261-270 | 13.6 |
| 271-280 | 20.3 |
| 281-290 | 11.6 |
| 291-300 | 24.3 |
| 301-310 | 28.6 |
| 311-320 | 21.5 |
| 321-330 | 21.0 |
| 331-340 | 11.0 |
| 341-350 | 24.4 |
| 351-360 | 50.8 |
| 361-370 | 57.5 |
| 371-380 | 74.9 |
| 381-390 | 72.2 |
| 391-400 | 27.9 |
| 401-410 | 30.6 |

TABLE 3-continued

| Interval (nm) | Power (Watts) |
|---|---|
| 411-420 | 26.2 |
| 421-430 | 34.8 |
| 431-440 | 40.4 |
| 441-450 | 19.5 |
| 451-460 | 4.9 |
| 461-470 | 3.5 |
| 471-480 | 2.7 |
| 481-490 | 9.0 |
| 491-500 | 15.3 |
| 501-510 | 7.2 |
| 511-520 | 12.7 |
| 521-530 | 16.7 |
| 531-540 | 17.2 |
| 541-550 | 27.3 |
| 551-560 | 5.3 |
| 561-570 | 3.8 |
| 571-580 | 8.7 |
| 581-590 | 3.4 |
| 591-600 | 2.2 |

Table 4 demonstrates the progression of molecular weight as a function of irradiation time of Example 1 and Example 2. These data show that the molecular weight of each film increased dramatically as a function of UV dosage. The data shows also that the more 4-hydroxybenzophenone endcap present in the resin, the greater is the molecular weight increase, as Example 2 (2.5 mol % HBP endcap) showed a 144% increase in molecular weight after 5 passes under the UV-lamp, compared with a 30% increase in molecular weight for Example 1 (0.5 mol % HBP endcap) after 5 passes.

TABLE 4

|  | Unit | Example 1 | Example 2 |
|---|---|---|---|
| 4-Hydroxybenzophenone amount | mol-% | 0.5 | 2.5 |
| Unexposed film MW | Daltons | 22,877 | 30,255 |
| 1 pass UV-treated film MW | Daltons | 25,784 | 53,346 |
| 5 pass UV-treated film MW | Daltons | 29,664 | 73,945 |
| MW increase after 5 passes | % | 30 | 144 |

Figure 2:
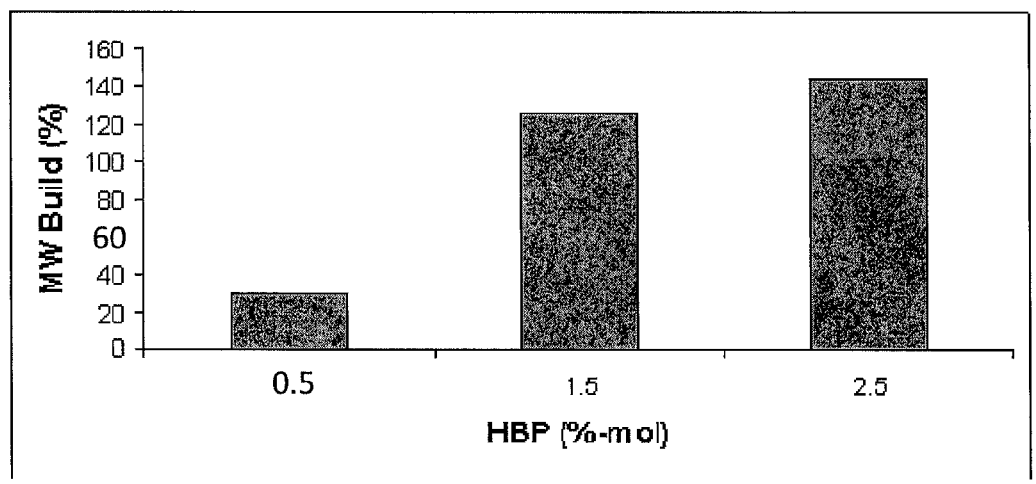
FIG. 2 depicts the molecular weight build (%) as a function of 4-hydroxybenzophenone endcap content in polycarbonate compositions treated with UV-radiation.

FIGS. 1 and 2 also demonstrate the progression of molecular weight as a function of irradiation time for 4-hydroxybenzophenone endcapped polycarbonates of the invention. The figures show molecular weight progression upon cross-linking of 4-hydroxybenzophenone-BPA polycarbonates at 0.5 mol % hydroxybenzophenone endcap, 1.5 mol % hydroxybenzophenone endcap, and 2.5 mol % hydroxybenzophenone endcap. Each of the three polycarbonates included sufficient p-cumylphenol endcap to bring the total endcap mol % to 3 mol %.

Figure 3:
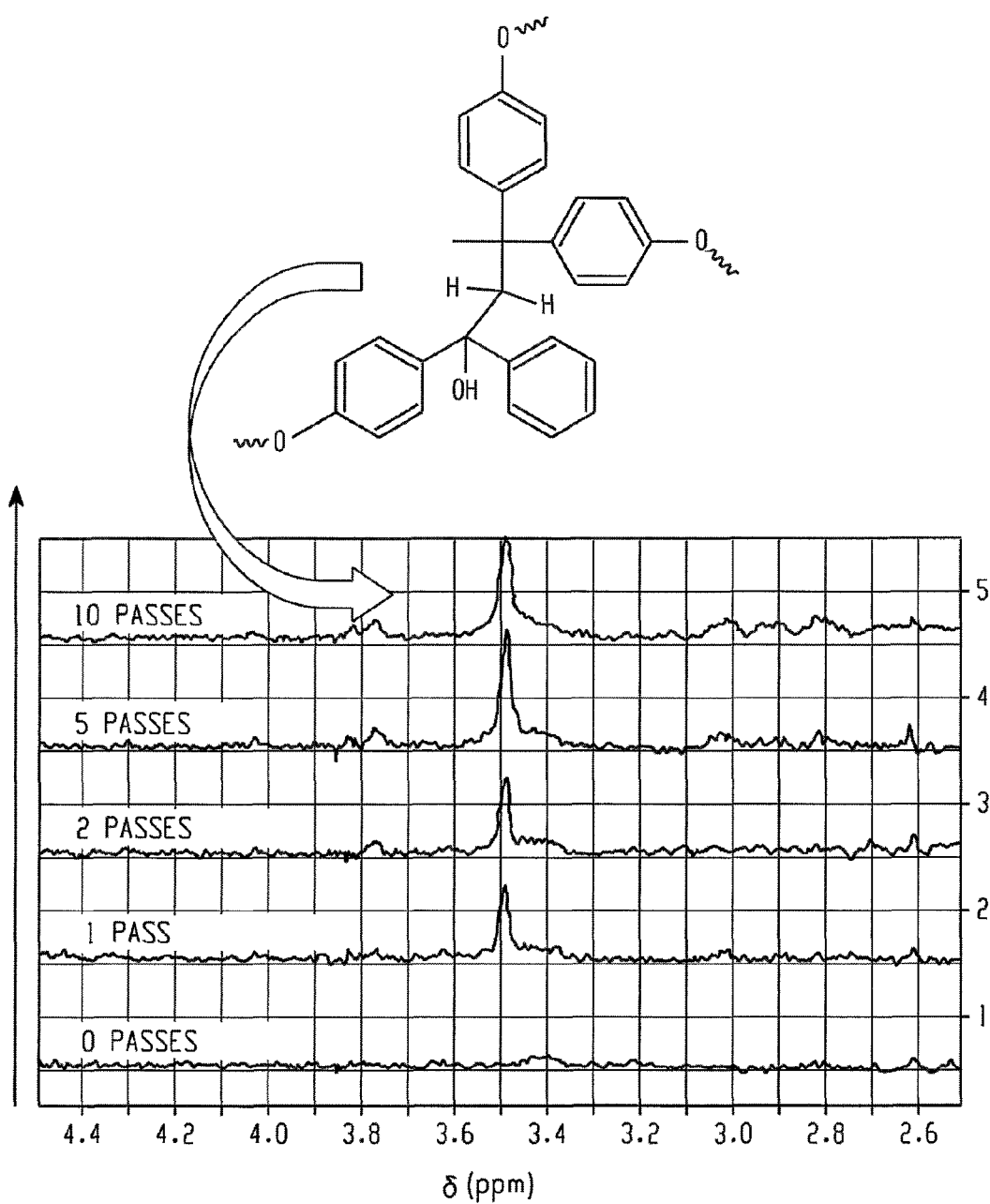
FIG. 3 depicts overlayed NMR spectra demonstrating peak intensity increase at 3.48 ppm showing progression of polycarbonate cross-linking.
Figure 4:
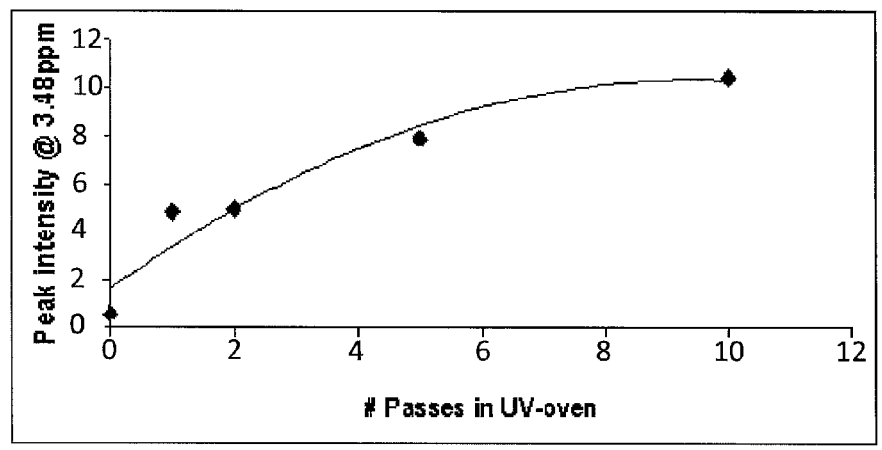
FIG. 4 depicts NMR peak intensity at 3.48 ppm as a function of UV-treatment of 4-hydroxybenzophenone endcapped polycarbonates.

The cross-linking reaction of Example 2 (benzophenone-BPA copolymer-2.5 mol %-30 k) was monitored by $^1$H-nuclear magnetic resonance spectroscopy (NMR), as shown in FIGS. 3 and 4. Without being bound by theory, it is believed that cross-linking occurs between benzophenone carbonyl carbon atoms and methyl carbon atoms as found in repeating bisphenol-A units. The cross-linking reaction can be monitored by following the peak intensity increase at 3.48 ppm in the NMR spectrum of the composition, which peak corresponds to the methylene hydrogens at the newly formed carbon-carbon bond. FIGS. 3 and 4 illustrate that with each pass under the UV-lamp, the peak intensity increased at 3.48 ppm, indicating progression of the cross-linking process.

(ii) Cross-linking of 4-hydroxybenzophenone Endcapped Polycarbonates via Sun Exposure Sun exposure was used to cross-link the polycarbonates. Films were formed of the cross-linkable polycarbonates by melt-pressing the corresponding powder at 550° F. The thickness of each film was about 0.5 mm. Each film was then exposed to UV-radiation emitted from the sun over a period of 360 hours.

Figure 5:
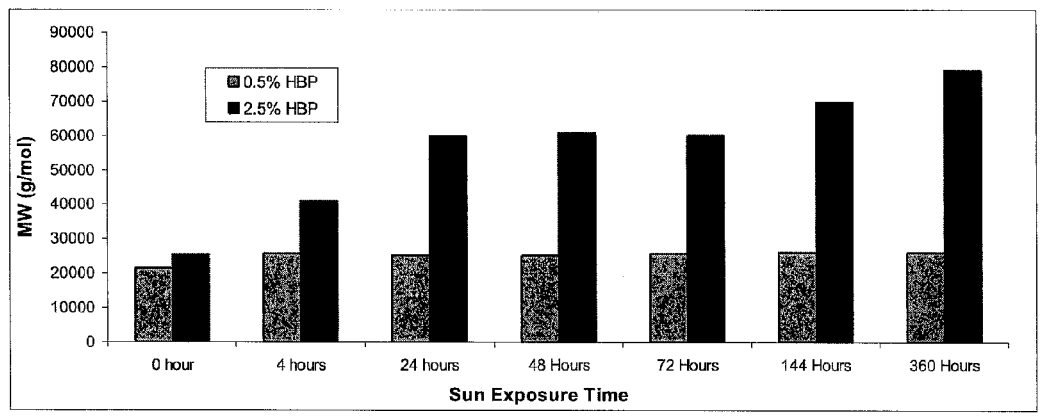
FIG. 5 depicts polycarbonate composition molecular weight as a function of sun exposure time.

Table 5, shown below, and FIG. 5 demonstrate that upon exposure to irradiative energy from the sun, the 4-hydroxybenzophenone endcapped polycarbonates underwent cross-linking and an increase in molecular weight. Accordingly, sun exposure can be used as a method of cross-linking the herein disclosed polycarbonates comprising monohydroxybenzophenone derived endcaps.

The % Gel data indicates the extent of crosslinking as function of the sun exposure time. The % Gel is measured by dividing the weight of the crosslinked portion of the exposed material by the total weight of the sample. The crosslinked portion corresponds to the insoluble part of the sample soaked in methylene chloride for 12 hours. This data shows that higher the amount of HBP, greater will be the amount of crosslinked material after sun exposure.

TABLE 5

| | Sun Exposure Time (Hours) | | | | | | | | |
|---|---|---|---|---|---|---|---|---|---|
| HBP (%) | 0 MW | 4 MW | 24 MW | 48 MW | 72 MW | 144 MW | 360 MW | Delta MW (%) | % Gel |
| 0.5 | 21620 | 25900 | 25098 | 25324 | 25703 | 26202 | 26013 | 16 | 0 |
| 0.5 | 26118 | 31130 | 33305 | 36826 | 32371 | 35363 | 34994 | 28 | 1 |
| 0.5 | 27549 | 31145 | 34172 | 36231 | 34756 | 36235 | 36517 | 24 | 1 |
| 2.5 | 25458 | 41086 | 59852 | 60745 | 60224 | 69605 | 78980 | 135 | 15 |
| 2.5 | 24245 | 46183 | 79350 | 65228 | 67150 | 45841 | 58211 | 227 | 27 |
| 2.5 | 26145 | 45112 | 64941 | 51008 | 63437 | 63819 | 34831 | 148 | 52 |

HBP = hydroxybenzophenone;
MW = Molecular Weight (C) Flame Resistance

Flammability tests were performed following the procedure of Underwriter's Laboratory Bulletin 94 entitled "Tests for Flammability of Plastic Materials, UL94". Several ratings can be applied based on the rate of burning, time to extinguish, ability to resist dripping, and whether or not drips are burning. According to this procedure, materials may be classified as HB, V0, V1, V2, 5V, 5VA and/or 5VB on the basis of the test results obtained for five samples. The criteria for the flammability classifications or "flame retardance" are described below.

V0: A specimen is supported in a vertical position and a flame is applied to the bottom of the specimen. The flame is applied for ten seconds and then removed until flaming stops at which time the flame is reapplied for another ten seconds and then removed. Two sets of five specimens are tested. The two sets are conditioned under different conditions.

To achieve a V0 rating, specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame 5VA: Testing is done on both bar and plaque specimens. Procedure for Bars: A bar specimen is supported in a vertical position and a flame is applied to one of the lower corners of the specimen at a 20° angle. The flame is applied for 5 seconds and is removed for 5 seconds. The flame application and removal is repeated five times. Procedure for Plaques: The procedure for plaques is the same as for bars except that the plaque specimen is mounted horizontally and a flame is applied to the center of the lower surface of the plaque.

To achieve a 5VA rating, specimens must hot have any flaming or glowing combustion for more than 60 seconds after the five flame applications. Specimens must not drip flaming particles that ignite the cotton. Plaque specimens must not exhibit burnthrough (a hole).

Compositions comprising cross-linked polycarbonates disclosed herein (neat and blended) were evaluated for UL 94 V0 and 5VA performance as compared to high-flow BPA-polycarbonate neat and blended compositions. The tested compositions and flame test results are provided in Tables 6-9, shown below.

(i) V0 Performance

Flammability testing was conducted on flame bars prepared from compositions labelled as Sample 1 (S1), Comparative Sample 2 (CS2), Sample 3 (S3), and Comparative Sample 4 (CS4), described in Table 6. S1 is a blend composition comprising the benzophenone-BPA copolymer of Example 8 and a p-cumylphenol capped poly(20 wt % isophthalate-terephthalate-resorcinol ester)-co-(80 wt % bisphenol-A carbonate) copolymer. CS2 is a blend composition comprising a high-flow BPA-polycarbonate and a p-cumylphenol capped poly(20 wt % isophthalate-terephthalate-resorcinol ester)-co-(80 wt % bisphenol-A carbonate) copolymer. S3 is a neat resin composition comprising the benzophenone-BPA copolymer of Example 8. CS4 is a neat resin composition comprising the high-flow BPA-polycarbonate.

TABLE 6

| | Ingredient | Unit | S1 | CS2 | S3 | CS4 |
|---|---|---|---|---|---|---|
| Example 8 | Benzophenone-BPA copolymer-2.5 mol-%-26k | % | 55 | | 100 | |
| 20:80 ITR-PC | p-cumylphenol capped poly(20 wt % isophthalate-terephthalate-resorcinol ester)-co-(80 wt % bisphenol-A carbonate) copolymer (Mw = 60,000, PS standards) | % | 45 | 45 | | |
| HF-PC | Bisphenol-A based polycarbonate resin (Mw = 22,000 Daltons, PS standards) | % | | 55 | | 100 |
| UV stabilizer | 2-(2'-hydroxy-5'-t-octylphenyl)benzotriazole | % | 0.20 | 0.20 | 0.20 | 0.20 |
| PEPQ Powder | Phosphonous Acid Ester (CAS # 119345-01-6) | % | 0.06 | 0.06 | 0.06 | 0.06 |
| | Cycloaliphatic Epoxy Resin (3,4-epoxy cyclohexyl methyl-3,4-epoxy cyclohexyl carboxylate), ERL4221 | % | 0.03 | 0.03 | 0.03 | 0.03 |
| KSS | Potassium diphenylsulphon-3-sulphonate | % | 0.03 | 0.03 | 0.03 | 0.03 |
| PETS | pentaerythritol tetrastearate | % | 0.30 | 0.30 | 0.30 | 0.30 |
| | Colorant 1 | % | 0.13 | 0.13 | 0.13 | 0.13 |
| | Colorant 2 | % | 0.13 | 0.13 | 0.13 | 0.13 |
| MVR | Melt Volume Flow Rate | cc/10 min | 9.5 | 15.9 | 8.1 | 25.9 |
| Abusive MVR | Abusive Melt Volume Flow Rate | cc/10 min | 11.4 | 21.7 | 8.5 | 27.7 |

Flammability testing was conducted using the standard Underwriters Laboratory UL 94 test method (7 day conditioning), except that 20 bars rather than the usual 5 bars were tested. Specimens are to be preconditioned in an air-circulating oven for 168 hours at 70±1° C. and then cooled in a desiccator for at least 4 hours at room temperature, prior to testing. Once removed from the desiccator, specimens are tested within 30 minutes. The data was analyzed by calculation of the average flame out time, standard deviation of the flame out time and the total number of drips. Statistical methods were used to convert the data to a probability that a specific formulation would achieve a first time V0 pass or "p(FTP)" in the standard UL 94 testing of 5 bars. Preferably p(FTP) values will be 1 or very close to 1 for high confidence that a sample formulation would achieve a V0 rating in UL 94 testing.

Table 7 presents p(FTP) values for the blend (S1) comprising the benzophenone-BPA copolymer and the p-cumylphenol capped ITR-PC; and the neat benzophenone-BPA copolymer (S3). p(FTP) values are provided for both before and after the flame bars are exposed to UV radiation. The results from S1 and S3 are compared with results from flame bars prepared from the blend (CS2) comprising the high-flow BPA polycarbonate and the p-cumylphenol capped ITR-PC; and the neat high-flow BPA-polycarbonate (CS4). S3 and CS4 were prepared in order to compare the flame behavior of the blends of S1 and CS2 with neat resin compositions. Potassium sulfone sulfonate was incorporated into the tested compositions as a flame poison.

TABLE 7

| | Flame Resistance | | Sample | | | |
|---|---|---|---|---|---|---|
| | | | S1 (blend) (HBP-BPA/ ITR-PC) | CS2 (blend) (HF-BPA/ ITR-PC) | S3 (neat) (HBP-BPA) | CS4 (neat) (HF-BPA) |
| Before UV | p(FTP) @ 2.00 mm | | 0 | 0 | 0 | 0 |
| After UV | p(FTP) @ 2.00 mm | | 0.99 | 0 | 0.8 | 0 |
| | p(FTP) @ 1.50 mm | | 0.2 | 0 | 0.3 | — |
| | p(FTP) @ 1.00 mm | | 0.1 | 0 | — | — |

HBP-BPA = Benzophenone-BPA copolymer - 2.5 mol-% - 26k;
HF-BPA = High-Flow Bisphenol-A based polycarbonate resin;
HBP-BPA/ITR-PC = Benzophenone-BPA copolymer - 2.5 mol-% - 26k/p-cumylphenol capped poly(20 wt % isophthalate-terephthalate-resorcinol ester)-co-(80 wt % bisphenol-A carbonate) copolymer;
HF-BPA/ITR-PC = High-Flow Bisphenol-A based polycarbonate resin/p-cumylphenol capped poly(20 wt % isophthalate-terephthalate-resorcinol ester)-co-(80 wt % bisphenol-A carbonate) copolymer.

The data of Table 7 shows a dramatic increase of the p(FTP) values for the UV-treated compositions incorporating 4-hydroxybenzophenone endcap, whereas the corresponding controls with the high-flow polycarbonate do not show any variation in their respective probability values. Surprisingly, even in blends, the cross-linked benzophenone-BPA copolymers impart V0 performance to the test bars at 2 mm thickness.

(ii) 5VA Performance

Flammability testing was conducted on flame bars and plaques prepared from compositions labelled as Sample 5 (S5), Comparative Sample 6 (CS6), Sample 7 (S7), and Comparative Sample 8 (CS8), described in Table 8. S5 is a low-flow benzophenone-BPA copolymer composition having a melt volume flow rate (MVR) of 2.81 cm$^3$/10 minutes at 300° C., 1.2 kg, 360 seconds, and an abusive MVR of 2.89 cm$^3$/10 minutes at 300° C., 1.2 kg, 1080 seconds. CS6 is a low-flow BPA-polycarbonate composition having an MVR of 6.35 cm$^3$/10 minutes at 300° C., 1.2 kg, 360 seconds, and an abusive MVR of 6.52 cm$^3$/10 minutes at 300° C., 1.2 kg, 1080 seconds. S7 is a high-flow benzophenone-BPA copolymer composition having a melt volume flow rate (MVR) of 11.5 cm$^3$/10 minutes at 300° C., 1.2 kg, 360 seconds, and an abusive MVR of 11.7 cm$^3$/10 minutes at 300° C., 1.2 kg, 1080 seconds. CS8 is a high-flow BPA-polycarbonate composition having an MVR of 27.6 cm$^3$/10 minutes at 300° C., 1.2 kg, 360 seconds, and an abusive MVR of 27.7 cm$^3$/10 minutes at 300° C., 1.2 kg, 1080 seconds.

TABLE 8

| Ingredient | Unit | Sample | | | |
|---|---|---|---|---|---|
| | | S5 | CS6 | S7 | CS8 |
| High-Flow Benzophenone-BPA copolymer | % | | | 100 | |
| Low-Flow Benzophenone-BPA copolymer | % | 100 | | | |
| High-Flow Bisphenol-A based polycarbonate resin | % | | | | 100 |
| Low-Flow Bisphenol-A based polycarbonate resin | % | | 100 | | |
| Potassium Perfluorobutane Sulfonate | % | 0.08 | 0.08 | 0.08 | 0.08 |
| Irgaphos Stabilizer | % | 0.06 | 0.06 | 0.06 | 0.06 |
| Melt Volume Flow Rate | cc/10 min | 2.81 | 6.35 | 11.5 | 27.6 |
| Abusive Melt Volume Flow Rate | cc/10 min | 2.89 | 6.52 | 11.7 | 27.7 |

Flammability testing was conducted using the standard Underwriters Laboratory UL 94 test method (7 day conditioning). 5 bars and 3 plaques were tested. Specimens are to be preconditioned in an air-circulating oven for 168 hours at 70±1° C. and then cooled in a desiccator for at least 4 hours at room temperature, prior to testing. Once removed from the desiccator, specimens are tested within 30 minutes. The data for the bars was analyzed by calculation of the average flame out time, standard deviation of the flame out time and the total number of drips. Statistical methods were used to convert the data to a probability that a specific formulation would achieve a first time pass or "p(FTP)" in the standard UL 94 testing of 5 bars. Preferably p(FTP) values will be 1 or very close to 1 for high confidence that a sample formulation would achieve a 5VA rating in UL 94 testing.

Table 9 presents the 5VA test results for the low-flow and high-flow benzophenone-BPA copolymer compositions S5 and S7 as compared with low-flow and high-flow BPA-polycarbonate compositions lacking benzophenone endcap. The data of Table 9 demonstrates that the UV-treated high-flow and low-flow compositions incorporating 4-hydroxybenzophenone endcap (e.g., S5 and S7) can meet 5VA material requirements at thicknesses of 2.5 mm or less, 2.0 mm or less, and 1.5 mm or less, whereas corresponding controls with the high-flow and low-flow BPA-polycarbonate (e.g., CS6 and CS8) do not show any variation in their respective flame resistance after UV-treatment. The failure of UV-treated Sample 7 (S7) at 1.5 mm indicates that endcap mol % and polymer molecular weight may be balanced to achieve 5VA performance.

TABLE 9

| | Flame Resistance | Sample | | | |
|---|---|---|---|---|---|
| | | S5 | CS6 | S7 | CS8 |
| Before UV | 5 VA @ 3 mm | F | F | F | F |
| | 5 VA @ 2.5 mm | F | F | F | F |
| | 5 VA @ 2 mm | F | F | F | F |
| | 5 VA @ 1.5 mm | F | F | F | F |
| After UV | 5 VA @ 2.5 mm | P | F | P | F |
| | 5 VA @ 2 mm | P | F | P | F |
| | 5 VA @ 1.5 mm | P | F | F | F |

P = specimens that passed 5 VA testing; F = specimens that failed 5 VA testing

The results of Tables 7 and 9 demonstrate that the cross-linked polycarbonates disclosed herein, whether neat or within a blend composition, impart flame resistance (V0 and 5VA) to articles comprising the cross-linked polycarbonates. In particular, the compositions can be used to provide 5VA compliant materials and articles.

The results also demonstrate that even benzophenone-BPA compositions incorporating UV-absorbing polymers (e.g., p-cumylphenol capped ITR-PC) can undergo sufficient cross-linking to provide compositions that exhibit V0 and 5VA performance according to UL 94.

The results further demonstrate that 5VA performance can, surprisingly, be achieved using 0.08 wt % or less of a non-brominated, non-chlorinated flame retardant. This allows preparation of compositions comprising the cross-linked polycarbonates that have high transparency and low haze values. In particular, the cross-linked compositions can be used to provide 5VA compliant materials at 2.5 mm or less, 2 mm or less, and 1.5 mm or less, the materials having high transparencies and low haze values. In comparison, conventional polycarbonate cannot achieve 5VA performance without incorporation of significant quantities of flame retardant, which may lower the transparency of the resulting polycarbonate and effect overall physical properties.

(D) Mechanical and Physical Properties

Improved flame retardance as demonstrated above for the cross-linked compositions is generally not useful if the composition also has excessive loss of mechanical properties that are needed for end use applications. As demonstrated below, the cross-linked compositions retain impact and tensile properties subsequent to UV-treatment.

Table 10 provides mechanical and physical properties of the compositions of Sample 5(S5), Comparative Sample 6 (CS6), Sample 7 (S7), and Comparative Sample 8 (CS8), the formulations for which are described above in Table 8. The properties provided in Table 10 relate to the samples before UV-treatment. Table 10 shows that the compositions that incorporate benzophenone endcapped-resin exhibit similar mechanical properties to the ones that incorporate conventional BPA-polycarbonate resin.

TABLE 10

| Property (before UV-treatment) | Unit | Sample | | | |
|---|---|---|---|---|---|
| | | S5 | CS6 | S7 | CS8 |
| Modulus of Elasticity | MPa | 2354 | 2332 | 2388 | 2372 |
| Tensile Strength at Break | MPa | 64 | 66 | 70.6 | 68 |
| Flexural Modulus | MPa | 2310 | 2290 | 2360 | 2360 |
| Flexural Modulus | — | 77.4 | 53.1 | 7.36 | 16.3 |
| Flexural Modulus | % | 3.35 | 2.32 | 0.312 | 0.692 |
| NII Ductility | % | 100 | 100 | 100 | 100 |
| NII Impact Strength | J/m | 920 | 911 | 845 | 685 |
| HDT | °C. | 135.8 | 133.8 | 131.5 | 129.6 |
| MVR | cm$^3$/10 min | 2.81 | 6.35 | 11.5 | 27.6 |
| Abusive MVR | cm$^3$/10 min | 2.89 | 6.52 | 11.7 | 27.7 |

NII = Notched Izod Impact; HDT = Heat Distortion Temperature; MVR = Melt Volume Flow Rate The dynamic oscillatory rheology curves of low-flow benzophenone-BPA copolymer resin (S5) and low-flow bisphenol-A based polycarbonate resin (CS6) were run on an ARES strain controlled rheometer using a frequency sweep method to determine the viscosity or modulus of the material as a function of frequency at a constant temperature (300° C.). Frequency sweep measurements were performed using 25 mm parallel-plate geometry at a 20% strain (linear regime) with a fixed gap of 1 mm. The frequency was varied from 0.1 to 500 rad/s.

Figure 6:
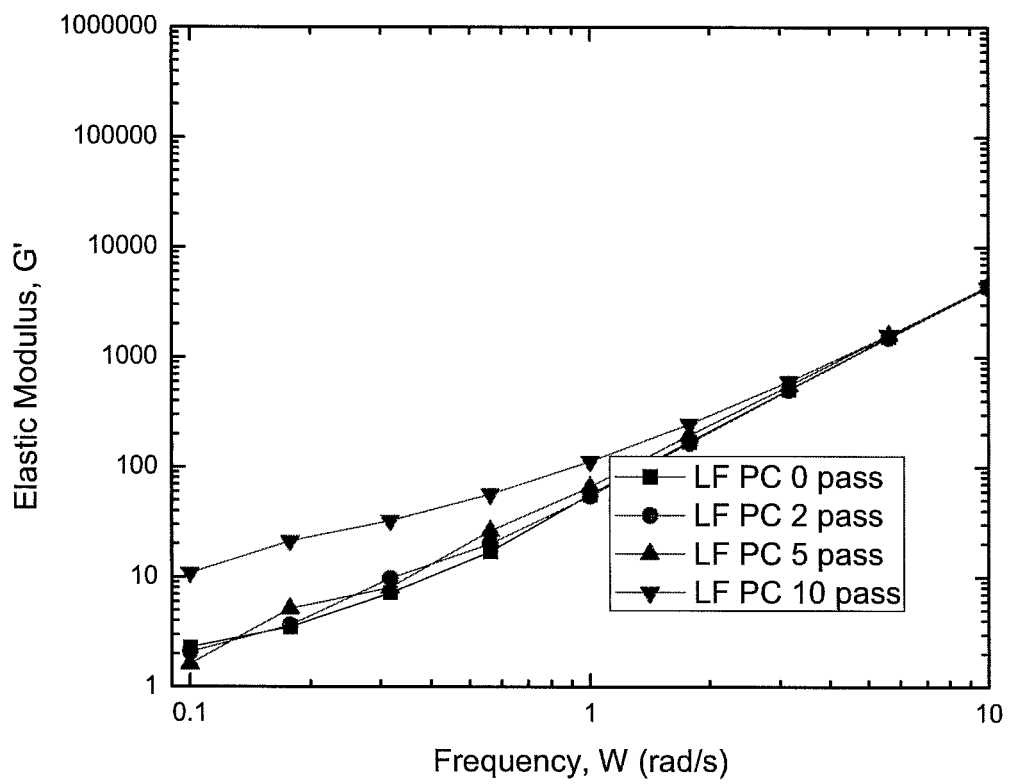
FIG. 6 depicts small amplitude oscillatory rheology [parallel-plate] of a low-flow BPA-polycarbonate resin.
Figure 7:
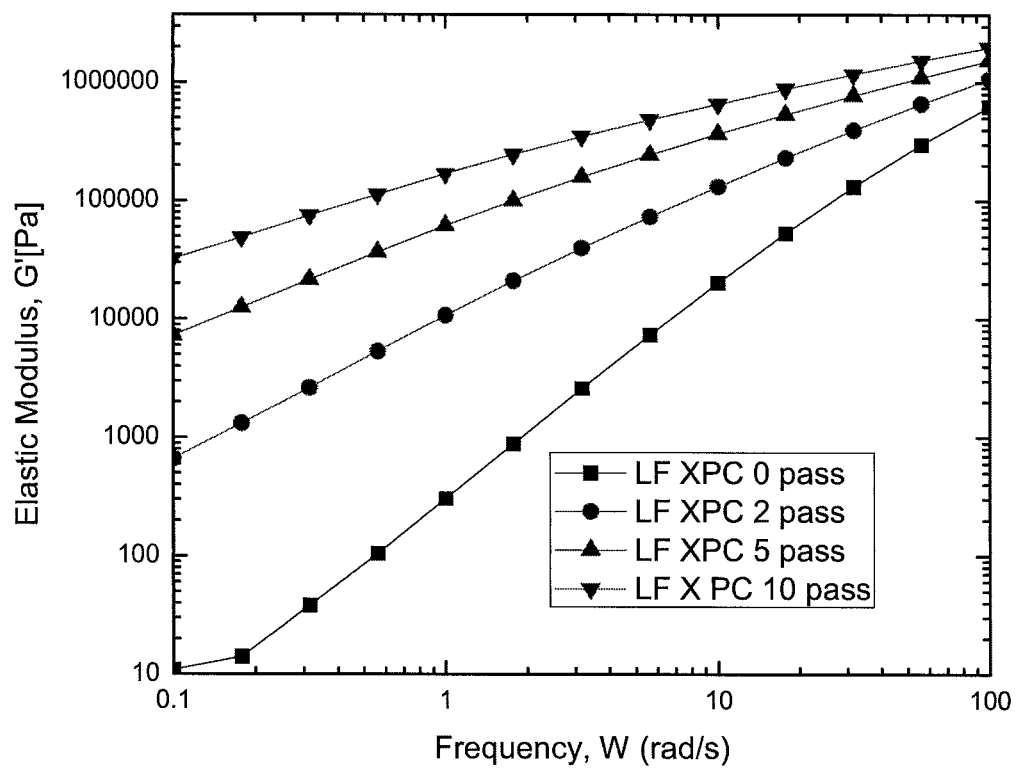
FIG. 7 depicts small amplitude oscillatory rheology [parallel-plate] of a low-flow benzophenone endcapped BPA-polycarbonate copolymer resin.

The dynamic oscillatory rheology curve of low-flow bisphenol-A based polycarbonate resin is shown in FIG. 6; the dynamic oscillatory rheology curve of cross-linkable low-flow benzophenone-BPA copolymer resin is shown in FIG. 7.

The dynamic oscillatory rheology was determined on pellets of the resins as a function of passes through a UV Fusion FS300S with a LC-6B Benchtop Conveyor using a D bulb. The time of irradiation was ~90 seconds, providing energy of irradiation of ~3,000 mJ/cm$^2$. FIG. 7 shows there is a dramatic increase in the elastic modulus for the benzophenone capped material. For example, at 0.1 rad/s the elastic modulus grows from 10 Pa to 10000 Pa (three orders of magnitude) from 0 to 5 passes, whereas in the low flow BPA poly-carbonate materials (FIG. 6) the elastic modulus is just 2 Pa irrespective of the UV passes. This dramatic increase in elastic modulus as a function UV exposure for the benzophenone capped material material indicates the formation of crosslinking in the benzophenone end capped polycarbonate.

Table 11 shows multiaxial impact (MAI) data for the compositions both prior to and after UV-exposure. As shown in Table 11, the improved flame resistance of the present compositions comprising cross-linked polycarbonate is achieved without significant loss of important mechanical properties.

TABLE 11

| Test (3.2 mm disk) | Unit | Sample | | |
|---|---|---|---|---|
| | | S7 | S7 | S7 |
| UV-dose | mJ/cm$^2$ | 0 | 7000 | 14000 |
| MAI - Energy to max load | J | 75.4 | 62.4 | 62.9 |
| MAI - Energy to failure | J | 80.5 | 69.1 | 67.5 |
| MAI - Energy, Total | J | 80.5 | 69.1 | 67.6 |
| MAI - Max load | kN | 7.14 | 6.653 | 6.209 |
| MAI - Deflection at max load | mm | 21.3 | 19.6 | 19.9 |
| MAI - Ductility | % | 100 | 100 | 100 |

Table 12 shows that tenisle properties of the cross-linked polycarbonate compositions prepared by sun exposure are not effected by UV exposure. At $T_0$ (zero hours exposure) the compositions of Sample S5 had an elongation at break of 141.22% (50 mm/min elongation speed). At 168 hours, the elongation break was 126.23%. By way of comparison, 100 gr PC had an elongation at break of 119.21% at $T_0$. Thus, the tensile strength of the cross-linked compositions is retained after UV-exposure.

TABLE 12

| | Elongation at Break (%) | |
|---|---|---|
| Sun Exposure (h) | Example S5 | 100 gr PC |
| 0 | 141.22% | 119.21% |
| 24 | 121.08% | — |
| 48 | 123.04% | — |
| 168 | 126.23% | — |

Figure 8:
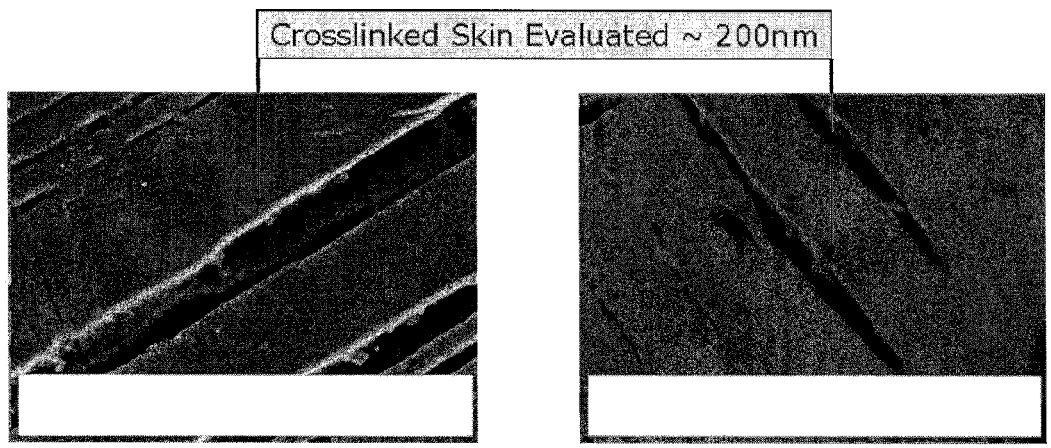
FIG. 8 depicts field emission microscopy images of the skin of tensile bars comprising cross-linked polycarbonates.

FIG. 8 shows that cross-linking is limited to the surface of a treated article. Tensile bars prepared from S5 were elongated and thereafter examined under field emission microscopy (FEM). FIG. 8 illustrates that micro cracks formed during tensile elongation were of approximately 20 microns deep or less. The depth of cross-linking is estimated to around 20 microns or less, 15 microns or less, 10 microns or less, or 5 microns or less.

(E) Chemical Resistance

Compositions comprising cross-linked polycarbonates disclosed herein were evaluated for chemical resistance. Powders of 4-hydroxybenzophenone-terminated polycarbonates (Examples 3-5), formulated with a phosphite stabilizer and a hindered phenol, were each stabilized and subsequently pelletized to provide composition samples S9-S11. The resulting pellets were molded in the form of 3.2 mm colorchips. Table 13 presents the constiuents, the glass transition temperature (Tg), and the melt volume flow rate (MVR) for each sample.

TABLE 13

|  |  |  | Sample | | |
|---|---|---|---|---|---|
| | Ingredient | Unit | S9 | S10 | S11 |
| Example 3 | Benzophenone-BPA copolymer - 1.7 mol-% - 28k | % | 100 | | |
| Example 4 | Benzophenone-BPA copolymer - 2.5 mol-% - 27k | % | | 100 | |
| Example 5 | Benzophenone-BPA copolymer - 0.5 mol-% - 28k | % | | | 100 |
| | Phosphite Stabilizer | % | 0.06 | 0.06 | 0.06 |
| | Hindered Phenol Stabilizer | % | 0.05 | 0.05 | 0.05 |
| MVR | Melt Volume Flow Rate | cc/ 10 min | 5.3 | 4.8 | 8.1 |
| Abusive MVR | Abusive Melt Volume Flow Rate | cc/ 10 min | 5.4 | 5.6 | 8.6 |
| Tg | Glass Transition Temperature | ° C. | 151.7 | 151.7 | 152.1 |

Colorchips of S9-S11 were plunged into a test fluid for a duration of 5 minutes to assess chemical resistance to the fluid. Table 14 shows the chemical resistance of each composition S9-S11 to toluene, acetone, and Windex®. Table 14 shows that higher amounts of 4-hydroxybenzophenone endcap (e.g., 2.5 mol % as in S10) led to improved chemical resistance, independently of the resin molecular weight. The non-UV treated colorchips, when treated with acetone or toluene, exhibited crystallization and shrinking on the colorchip surface.

TABLE 14

| Chemical Resistance | | Sample | | |
|---|---|---|---|---|
| | | S9 | S10 | S11 |
| Before UV | toluene | – | – | – |
| | acetone | – | – | – |
| | Windex ® | +++ | +++ | +++ |
| After UV | toluene | + | ++ | + |
| | acetone | + | ++ | + |
| | Windex ® | +++ | +++ | +++ |

"–" = cracking/blistering observed;
"+" = lowered gloss observed;
"++" = solvent mark observed;
"+++" = no visual change observed Table 15 shows that UV-irradiated samples S1 and S3, the formulations for which are described above in Table 6, are resistant to chemical treatment after exposure to UV radiation, as compared to the respective control samples CS2 and CS4. Surprisingly, even benzophenone-BPA blends including UV-absorbing polymers (e.g., p-cumylphenol capped ITR-PC) such as that of S1 underwent sufficient cross-linking to provide compositions that exhibit extreme chemical resistance (e.g., resistance to acetone).

TABLE 15

| | | Sample | | | |
|---|---|---|---|---|---|
| | Chemical Resistance | S1 (blend) (HBP-BPA/ ITR-PC) | CS2 (blend) (HF-BPA/ ITR-PC) | S3 (neat) (HBP-BPA) | CS4 (neat) (HF-BPA) |
| Before UV | toluene | – | – | – | – |
| | acetone | – | – | – | – |
| | Windex ® | +++ | +++ | +++ | +++ |
| After UV | toluene | +++ | – | +++ | – |
| | acetone | ++ | – | ++ | – |
| | Windex ® | +++ | +++ | +++ | +++ |

"–" = cracking/blistering observed;
"+" = lowered gloss observed;
"++" = solvent mark observed;
"+++" = no visual change observed;
HBP-BPA = Benzophenone-BPA copolymer - 2.5 mol-% - 26k;
HF-BPA = High-Flow Bisphenol-A based polycarbonate resin;
HBP-BPA/ITR-PC = Benzophenone-BPA copolymer - 2.5 mol-% - 26k/p-cumylphenol capped poly(20 wt % isophthalate-terephthalate-resorcinol ester)-co-(80 wt % bisphenol-A carbonate) copolymer;
HF-BPA/ITR-PC = High-Flow Bisphenol-A based polycarbonate resin/p-cumylphenol capped poly(20 wt % isophthalate-terephthalate-resorcinol ester)-co-(80 wt % bisphenol-A carbonate) copolymer.

The cross-linked polycarbonate composition S5 was further evaluated for chemical resistance under strain conditions. In a strain jig, four tensile bars were positioned. The tensile bars were molded at 550° F. barrel temperature, 180° F. mold temperature and 0.5 in/s injection speed. Two bars comprised the cross-linked polycarbonate composition S5, and two comprised the S5 composition prior to UV-treatment. The curvature of the jig induced a 1% stress level on the tensile bars. A portion of the bars was exposed to acetone by dripping the solvent on top of the tensile bars. As shown in Table 16, the tensile bars of the samples without UV-treatment snapped upon exposure to acetone, whereas the tensile bars comprised of the cross-linked polycarbonate did not snap.

TABLE 16

| | Test Conditions | | | | Sample |
|---|---|---|---|---|---|
| | Strain | Temperature | Exposure Time | Solvent | S5 |
| Before UV | 1% | 23° C. | Until solvent evaporates | Acetone | Bars snapped |
| After UV | 1% | 23° C. | Until solvent evaporates | Acetone | Bars did not snap |

The chemical resistance results of Tables 14-16 demonstrate that the cross-linked polycarbonates disclosed herein, whether neat or within a blend composition, impart chemical resistance to articles comprising the cross-linked polycarbonate. The results also demonstrate that even blends with UV-absorbing polymers can achieve sufficient cross-linking to provide compositions that exhibit extreme chemical resistance.

(F) Haze

Compositions comprising cross-linked polycarbonates disclosed herein were evaluated for haze value. Percent haze (% Haze) was determined for the compositions of samples S5 and S7, the formulations for which are described above in Table 8. The percent haze for each sample was less than 2%, the haze value measured on 2.54 mm thick color chips using a Color-Eye 7000A Spectrometer.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A composition comprising:
   a cross-linkable polycarbonate resin comprising about 0.5 mole % to about 5.0 mole % endcap groups derived from a monohydroxybenzophenone, wherein the cross-linkable polycarbonate resin is made from an interfacial polymerization process comprising the steps of:
   (i) forming a mixture comprising bisphenol-A, a monohydroxybenzophenone, and a tertiary amine catalyst in a water-immiscible solvent and water solvent system;
   (ii) stirring the mixture of (i) while maintaining a pH from about 8 to about 9 by the addition of a basic solution to form a stirred mixture;
   (iii) charging the stirred mixture of (ii) with phosgene, while simultaneously adding a basic solution to maintain the pH between about 8.5 to about 10 to form a reaction mixture containing the cross-linkable polycarbonate resin;
   (iv) separating the organic layer from the reaction mixture;
   (v) washing the organic layer of (iv) with an aqueous acid;
   (vi) washing the acid-washed organic layer of (v) with deionized water to achieve a neutral pH; and
   (vii) isolating the cross-linkable polycarbonate resin from the neutral organic layer of (vi);
   wherein the cross-linkable polycarbonate resin has a weight-average molecular weight of between 17,000 and 35,000 Daltons and has a polydispersity index (PDI) of between 3.0 and 7.3 as measured by GPC using a UV-VIS detector and polycarbonate standards; and
   wherein the cross-linkable polycarbonate resin does not contain any soft block segments.

2. The composition of claim 1, wherein a second end-capping agent is present in the mixture of (i) in addition to the monohydroxybenzophenone.

3. The composition of claim 2, wherein the second end-capping agent is selected from the group consisting of phenol, p-t-butylphenol, p-cumylphenol, and 4-cyanophenol.

4. The composition of claim 2, wherein the cross-linkable polycarbonate resin comprises about 0.5 mole % to about 5.0 mole % endcap groups derived from the second end-capping agent.

5. The composition of claim 1, wherein the mixture of (i) further comprises a phase transfer catalyst.

6. The composition of claim 5, wherein the phase transfer catalyst is selected from the group consisting of $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_1$-$C_8$ alkoxy group or a $C_6$-$C_{18}$ aryloxy group.

7. The composition of claim 1, wherein the mixture of (i) further comprises a branching agent.

8. A composition comprising a cross-linkable polycarbonate resin,
   wherein the cross-linkable polycarbonate resin comprises about 0.5 mol % to about 5 mol % endcap groups derived from a monohydroxybenzophenone;
   wherein the cross-linkable polycarbonate resin has a weight-average molecular weight of between 17,000 and 35,000 Daltons and has a polydispersity index (PDI) of between 3.0 and 7.3 as measured by GPC using a UV-VIS detector and polycarbonate standards;
   wherein when a plaque of about 0.5 mm thickness formed from the cross-linkable polycarbonate resin is exposed to UV radiation, the resin increases in molecular weight by at least 15%; and
   wherein the cross-linkable polycarbonate resin does not contain any soft block segments.

9. The composition of claim 8, wherein the resin increases in molecular weight by at least 30%.

10. The composition of claim 8, wherein the resin increases in molecular weight by at least 135%.

11. A composition comprising a cross-linkable polycarbonate resin,
    wherein the cross-linkable polycarbonate resin comprises about 0.5 mol % to about 5 mol % endcap groups derived from a monohydroxybenzophenone;
    wherein the cross-linkable polycarbonate resin has a polydispersity index (PDI) of between 3.0 and 7.3 as measured by GPC using a UV-VIS detector and polycarbonate standards;
    wherein the composition has a melt volume flow rate of 2 to 12 cc/10 minutes at 300° C./1.2 kg;
    wherein a plaque made from the composition has a transparency of 70% to 90% at a thickness of 3.2 mm, measured according to ASTM-D1003-00;
    wherein a plaque that is made from the composition and exposed to UV radiation can achieve a UL94 5VA rating at a thickness of 2.0 mm (±10%); and
    wherein the cross-linkable polycarbonate resin does not contain any soft block segments.

12. A composition comprising a cross-linkable polycarbonate resin,
    wherein the cross-linkable polycarbonate resin comprises about 0.5 mol % to about 5 mol % endcap groups derived from a monohydroxybenzophenone;
    wherein a plaque made from the composition with a thickness of 3.2 mm has a ductility of 100% after exposure to 2000 mJ/cm$^2$ of UV radiation;
    wherein a plaque made from the composition with a thickness of 2.54 mm has a haze of less than 2%;
    wherein a film of about 0.5 mm thickness and exposed to UV radiation has a % gel of 15% or greater;
    wherein a plaque made from the composition with a thickness of 3.2 mm and crosslinked, then submerged in acetone for 5 minutes, does not crack or blister; and
    wherein the cross-linkable polycarbonate resin does not contain any soft block segments.

13. The composition of claim 12, wherein a plaque made from the composition with a thickness of 3.2 mm and crosslinked, then submerged in toluene for 5 minutes, does not crack or blister.

14. A composition comprising a cross-linkable polycarbonate resin,
    wherein the cross-linkable polycarbonate resin comprises endcap groups derived from a monohydroxybenzophenone;
    wherein the composition has a melt volume flow rate of 2 to 12 cc/10 minutes at 300° C./1.2 kg;
    wherein a plaque that is made from the composition and exposed to UV radiation can achieve a UL94 5VA rating at a thickness of 2.0 mm (±10%); and wherein the cross-linkable polycarbonate resin does not contain any soft block segments.

15. A composition comprising a cross-linkable polycarbonate resin and a flame retardant,
wherein the cross-linkable polycarbonate resin comprises endcap groups derived from a monohydroxybenzophenone;
wherein the composition comprises about 0.08 wt % or less of the flame retardant;
wherein the composition has a melt volume flow rate of 2 to 20 cc/10 minutes at 300° C./1.2 kg;
wherein a plaque that is made from the composition and exposed to UV radiation can achieve a UL94 5VA rating at a thickness of 3.0 mm (±10%); and
wherein the cross-linkable polycarbonate resin does not contain any soft block segments.

16. The composition of claim 1, wherein the cross-linkable polycarbonate resin comprises about 1 mole % to about 3 mole % endcap groups derived from the monohydroxybenzophenone.

17. The composition of claim 1, wherein a plaque that is made from the composition and exposed to UV radiation can achieve a UL94 5VA rating at a thickness of 2.0 mm (±10%).

18. The composition of claim 1, wherein a plaque that is made from the composition and exposed to UV radiation can achieve a UL94 5VA rating at a thickness of 1.5 mm (±10%).

19. The composition of claim 11, wherein the cross-linkable polycarbonate resin has a weight-average molecular weight of between 17,000 and 35,000 Daltons, as measured by GPC using a UV-VIS detector and polycarbonate standards.

20. The composition of claim 12, wherein the cross-linkable polycarbonate resin has a polydispersity index (PDI) of between 3.0 and 7.3 as measured by GPC using a UV-VIS detector and polycarbonate standards.

21. The composition of claim 1, wherein the cross-linkable polycarbonate resin has a melt volume flow rate of about 2 to about 12 cc/10 min at 300° C./1.2 kg.

22. The composition of claim 1, wherein a plaque comprising the composition has a transparency of 70% or greater at a thickness of 3.2 mm, measured according to ASTM-D1003-00.

23. The composition of claim 1, wherein a plaque comprising the composition has a haze value of less than 2% at a thickness of 2.54 mm, measured according to ASTM D1003-07.

24. The composition of claim 1, wherein an ASTM part comprising the composition has full ductility under multi-axial impact test conditions per ASTM D3763 at −30° C. determined using a 4-inch (10 cm) diameter, 3.2 millimeter (mm)-thick disk sample, ½-inch (12.7 mm) diameter dart, and an impact velocity of 3.3 meters per second (m/s).

25. The composition of claim 1, wherein an ASTM Type 1 tensile bar part comprising the composition has an elongation at break of at least 50% using the ASTM D 638 Type I method at 50 mm/min after exposure to acetone under 1% strain at 23° C.

26. The composition of claim 1, wherein the non-cross-linked polycarbonate comprises a compound of formula (I),

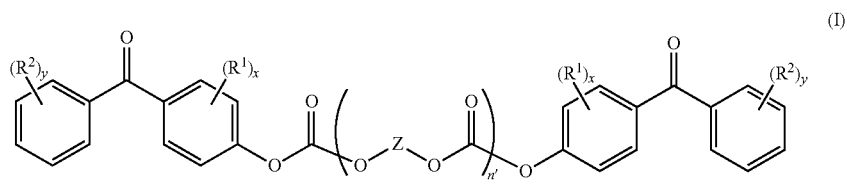

(I)

wherein each repeating unit —O—Z—OC(=O)— is independently derived from a carbonate source and
(i) a monomer having the structure HO-$A_1$-$Y_1$-$A_2$-OH wherein each of $A_1$ and $A_2$ comprise a monocyclic divalent arylene group, and $Y_1$ is a bridging group having one or more atoms; or
(ii) a monomer having the structure

wherein each $R^h$ is independently a halogen atom, a $C_1$-$C_{10}$ hydrocarbyl, or a halogen substituted $C_1$-$C_{10}$ hydrocarbyl, and n is 0 to 4;
$R^1$ is halogen, $C_1$-$C_6$ alkyl, $C_3$-$C_8$ cycloalkyl, aryl, or arylalkyl;
$R^2$ is halogen, $C_1$-$C_6$ alkyl, $C_3$-$C_8$ cycloalkyl, aryl, or arylalkyl;
x is 0, 1, 2, 3, or 4;
y is 0, 1, 2, 3, 4, or 5; and
n' ranges from 29 to 65.

27. The composition of claim 1, wherein the non-cross-linked polycarbonate comprises a compound of formula (II):

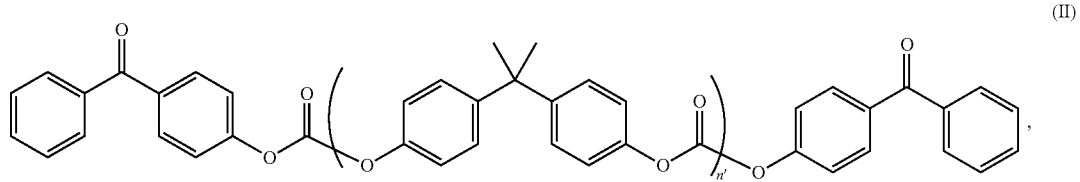

(II)

wherein n' ranges from 29 to 65.

28. The composition of claim 1, wherein the composition contains at least 5 wt % of an insoluble methylene chloride insoluble fraction in a 1 mm thick film.

29. The composition of claim 1, further comprising a flame retardant.

30. The composition of claim 29, wherein the flame retardant is potassium perfluorobutane sulfonate (Rimar salt), potassium diphenyl sulfone-3-sulfonate (KSS), or a combination thereof.

31. The composition of claim 29, wherein the flame retardant is Rimar salt which is present in an amount of about 0.05 wt % to about 0.085 wt %, based on the total weight of the composition, and wherein the plaque comprising the composition has a transparency of 70 to 90% at a thickness of 3.2 mm, measured according to ASTM-D1003-00.

32. The composition of claim 29, wherein the flame retardant is present in an amount of about 0.06 wt % to about 0.08 wt %.

33. The composition of claim 29, further comprising a heat stabilizer and a mold release agent.

34. The composition of claim 1, wherein the composition achieves a UL94 5VA rating in the absence of a brominated or chlorinated flame retardant.

35. The composition of claim 1, further comprising a cyclic siloxane.

36. The composition of claim 1, further comprising an impact modifier, UV stabilizer, colorant, flame retardant, heat stabilizer, plasticizer, lubricant, mold release agent, filler, reinforcing agent, antioxidant agent, antistatic agent, blowing agent, anti-drip agent, or radiation stabilizer.

37. The composition of claim 1, wherein the cross-linked polycarbonate does not contain any repeating units derived from a dihydroxybenzophenone, a trihydroxybenzophenone, or a tetrahydroxybenzophenone.

38. The composition of claim 1, wherein the cross-linkable polycarbonate contains about 0.5 mol % of endcaps derived from 4-monohydroxybenzophenone, and has a weight-average molecular weight (Mw) from 17,000 to 30,000 Daltons.

39. The composition of claim 1, wherein the cross-linkable polycarbonate contains about 2.5 mol % of endcaps derived from 4-monohydroxybenzophenone, and has a weight-average molecular weight (Mw) from 24,000 to 31,000 Daltons.

40. The composition of claim 1, wherein the cross-linkable polycarbonate has an MVR of 8 to 10 cc/10 min at 300° C./1.2 kg, and can achieve UL94 V0 performance at a thickness of 2.0 mm.

41. The composition of claim 1, further comprising a second polymer different from the cross-linkable polycarbonate resin.

42. The composition of claim 41, wherein the second polymer is a p-cumyl phenol capped poly(isophthalate-terephthalate-resorcinol ester)-co-(bisphenol-A carbonate) polymer or a polycarbonate-polysiloxane copolymer having a polysiloxane content from 0.4 wt % to 25 wt %.

43. The composition of claim 42, wherein the polycarbonate-polysiloxane copolymer is a siloxane block co-polycarbonate comprising from about 6 wt % siloxane (±10%) to about 20 wt % siloxane (±10%).

44. An article formed from the composition of claim 1.

45. The article of claim 44, wherein the article is at least one of an automotive bumper, an automotive exterior component, an automobile mirror housing, an automobile wheel cover, an automobile instrument panel or trim, an automobile glove box, an automobile door hardware or other interior trim, an automobile exterior light, an automobile part within the engine compartment, an agricultural tractor or device part, a construction equipment vehicle or device part, a marine or personal water craft part, an all terrain vehicle or all terrain vehicle part, plumbing equipment, a valve or pump, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, and a turbine blade.

46. The article of claim 44, wherein the article is at least one of a computer housing, a computer housing or business machine housing or part, a housing or part for monitors, a computer router, a copier, a desk top printer, a large office/industrial printer, a handheld electronic device housing, a housing for a hand-held device, a component for a light fixture, a humidifier housing, a thermostat control housing, an air conditioner drain pan, an outdoor cabinet, a telecom enclosure or infrastructure, a Simple Network Intrusion Detection System (SNIDS) device, a network interface device, a smoke detector, a component or device in a plenum space, a component for a medical application or a device, an electrical box or enclosure, and an electrical connector.

47. The article of claim 44, wherein the article is a film, a sheet, a layer of a multilayer film, or a layer of a multilayer sheet.

48. The article of claim 44, wherein the article is formed by injection molding, overmolding, co-injection molding, extrusion, multilayer extrusion, rotational molding, blow molding, or thermoforming.

49. The article of claim 44, wherein the article is exposed to UV radiation to cause crosslinking of the cross-linkable polycarbonate resin.

50. An interfacial polymerization process for making a cross-linkable polycarbonate resin, comprising:
(i) forming a mixture comprising bisphenol-A, a monohydroxybenzophenone, and a tertiary amine catalyst in a water-immiscible solvent and water solvent system;
(ii) stirring the mixture of (i) while maintaining a pH from about 8 to about 9 by the addition of a basic solution to form a stirred mixture;
(iii) charging the stirred mixture of (ii) with phosgene, while simultaneously adding a basic solution to maintain the pH between about 8.5 to about 10 to form a reaction mixture containing the cross-linkable polycarbonate resin;
(iv) separating the organic layer from the reaction mixture;
(v) washing the organic layer of (iv) with an aqueous acid;
(vi) washing the acid-washed organic layer of (v) with deionized water to achieve a neutral pH; and
(vii) isolating the cross-linkable polycarbonate resin from the neutral organic layer of (vi);

wherein the cross-linkable polycarbonate resin has a weight-average molecular weight of between 17,000 and 35,000 Daltons and has a polydispersity index (PDI) of between 3.0 and 7.3 as measured by GPC using a UV-VIS detector and polycarbonate standards; and wherein the cross-linkable polycarbonate resin does not contain any soft block segments.

51. The process of claim 50, wherein the monohydroxybenzophenone is 4-hydroxybenzophenone, the tertiary amine catalyst is triethylamine, and the water-immiscible solvent is methylene chloride.

52. The process of claim 50, wherein a second end-capping agent is present in the mixture of (i) in addition to the monohydroxybenzophenone.

53. The process of claim 52, wherein the second end-capping agent is selected from the group consisting of phenol, p-t-butylphenol, p-cumylphenol, and 4-cyanophenol.

54. The process of claim 50, wherein the mixture of (i) further comprises a phase transfer catalyst.

55. The process of claim 54, wherein the phase transfer catalyst is selected from the group consisting of $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_1$-$C_8$ alkoxy group or a $C_6$-$C_{18}$ aryloxy group.

56. The process of claim 54, wherein the amount of phase transfer catalyst is from 0.5 to 2 wt %, based on the weight of the bisphenol-A.

57. The process of claim 50, wherein the mixture of (i) further comprises a branching agent.

58. A process for preparing a polycarbonate article, comprising:

making a cross-linkable polycarbonate resin comprising about 0.5 mol % to about 5 mol % endcap groups derived from a monohydroxybenzophenone;

compounding the cross-linkable polycarbonate resin with a flame retardant to obtain a composition;

molding an article from the composition or coating an article with the composition; and exposing the molded article or coating to UV radiation to affect crosslinking;

wherein a plaque made from the composition has a transparency of 70% to 90% at a thickness of 3.2 mm, measured according to ASTM-D1003-00;

wherein a plaque that is made from the composition and exposed to UV radiation can achieve a UL94 5VA rating at a thickness of 2.0 mm (±10%) or less; and wherein the cross-linkable polycarbonate resin does not contain any soft block segments.

59. The process of claim 58, wherein the molded article or coating is exposed to UV radiation by passing the molded article or coating through a UV-chamber, or through a UV-containing light source, or by exposing the molded article or coating to the sun.

60. The process of claim 59, wherein the light source is a D-bulb.

61. The process of claim 58, wherein the article is treated with UV radiation for 90 seconds, providing an energy of irradiation of 3,000 mJ/cm$^2$.

62. The process of claim 58, wherein the article is molded by, or the article is coated by, extrusion processes, multilayer extrusion processes, and combinations thereof.

63. The process of claim 58, wherein the molded article and/or coated article is a multilayer sheet or multilayer film.

64. An article prepared by the process of claim 58.

* * * * *